(12) United States Patent
Korenjak et al.

(10) Patent No.: US 6,390,869 B2
(45) Date of Patent: May 21, 2002

(54) FOUR STROKE ENGINE WITH VALVE TRAIN ARRANGEMENT

(75) Inventors: Norbert Korenjak, Stadl Paura; Rudolf Tscherne, Buchkirchen; Alois Wolfsgruber, Gmunden; Rudolf Kusel, Thalheim bei Weis, all of (AT)

(73) Assignee: Bombardier-Rotax GmbH, Gunskirchen (AT)

( * ) Notice: Subject to any disclaimer, the term of this patent is extended or adjusted under 35 U.S.C. 154(b) by 0 days.

(21) Appl. No.: 09/794,240

(22) Filed: Feb. 28, 2001

Related U.S. Application Data
(60) Provisional application No. 60/185,703, filed on Feb. 29, 2000, and provisional application No. 60/257,174, filed on Dec. 22, 2000.

(51) Int. Cl.[7] ................................. B63H 21/10
(52) U.S. Cl. ........................ 440/88; 123/90.23
(58) Field of Search ................... 440/38, 88, 89, 440/84, 900; 123/73 AD, 317, 432, 90.23, 90.44, 196 W

(56) References Cited

U.S. PATENT DOCUMENTS

| | | |
|---|---|---|
| 1,876,948 A | 9/1932 | Jahnke |
| 2,565,060 A | 8/1951 | Beardsley et al. |
| 3,554,322 A | 1/1971 | Deutschmann et al. |
| 4,267,811 A | 5/1981 | Springer |
| 4,321,896 A | 3/1982 | Kasting |
| 4,519,373 A | 5/1985 | Hardy et al. |
| 4,553,515 A | 11/1985 | King et al. |
| 4,633,826 A | 1/1987 | Tominaga et al. |
| 4,662,323 A | 5/1987 | Moriya |
| 4,674,457 A | 6/1987 | Berger et al. |
| 4,712,517 A | 12/1987 | Anno et al. |
| 4,718,396 A | 1/1988 | Shimada et al. |

(List continued on next page.)

FOREIGN PATENT DOCUMENTS

| | | |
|---|---|---|
| DE | 23 33 688 | 1/1975 |
| DE | 38 16 864 | 11/1989 |
| DE | 39 12 487 | 4/1990 |
| EP | 0 495 221 | 7/1992 |
| WO | WO 90/10145 | 9/1990 |

OTHER PUBLICATIONS

International Search Report dated Jun. 19, 2001 for PCT Application No. PCT/US01/06331, filed Feb. 28, 2001, by Bombardier–Rotax GmbH et al.

International Search Report dated Jun. 19, 2001 for PCT Application No. PCT/US01/06264, filed Feb. 28, 2001, by Bombardier–Rotax GmbH et al.

International Search Report dated Jun. 19, 2001 for PCT Application No. PCT/US01/06245, filed Feb. 28, 2001, by Bombardier–Rotax GmbH et al.

International Search Report dated Jun. 19, 2001 for PCT Application No. PCT/US01/06244, filed Feb. 28, 2001, by Bombardier–Rotax GmbH et al.

International Search Report dated Jun. 19, 2001 for PCT Application No. PCT/US01/06243, filed Feb. 28, 2001, by Bombardier–Rotax GmbH et al.

International Search Report dated Jun. 19, 2001 for PCT Application No. PCT/US01/06242, filed Feb. 28, 2001, by Bombardier–Rotax GmbH et al.

International Search Report dated Jun. 19, 2001 for PCT Application No. PCT/US01/06246, filed Feb. 28, 2001, by Bombardier–Rotax GmbH et al.

International Search Report dated Jun. 19, 2001 for PCT Application No. PCT/US01/06265, filed Feb. 28, 2001, by Bombardier–Rotax GmbH et al.

Primary Examiner—Stephen Avila
(74) Attorney, Agent, or Firm—Pillsbury Winthrop LLP

(57) ABSTRACT

A four stroke internal combustion engine includes a cylinder head having a valve train having reduced profile that permits access to a spark plug assembly located therein.

46 Claims, 42 Drawing Sheets

U.S. PATENT DOCUMENTS

| | | | |
|---|---|---|---|
| 4,724,805 A | 2/1988 | Wirth et al. | |
| 4,741,302 A | 5/1988 | Oda et al. | |
| 4,743,224 A | 5/1988 | Yoshikawa et al. | |
| 4,747,811 A | 5/1988 | Sawafuji et al. | |
| 4,748,946 A | 6/1988 | Fujii et al. | |
| 4,773,361 A | 9/1988 | Toki et al. | |
| 4,796,574 A | 1/1989 | Fuji et al. | |
| 4,825,818 A | 5/1989 | Hamamura et al. | |
| 4,838,840 A | 6/1989 | Mutoh et al. | |
| 4,848,170 A | 7/1989 | Inagaki et al. | |
| 4,972,807 A | 11/1990 | Morishita | |
| 4,991,546 A | 2/1991 | Yoshimura | |
| 4,997,399 A | 3/1991 | Nakayasu et al. | |
| 5,009,204 A | 4/1991 | Ishii | |
| 5,031,591 A | 7/1991 | Shinoda et al. | |
| 5,094,193 A | 3/1992 | Yoshikawa | |
| 5,095,859 A | 3/1992 | Iwata et al. | |
| 5,130,014 A | 7/1992 | Volz | |
| 5,136,993 A | 8/1992 | Ampferer et al. | |
| 5,184,579 A | 2/1993 | Fujiwara | |
| RE34,226 E | 4/1993 | Morishita | |
| 5,215,164 A | 6/1993 | Shibata | |
| 5,257,674 A | 11/1993 | Okui et al. | |
| 5,279,269 A | * 1/1994 | Aizawa et al. | 123/317 |
| 5,404,858 A | 4/1995 | Kato | |
| 5,456,230 A | 10/1995 | Vanrens et al. | |
| 5,503,117 A | 4/1996 | Saito | |
| 5,513,606 A | 5/1996 | Shibata | |
| 5,529,027 A | 6/1996 | Okubo | |
| 5,537,968 A | 7/1996 | Takahashi | |
| 5,619,950 A | 4/1997 | Ikeda | |
| 5,634,422 A | 6/1997 | Kobayashi et al. | |
| 5,647,779 A | 7/1997 | Nanami | |
| 5,709,185 A | 1/1998 | Aizawa et al. | |
| 5,755,194 A | 5/1998 | Moorman et al. | |
| 5,797,778 A | 8/1998 | Ito et al. | |
| 5,820,426 A | 10/1998 | Hale | |
| 5,829,402 A | 11/1998 | Takahashi et al. | |
| 5,839,930 A | 11/1998 | Nanami et al. | |
| 5,846,102 A | 12/1998 | Nitta et al. | |
| 5,855,193 A | 1/1999 | Takahashi | |
| 5,899,186 A | 5/1999 | Kawamoto | |
| 5,951,343 A | 9/1999 | Nanami et al. | |
| 6,015,320 A | 1/2000 | Nanami | |
| 6,029,638 A | 2/2000 | Funai et al. | |
| 6,145,484 A | * 11/2000 | Funakoshi et al. | 123/73 AD |

\* cited by examiner

FOUR STROKE ENGINE WITH VALVE TRAIN ARRANGEMENT

CROSS REFERENCE TO RELATED APPLICATIONS

This application relates to and claims priority on U.S. Provisional Application No. 60/185,703, filed on Feb. 29, 2000, and U.S. Provisional Application No. 60/257,174, filed on Dec. 22, 2000, which are incorporated by reference herein.

FIELD OF THE INVENTION

The present invention relates generally to a new engine for use in, for example, personal watercraft. In particular, the present invention relates to a new four-stroke in-line engine that was developed with a view to the future stricter environmental and emission regulations. The engine has an improved valve train arrangement for a lower engine profile and easy access to the spark plug assembly.

BACKGROUND OF THE INVENTION

There is a very popular type of watercraft known as a "personal watercraft" which is designed to be operated primarily by a single rider. Although this type of watercraft is commonly employed for single riders, frequently provisions are made for accommodating additional passengers although the maximum number of passengers is more limited than conventional types of watercraft.

This type of watercraft is also generally quite sporting in nature and normally accommodates at least the rider on a type of seat in which the rider sits in a straddle fashion. The passenger's area is frequently open through the rear of the watercraft so as to facilitate entry and exit of the rider and passengers to the body of water in which the watercraft is operating, as this type of watercraft is normally ridden with passengers that are wearing swimming suits.

These personal watercraft are generally quite small so that they can be conveniently transported from the owner's home to a body of water for its use. Because of the small size, the layout of the components is extremely critical, and this gives rise to several design considerations that are peculiar to this type of watercraft. However, due to its sporting nature it is also desirable if the watercraft is powered by an engine and propulsion device that are not only efficient but also generate sufficient power.

Traditionally, two-cycle engines have been used to power watercraft, including personal watercraft. These engines have the advantage that they are fairly powerful, relatively lightweight, and compact.

One particular disadvantage to the two-cycle engine is its emission content. Two-cycle engines generally exhaust larger quantities of hydrocarbons and other pollutants than four-cycle engines due to cylinder charging inefficiencies and the combustion of lubricating oil among other things. When measures are taken to reduce emissions of the two-cycle engine, other generally undesirable consequences can result, such as an increase in the weight of the engine, a reduction of its power output or the like. With concern for the environment and increasingly strict emissions requirements being instituted by various governing bodies. There is motivation to provide a power plant that reduces exhaust emissions while retaining other advantageous characteristics such as compactness, low weight and high power output.

Four-cycle engines are commonly used as power plants in other applications, such as automobiles. These engines have the advantage that their emissions output are generally desirably lower as compared to a two-cycle engine for a given power output. These engines, however, are considerably larger than two-cycle engines and therefor present difficulties when locating the engine in a personal watercraft. It is desirable to provide an engine with a reduced profile. This may be accomplished with proper configuration of the valve train arrangement and cylinder head.

U.S. Pat. No. 4,267,811 to Springer, entitled "Cylinder Head For a Mixture-Compressing Internal Combustion Engine," U.S. Pat. No. 4,553,515 to King et al., entitled "Cylinder Head For Spark Ignition Internal Combustion Engine," U.S. Pat. No. 4,662,323 to Moriya, entitled "Overhead Cam Type Valve Actuating Apparatus For Internal Combustion Engine," U.S. Pat. No. 4,741,302 to Oda et al., entitled "Internal Combustion Engine," U.S. Pat. No. 4,773,361 to Toki et al., entitled "Overhead Cam Type Four-Valve Actuating Apparatus For Internal Combustion Engine," U.S. Pat. No. 4,796,574 to Fujii et al., entitled "SOHC Type Internal Combustion Engine," U.S. Pat. No. 5,009,204 to Ishii, entitled "Spark Plug Arrangement In An Overhead Camshaft Engine," U.S. Pat. No. 5,095,859 to Iwata et al., entitled "SOHC Type Internal Combustion Engine," U.S. Pat. No. 5,513,606 to Shibata, entitled "Marine Propulsion Unit," U.S. Pat. No. 5,829,402 to Takahashi et al., entitled "Induction System For Engine," U.S. Pat. No. 5,839,930 to Nanami et al., entitled "Engine Lubricating System For Watercraft," and U.S. Pat. No. 5,846,102 to Nitta et al., entitled "Four-Cycle Engine For A Small Jet Boat" disclose various valve train arrangements for an internal combustion engine. Each discloses positioning the intake and exhaust valves at an angle within the cylinder head. Rocker arm assemblies are used to actuate the valves. None of these references, however, disclose using a single rocker arm having a pair of operating arms to operate a pair of valves such that the spark plug assembly is located between the operating arms of the rocker arm. Furthermore, none of these references provides a spark plug assembly that permits easy removal of the spark plug while protecting the same from the elements.

OBJECTS OF THE INVENTION

It is an object of the present invention to provide a four stroke, in-line engine having a compact construction.

It is another object of the present invention to provide a four stroke, in-line engine having a modular construction to permit the interchange of parts between various engine models.

It is another object of the present invention to provide a four stroke, in-line engine having improved exhaust emission characteristics.

It is another object of the present invention to provide a four stroke engine having a narrow and low profile.

It is another object of the present invention to provide a four stroke engine having a low profile valve actuation assembly for controlling the operation of the intake and exhaust valves.

It is another object of the present invention to provide a cylinder head having a low profile to reduce engine height.

It is another object of the present invention to offset the placement of the intake valves and exhaust valves with respect to a vertical axis within the cylinder head to reduce engine height.

It is another object of the present invention to provide an improved spark plug mounting assembly for easy access within the cylinder head.

It is another object of the present invention to provide a Y-shaped intake rocker arm assembly providing compact construction.

It is yet another object of the present invention to provide a four stroke engine having an improved oil collection system and oil holding tank.

It is another object to provide a four stroke engine which combines a closed loop cooling system and an open loop cooling system for enhanced cooling of the engine in accordance with the present invention.

It is another object to provide an open loop cooling system for cooling an exhaust manifold in accordance with the present invention, wherein the open loop cooling system enhances cooling of the crankcase and cylinder head.

It is another object to provide an open loop cooling system for cooling an exhaust manifold in accordance with the present invention, wherein the open cooling system lowers the temperature of the exhaust manifold such that the exhaust manifold functions as a heat sink for the crankcase and cylinder head.

It is another object of the present invention to provide a closed loop cooling system for selectively cooling the crankcase and cylinder head of the four stroke engine.

It is another object of the present invention to provide a closed loop cooling system having a selectively operable heat exchanger.

It is another object of the present invention to provide a supercharger for enhanced engine performance.

SUMMARY OF THE INVENTION

In accordance with the present invention, a four stroke internal combustion engine is disclosed. In the preferred form, the engine includes a crankcase having a crank shaft rotatably mounted therein. A cylinder head is connected to the crankcase. The crankcase and the cylinder head together form at least one cylinder. Each cylinder has at least one intake valve and at least one exhaust valve a crankshaft rotatably mounted within the crankcase. A valve actuation assembly operates the intake valves and the exhaust valves. The valve actuation assembly is located in the cylinder head between the intake valve axis and the exhaust valve axis.

In accordance with the present invention, the valve actuation assembly includes a cam shaft that is rotatably mounted within the cylinder head. It is preferable that the cam shaft is operatively coupled to the crank shaft such that rotational movement of the crankshaft is transferred to the cam shaft. A support axle is mounted within the cylinder head and offset from the cam shaft. The support axle has a central passageway. The valve actuation assembly includes at least one exhaust rocker arm is pivotally mounted within the cylinder head on the support axle. Each exhaust rocker arm is operatively coupled to the cam shaft for operating the exhaust valves. The valve actuation assembly also includes at least one intake rocker arm is also pivotally mounted within the cylinder head on the support axle. Each intake rocker arm is operatively coupled to the cam shaft for operating the intake valves.

In accordance with the present invention, the engine further includes a lubrication system for lubricating the engine. The lubrication system includes a supply of lubricant to the cylinder head. A portion of the supply of lubricant flows through the central passageway in the support axle.

In order to reduce the overall profile of the engine and provide sufficient space a spark plug assembly and the necessary crank gear to cam gear ratio, the intake valves and exhaust valves are disposed at an angle with respect to the longitudinal axis of the cylinder. To accomplish this, the cam shaft and the support axle are also offset with respect to the longitudinal axis. At least one of the cam shaft and the support axle are positioned closer to the exhaust valves than the intake valves. It is contemplated that the longitudinal axis of the spark plug assembly extends substantially parallel to the longitudinal axis of the intake valves. It is also contemplated that the longitudinal axis of the spark plug assembly and the intake valve axis may form an acute angle not greater than 20°.

In accordance with the present invention, each exhaust rocker arm includes a cam follower located on one end of the exhaust rocker arm. The cam follower is adapted to follow a profile of an exhaust cam lobe located on the camshaft to operate the exhaust valves. An exhaust hydraulic adjuster located on an opposite end of the exhaust rocker arm. Each exhaust rocker adjuster includes a slidable piston assembly that is adapted to contact and operate the exhaust valve in response to movement of the exhaust rocker arm by the exhaust cam lobe. A fluid passageway extends from the piston assembly through the exhaust rocker arm to the support axle. Fluid in the central passageway in the support axle flows through the fluid passageway to bias the piston assembly into engagement with the exhaust valve.

In accordance with the present invention, the valve actuation assembly includes an intake rocker arm for operating a pair of intake valves. Like the exhaust rocker arm, each intake rocker arm includes a cam follower located on one end of the intake rocker arm. Unlike the exhaust rocker arm, the intake rocker arm includes a first actuator arm for operating a first intake valve, and a second actuator arm for operating a second intake valve. Each actuator arm includes a slidable piston assembly, as described above. The cam follower and actuator arms have a generally Y-shape.

In accordance with the present invention, the exhaust rocker arms are rotatably mounted on the support axle on opposite sides of the intake rocker arm. A spark plug assembly is positioned on the cylinder head between the first actuator arm and the second actuator arm.

The spark plug assembly includes a tube assembly secured to the cylinder head. The tube assembly may be plastic. A spark plug connector is removably located within the tube assembly. The spark plug connector may include a splash cover to prevent contaminants from entering the spark plug assembly. A spark plug is secured to the spark plug connector.

The present invention is also directed to a personal watercraft for at least one passenger having an internal combustion engine secured to the hull below a seating assembly. The internal combustion engine includes a valve actuation assembly, as described above and described in greater detail below.

BRIEF DESCRIPTION OF THE DRAWINGS

The invention will be described in conjunction with the following drawings in which like reference numerals designate like elements and wherein.

DETAILED DESCRIPTION OF THE PREFERRED EMBODIMENTS

Figure 1:
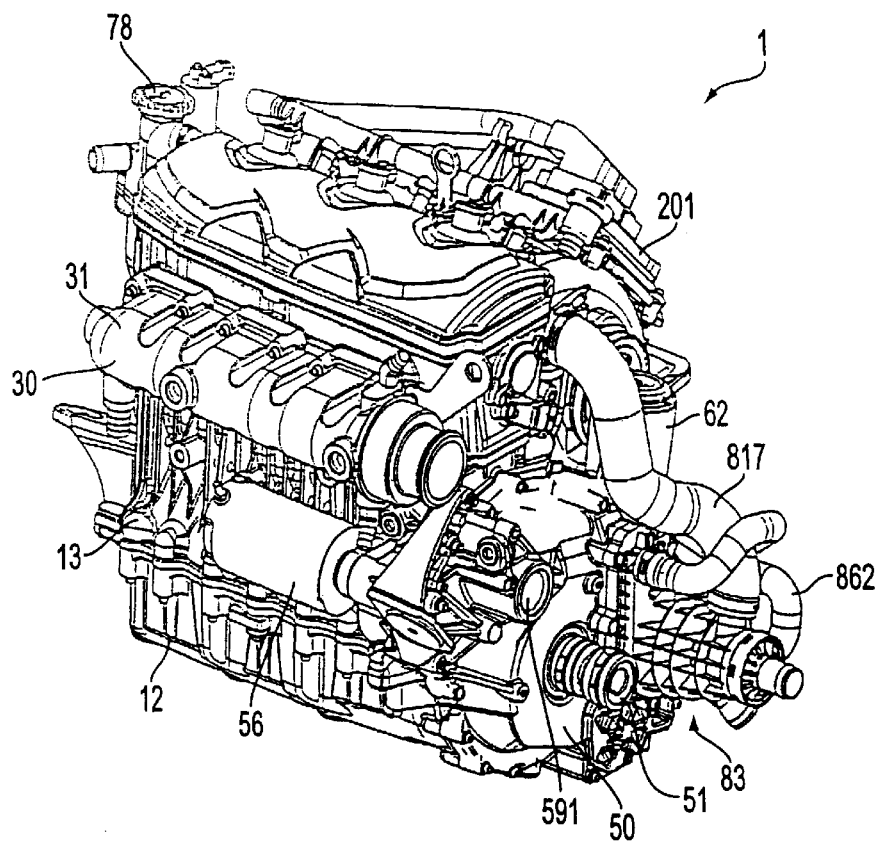
FIG. 1 is a downward rear schematic perspective view of a left side of an overhead camshaft aspirated engine in accordance with the present invention.
Figure 2:
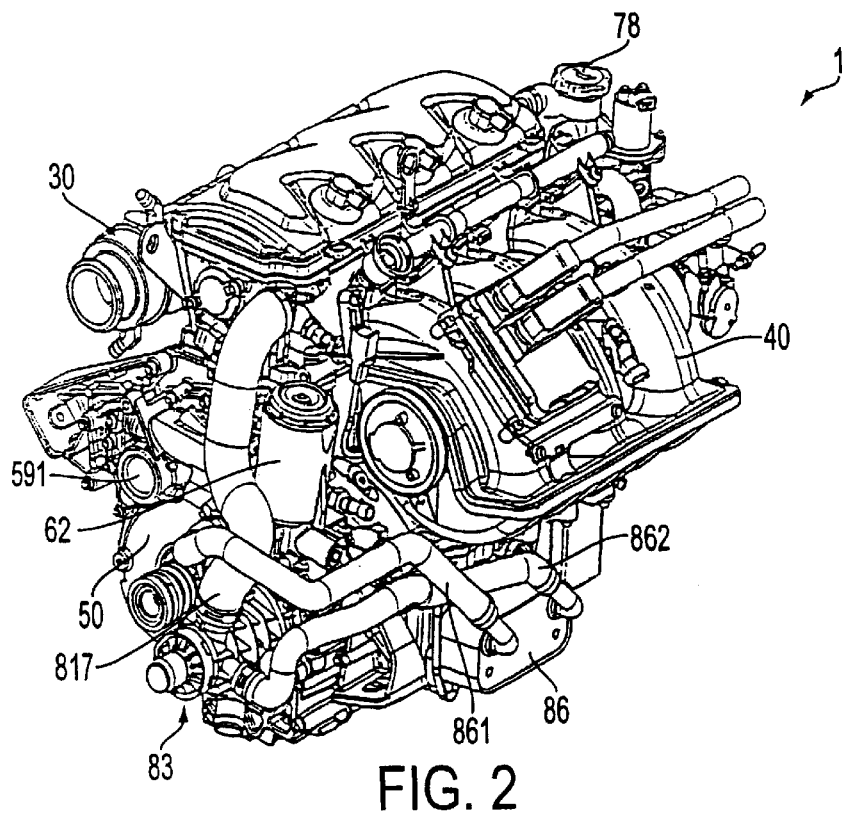
FIG. 2 is a downward rear schematic perspective view of a right side of the engine of FIG. 1.
Figure 3:
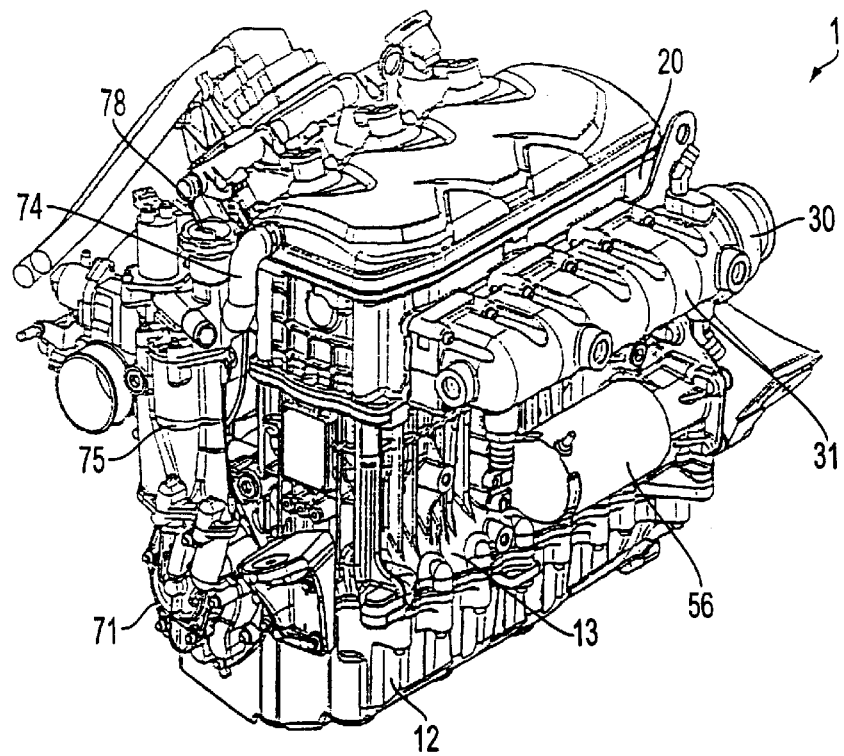
FIG. 3 is a downward front schematic perspective view of the left side of the engine of FIG. 1.
Figure 4:
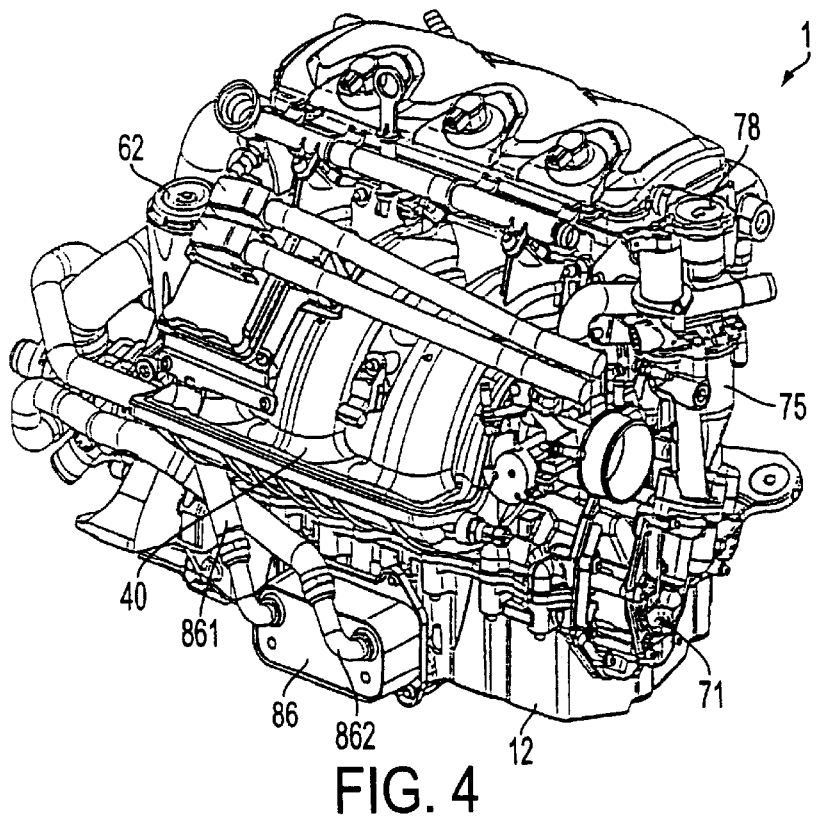
FIG. 4 is a downward front schematic perspective view of the right side of the engine of FIG. 1.
Figure 5:
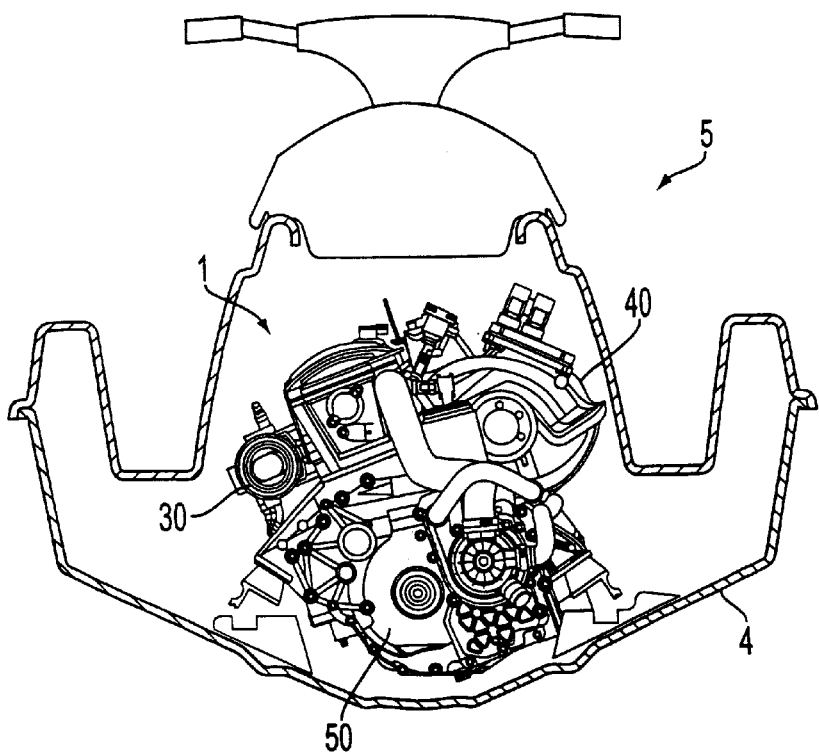
FIG. 5 is a rear end view of the engine of FIG. 1 illustrating one possible positioning of the engine within a personal watercraft.
Figure 50:
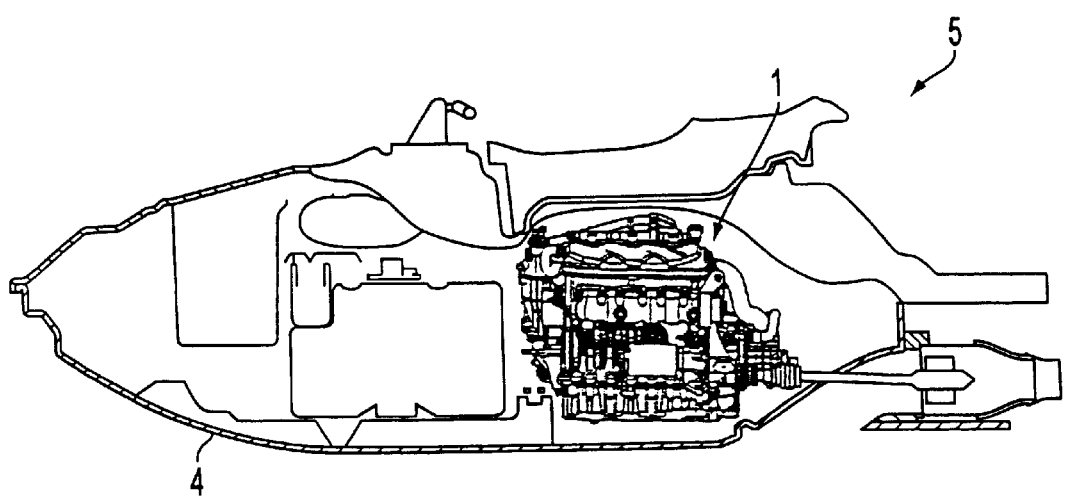
FIG. 50 is a side view of the engine of FIG. 1 illustrating one possible positioning of the engine within a personal watercraft.
Figure 6:
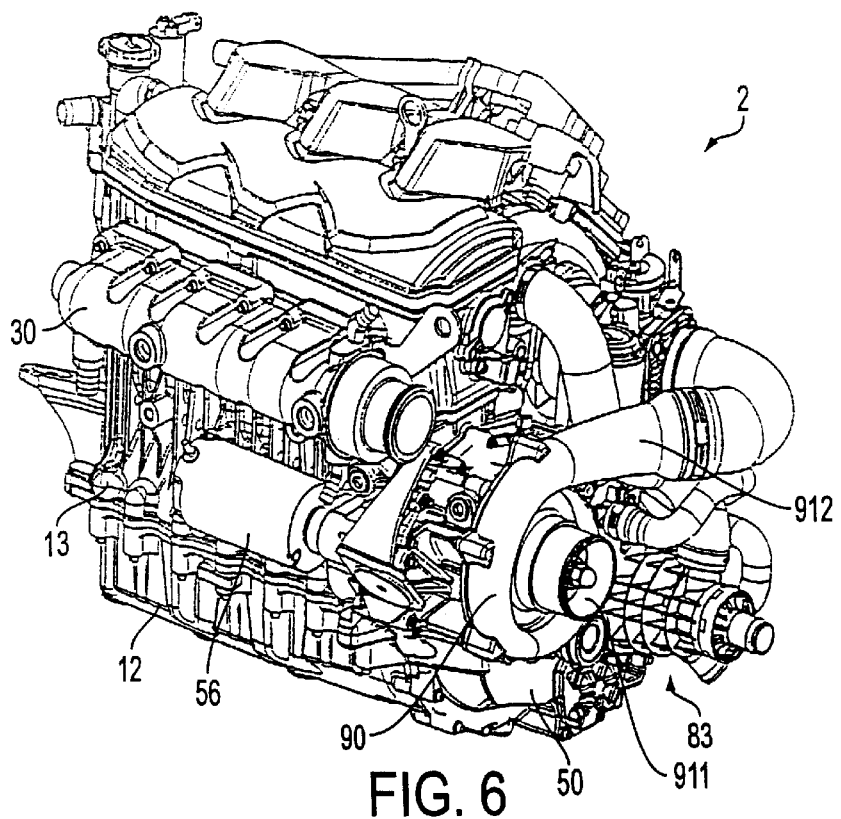
FIG. 6 is a downward rear schematic perspective view of a variation of the engine of FIG. 1 having a supercharger.
Figure 7:
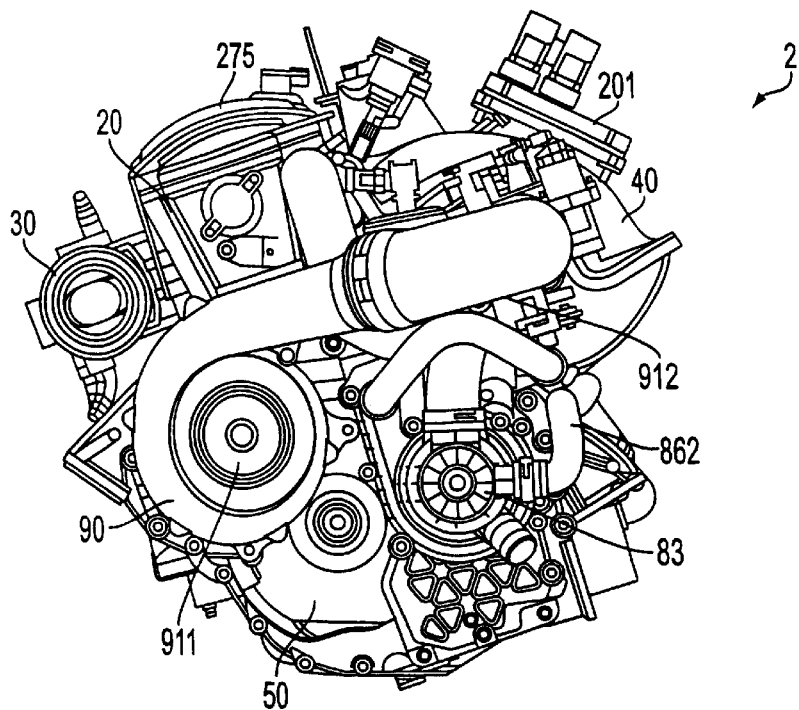
FIG. 7 is a rear end view of the engine of FIG. 6.

A four-stroke three cylinder in-line engine 1 in accordance with the present invention is illustrated generally in FIGS. 1–4. The engine 1 in accordance with the present invention will be described in connection with a personal watercraft 5, shown in cross-section in FIG. 5. A variation of the engine 1 is illustrated in FIGS. 6 and 7. The engine 2 shown in FIGS. 6 and 7 includes a supercharger. The engines 1 and 2 are adapted to be installed below a raised pedestal having a seating bench of the personal watercraft 5 inside the hull 4, as shown in FIGS. 5 and 50. With this arrangement, the oil filter cannot be placed on the lower side of the engine or of its crankcase, respectively, if it is to be accessible for maintenance purposes because the hull 4 would prevent access to the oil filter. To address this, the oil filter is installed at the power take off side of the engine, to be easily accessible from above. The access through the seating area at present is the only access to the engine.

While designed for use in personal watercraft, it is contemplated that the engine 1 (or engine 2) can be used in all terrain vehicles, snowmobiles, boats and other vehicles with minor modifications. For example, the cooling system for the exhaust manifold must be modified for non-marine applications. Further, while the embodiments shown disclose an engine positioning with the power take off to the rear of the engine, the orientation can be altered to have the power take off to the front or to the side depending on the specific vehicle or specific application.

Engine Configuration

Figure 8:
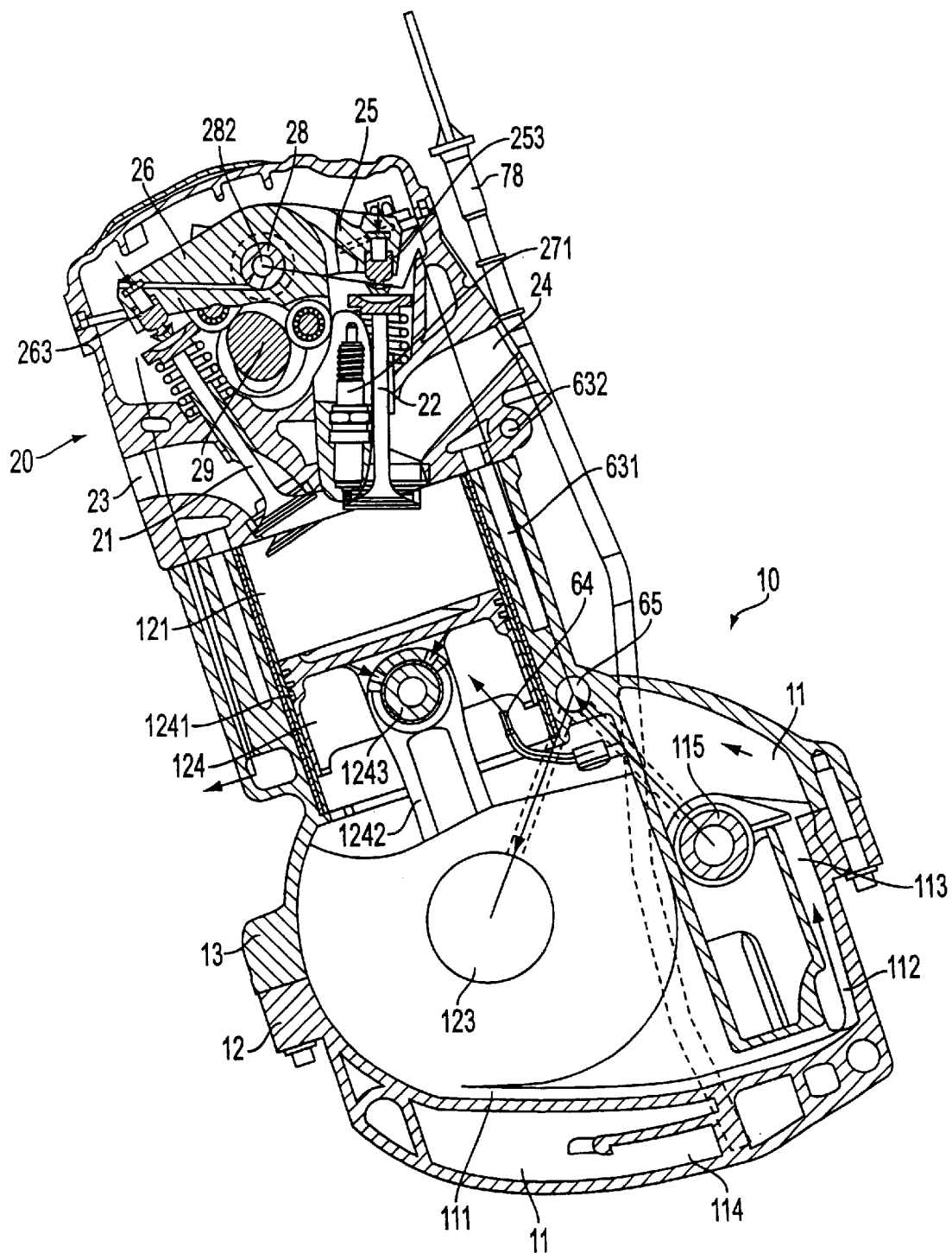
FIG. 8 is a partial cross-sectional end view of the crankcase and cylinder head housing in accordance with the present invention.

The engine 1 includes a crankcase 10. A cylinder head housing 20 is connected to the crankcase 10 to form a plurality of combustion chambers. The crankcase 10 and cylinder head housing 20 are inclined with respect to a vertical axis, as shown in FIGS. 5 and 8. This arrangement provides sufficient space for the air intake and fuel injection system 40 while maintaining an overall reduced engine profile. The engines illustrated and described herein include three cylinders. The present invention, however, is not limited to three cylinders; rather, it is contemplated that a greater or fewer number of cylinders are considered to be well within the scope of the present invention. For example, a single cylinder version of the engine may be employed in a fishing boat. Two or three cylinder versions of the engine may be employed in a personal watercraft. A four cylinder version of the engine may be employed in a jet boat. Four or more cylinders are considered to be well within the scope of the present invention.

The engine 1 or 2 provides for the location of various engine components including, but not limited to the starter assembly, the generator, the oil pump, coolant pump and other devices at one end of the engine in the power take off assembly 50, described below and shown in FIGS. 33, 36, 37 and 38. This unique construction and layout of components permits the use of similar parts and engine components for one, two, three and four cylinder versions of the engine. Furthermore, this arrangement permits the addition of additional cylinders on the end of the engine opposite the power take off assembly. The layout of the parts is the same. Minimal redesign of these components is necessary when increasing or reducing the number of cylinders.

The engine 1 contemplated herein includes an exhaust manifold 30 that is secured to one side of the cylinder head housing 20 and an air intake and fuel injection system 40. The air intake and fuel injection system 40 is secured to an opposite side of the cylinder head housing 20 in the area above the cylinder head housing 20.

The present invention, however, is not limited to having a fuel injection system; rather, it is contemplated that the engine can instead be equipped with a carburetor.

Figure 11:
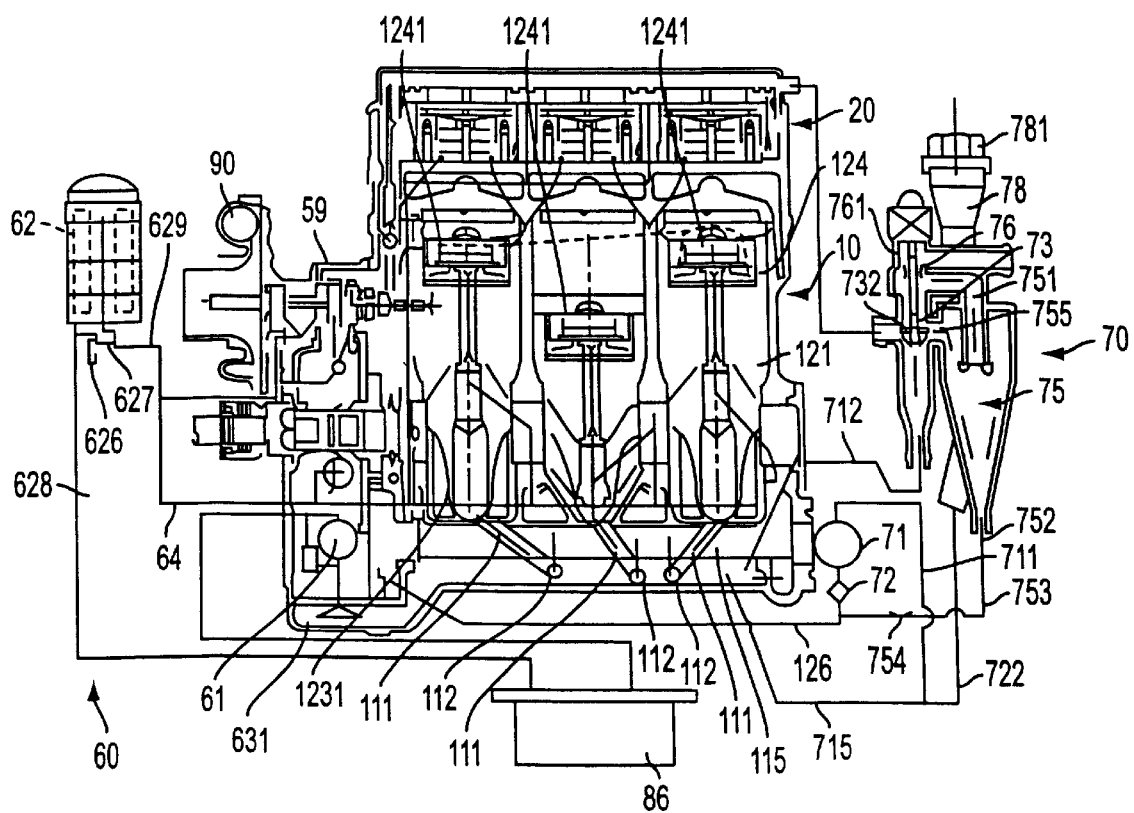
FIG. 11 is a right side partial schematic sectional view of the engine of FIG. 6.
Figure 25:
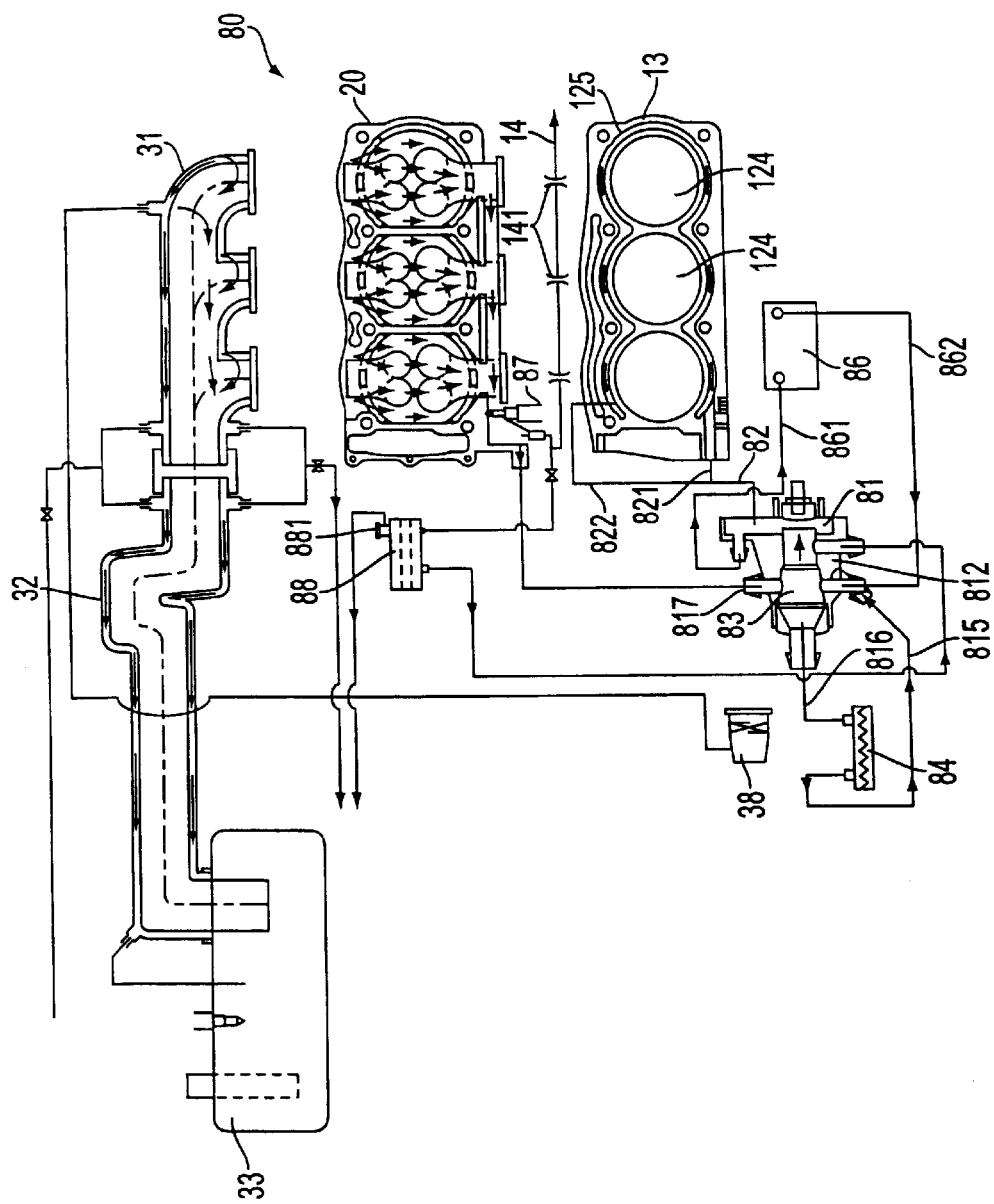
FIG. 25 is a schematic diagram of the cooling system for the engine in accordance with the present invention.
Figure 26:
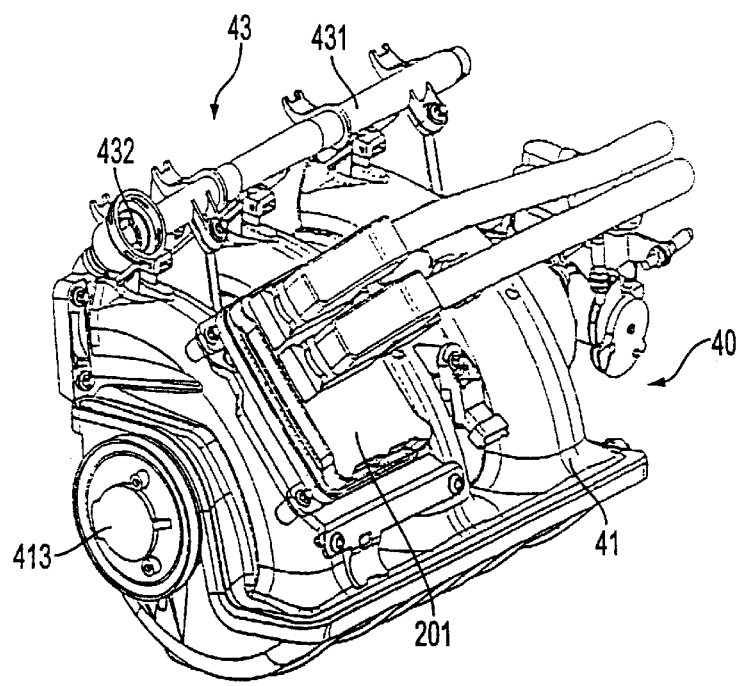
FIG. 26 is a rear perspective view of a right side of the air intake and fuel injection system for the engine in accordance with the present invention.

A power take off assembly 50 is located on an end of the cylinder block 10 within the hull 4. The power take off assembly 50 defines the rear side of the engine when located within the personal watercraft 5. The engine 1 or 2 further includes a lubrication system 60 as shown in FIGS. 8 and 11. The engine 1 further includes a blow-by ventilation system 70, as shown in FIG. 11, and an engine cooling system 80, as shown in FIG. 25.

An engine 2 is shown in FIGS. 6 and 7, which is a variation of the engine 1. The engine 2 has substantially the same configuration as the engine 1. The engine 2 further includes a supercharger 90. The use of a supercharger for an engine for use in a personal watercraft is a new development, which is described in greater detail below. The engine 1 can be converted with minor modification to the engine 2 having a supercharger 90. In particular, as described below, the supercharger 90 is attached to an opposite end of the intake manifold 41 as compared to the normally aspirated engine 1. The ignition and induction parameters of the engine may be modified to enhance engine performance when the supercharger 90 is used. It is also contemplated that the compression ratio of the engine may have to be altered to accommodate the supercharger 90. In accordance with the present invention, it is contemplated that the engines 1 and 2 will be produced on the same assembly line.

Because it is contemplated that the engine in accordance with the present invention will be used in marine applications, the exterior surfaces of the engines 1 or 2 will be provided with a suitable coating to reduce corrosion and the direct exposure of the engine to the elements. The individual components of the engines 1 and 2 will now be described in greater detail.

Crankcase

Figure 9:
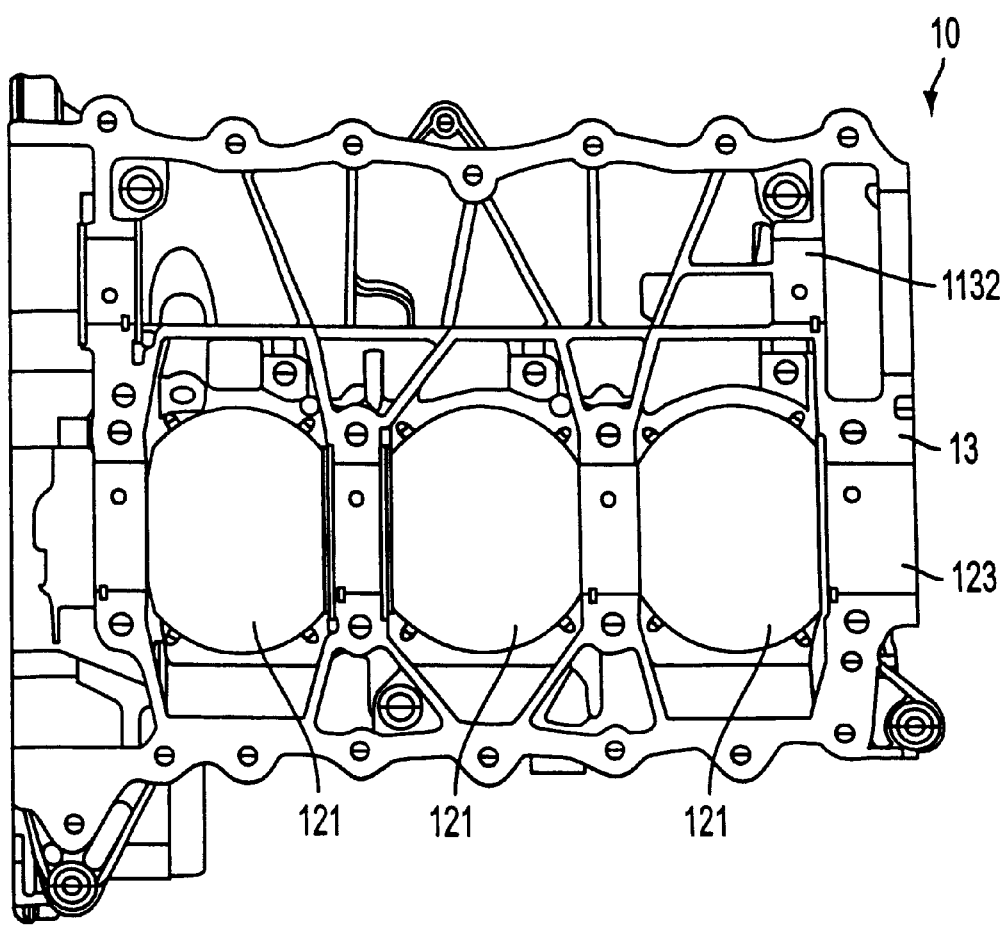
FIG. 9 is a bottom view illustrating the upper crankcase of the engine in accordance with the present invention.
Figure 10:
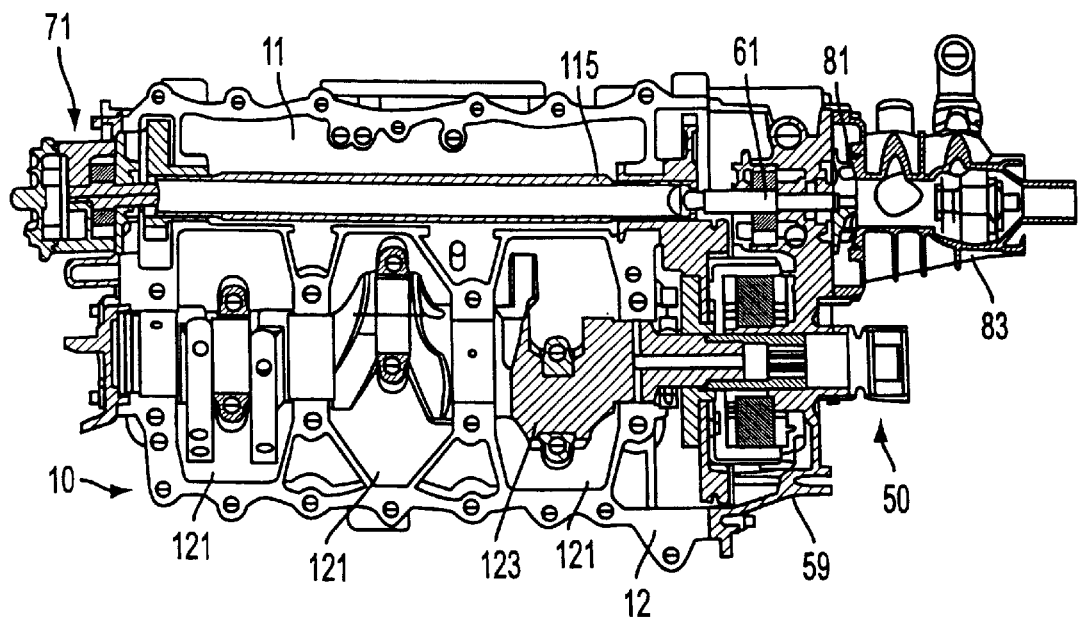
FIG. 10 is a top view of the lower crankshaft illustrating the positioning of the crankshaft and the balance shaft.

As illustrated in FIG. 8, the crankcase 10 contains a plurality of passageways and compartments formed therein. Furthermore, the crankcase 10 is formed with vertical partitions, as shown in FIGS. 9 and 10, which separate the individual crank chambers, described below and external fins located on the crankcase 10. These vertical partitions and external fins increase the strength of the crankcase 10. The spaced apart vertical fins provide additional strength for an upper crankcase 13 of the crankcase 10 while minimizing the weight. The vertical partitions increase engine strength and separate the crank chambers 121 in the upper and lower crankcases 12 and 13. The vertical partitions also secure the upper and lower crankcases together using suitable fasteners. The fasteners extend through bores in the vertical partitions from a lower end of the lower crankcase to the upper crankcase. The fasteners also serve to secure the bearings, described below, within the vertical partitions. The crankcase 10 is preferably formed from a cast aluminum alloy (e.g. AlSi) for both strength and weight considerations. The crankcase 10 is preferably die cast. The present invention, however, is not limited to the use of aluminum alloys; rather, other materials including but not limited to steels, alloys and composites are considered to be well within the scope of the present invention provided the materials have sufficient strength for use in engine applications.

The crankcase 10 includes an upper crankcase 13 containing the cylinder block and a lower crankcase 12. A balance shaft 115 and a crankshaft 123 are located at the union between the lower crankcase 12 and the upper crankcase 13. An oil tank 11 formed in a bottom portion of the lower crankcase 12, as shown in FIG. 8. The oil tank 11 has a generally u-shaped configuration that partially surrounds a lower portion of a crankcase 12. The oil tank 11 is located on both the bottom and side of the engine to house the necessary volume of oil while maintaining the engine's reduced profile such that oil is located on the bottom of the crankcase and the e side of the crankcase 10. An interior of the upper crankcase 13 and the lower crankcase 12 are connected to the oil tank 11 through outlet openings 111, as shown in FIGS. 8 and 11. A channel 112 extends from each opening 111 to an upper portion 113 formed in the lower crankcase 13. The oil collected from the crank chamber 121 flows through outlet openings 111 and channels 112, then enters the upper channel portion 113 and returns to the oil tank 11. This oil then flows under the influence of gravity downward into a lower portion 114 of the oil tank 11.

A balance shaft 115 extends through the crankcase 10. The balance shaft 115 and the crankshaft 123 are located at the union of the lower crankcase 12 and the upper crankcase 13. To prevent oil from flowing from upper channel portion 113 and contacting the balance shaft 115, an optional baffle assembly is located within the upper portion 113. The balance shaft 115 is provided to counteract the moment generated by rotation of the crankshaft 123, shown in FIG. 10. This arrangement produces mass balancing of the first order. The balance shaft 115 and the crankshaft 123 extend in a parallel relationship, as shown in FIG. 10. The balance shaft 115 is rotatably mounted within a bore 1132 that extends through the crankcase 10, as shown in FIGS. 9 and 10. Suitable bearing assemblies are provided for smooth rotation of the balance shaft 115. The bearing assemblies are fixed using the fasteners described above. Preferably, the balance shaft 115 should be mounted in an anti-friction shell bearing but, alternatively, roller bearings can also be used. The balance shaft 115 is operatively connected by gear 1151 to the crankshaft 123 through gear 1231. This connection is preferably located within the power take off assembly 50 on one end of the crankcase 10.

The oil tank 11 forms a portion of a dry sump lubrication system. The lubrication system and the operation of the same will be described in greater detail below.

As FIGS. 9 and 10 illustrate, the crankcase 10 includes at least one crank chamber 121 and in the preferred embodiment includes one isolated crank chamber for each engine cylinder. In accordance with the presently disclosed embodiments of engines 1 and 2, three crank chambers 121 are provided. Each crank chamber 121 includes an outlet opening 111 connected to the channel 112, described above. A bore 122 extends through the crankcase 10 and each of the crank chambers 121, as shown in FIGS. 9 and 10. A crankshaft 123 is received therein, as shown in FIG. 10. The crankshaft 123 can be a one-piece forging, cast or assembled depending upon the engine application. For example, a cast crankshaft may be used in low performance applications. The crankshaft 123 is rotatably mounted within a bore 122. Suitable bearing assemblies are provided for smooth rotation of the crankshaft 123.

As shown in FIG. 25, a cylinder 124 extends through the crankcase 10 above each of the crank chambers 121. In accordance with the present invention, the engines 1 and 2 each include three cylinders 124, as shown in FIG. 11. A piston 1241 is slidably received within the cylinder 124. The piston 1241, shown in FIG. 11, reciprocates axially within the cylinder 124 as is known. The piston 1241 is connected to the crankshaft 123 through a connecting rod 1242 and piston pin 1243 to convert axial movement of the pistons 1241 to rotational movement of the crankshaft 123 and vice-versa. A cooling passageway 125 extends around the cylinders 124, as shown in FIG. 25. The cooling passageway 125 is connected to the engine cooling system 80 further described below. As shown in FIG. 25, the cooling passageway 125 extends substantially around the perimeter of the cylinders. This passageway has a generally U-shaped configuration.

At present, the cylinder liners are formed with grey cast iron. The upper crankcase 13 is then cast around the liners. The upper crankcase 13 may be formed from under-eutectic AlSi (e.g. cast-AlSi 9)(with 9% silicon). The interior of the cylinder liners may then be honed. The use of grey cast iron increases the weight of the crankcase 13. It is desirable to eliminate the use of the cylinder liners. With this in mind, it is contemplated that the cylinder liners may be eliminated. Instead, an interior surface of the upper crankcase 13 can include a thermal coating to reduce friction. This coating may be applied plasma spraying or other suitable process. Alternatively, AlSi-alloys (alloys of aluminum and silicon) are used to form the liners for the cylinders 124. The cylinder liners may be formed from over-eutectic AlSi with primary silicon grains therein (e.g. AlSi 19)(with 19% silicon) to minimize friction and wear. The crankcase 10 may be formed from under-eutectic AlSi (e.g. cast-AlSi 9)(with 9% silicon). The cylinder liners are assembled to the cylinder block during the casting of the upper crankcase 13. Beforehand, a binding layer consisting of eutectic AlSi 12 (with 12% silicon) is thermally sprayed (e.g. plasma sprayed) onto the outer wall of the liner to provide a better bond and a better heat-removal property (high heat transfer coefficient) between the liner and the cylinder block 10. Alternatively, the cylinder liners can also be inserted into the cylinder block of the upper crankcase 13 mechanically with a force fit. It is also contemplated that the cylinder block 10 can be formed from over-eutectic AlSi (e.g. AlSi 19) without the need for separate cylinder liners. With this arrangement, however, the cylinder is more difficult to machine, more expensive and thus, is not presently preferred. In such a liner-less embodiment, the cylinders can be optionally provided with a surface coating for enhanced wear and friction properties. It is contemplated that the pistons 1241 may be formed of aluminum coated with iron.

Cylinder Head Housing

The cylinder head housing 20 is secured to the upper end of the crankcase, as shown in FIG. 8. The cylinder head housing 20 is bolted to the crankcase and provides a combustion chamber 201 above each cylinder 124. A pair of exhaust valves 21 and a pair of intake valves 22 are mounted in each combustion chamber 201. As shown in FIG. 11, the pair of exhaust valves 21 are located on one side of the cylinder head housing 20 and the pair of intake valves 22 are located on an opposite side of the cylinder head housing 20. The present invention, however, is not limited to a pair of exhaust valves and a pair of intake valves; rather, a single exhaust valve and a single intake valve may be employed. Furthermore, more than two intake and exhaust valves may be provided. Furthermore, any combination of intake and exhaust valves is contemplated provided each cylinder includes more intake valves than exhaust valves.

As shown in FIG. 8, the intake valves 22 and the exhaust valves 21 are disposed at an angle with respect to the vertical axis of the engine 1 or 2. This reduces the height of the cylinder head housing 20, which reduces the overall height of the engine 1 or 2.

Figure 12:
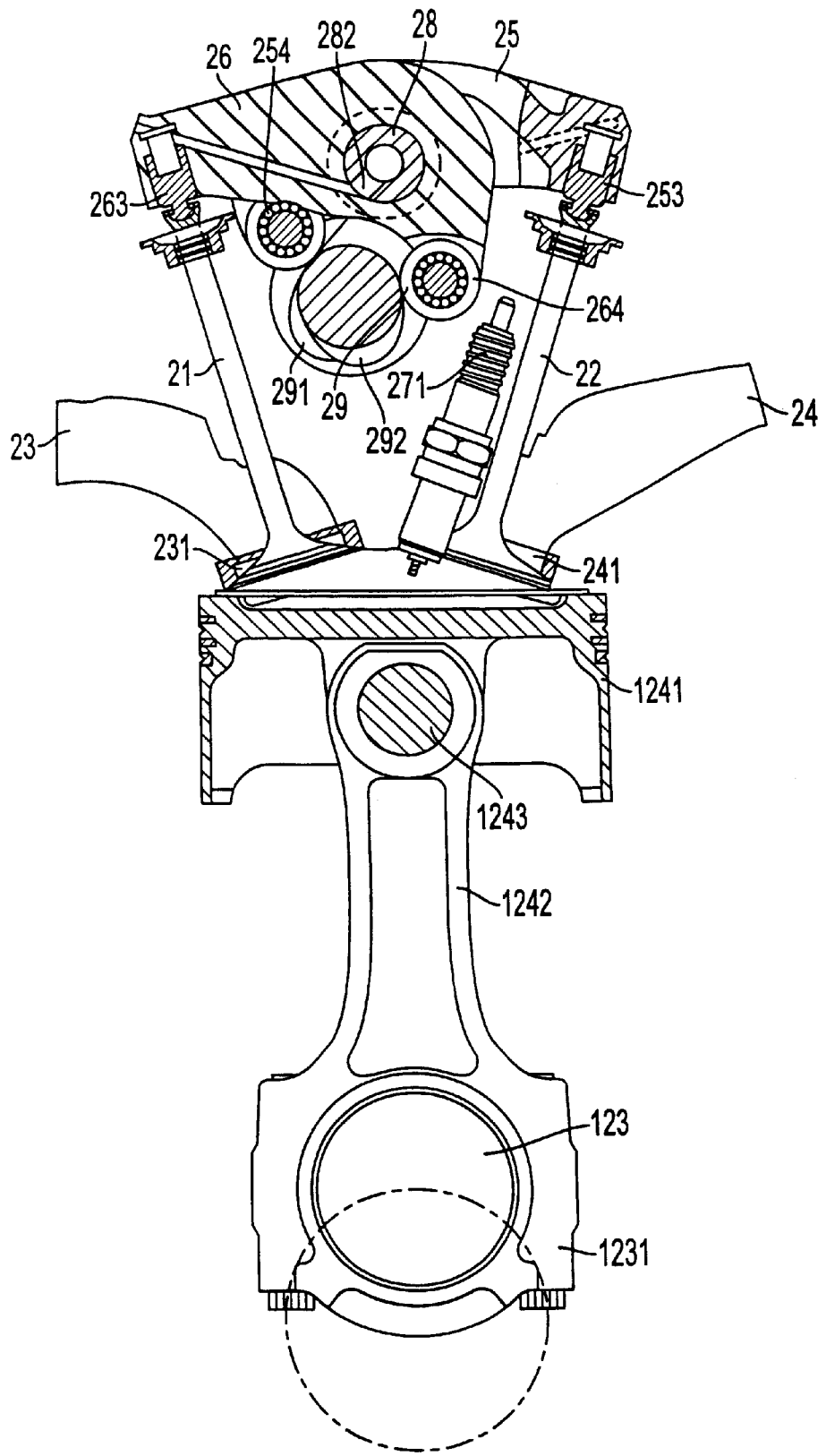
FIG. 12 is a partial schematic sectional view of the piston, valves and valve actuator assembly in accordance with the present invention.
Figure 13:
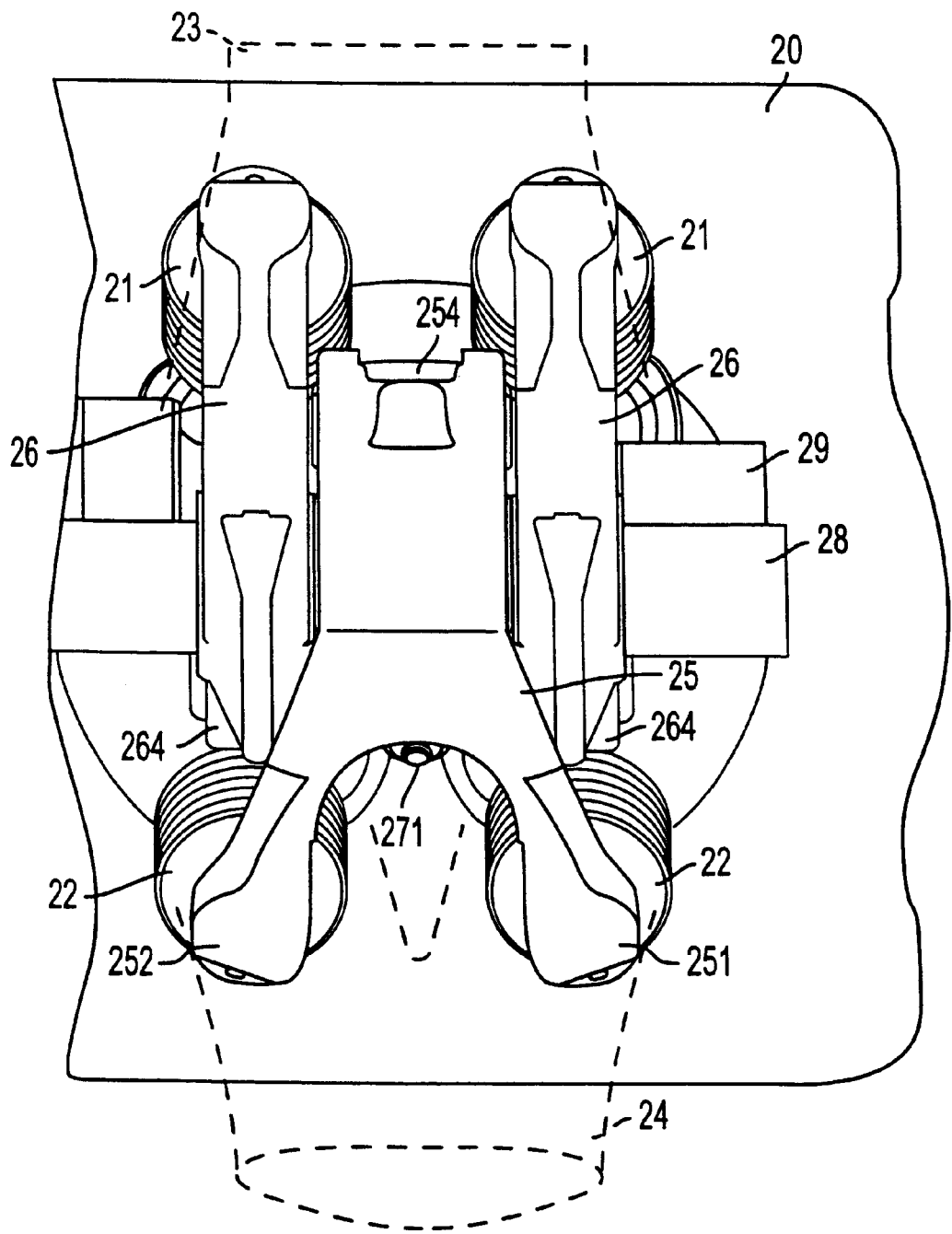
FIG. 13 is a partial overhead schematic view of the rocker arm assemblies of the valve operating assembly for operating the intake and exhaust valves.
Figure 14:
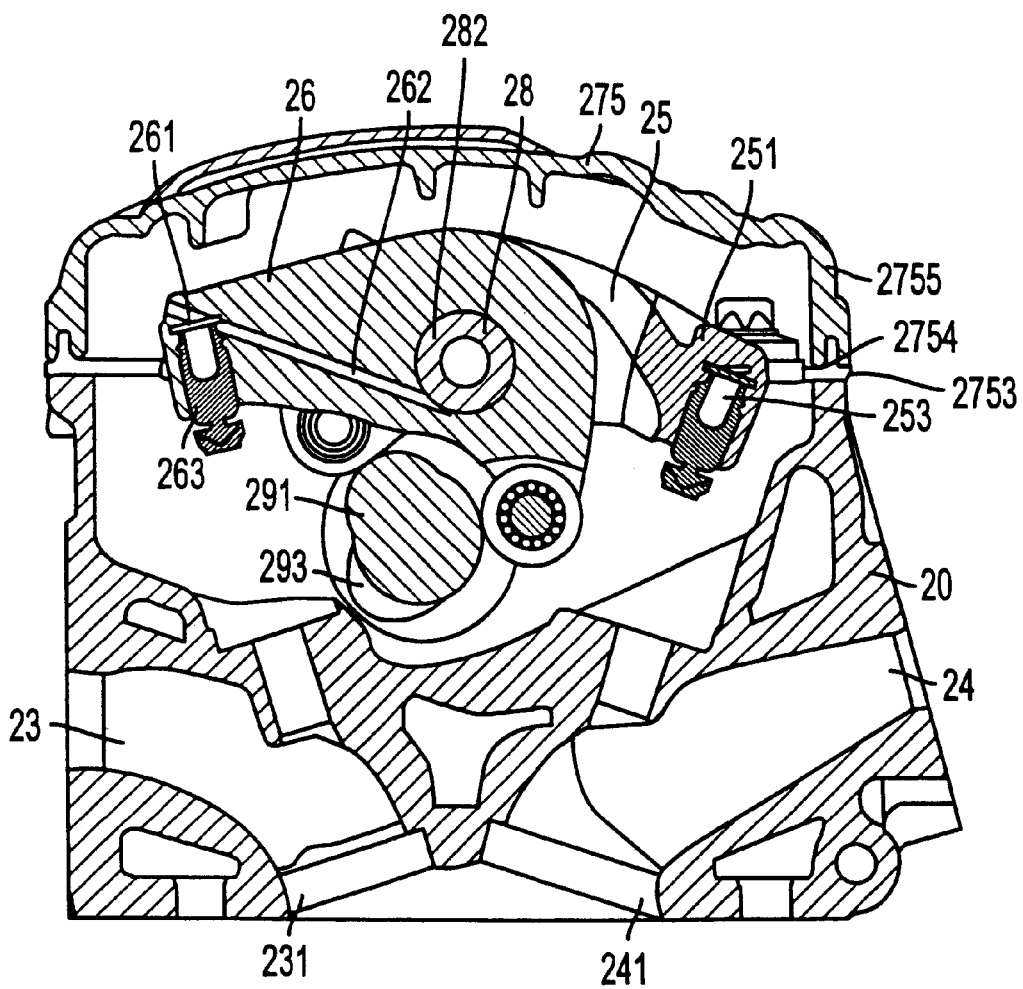
FIG. 14 is an end cross sectional view of one of the exhaust rocker arm assemblies and a portion of the intake rocker arm assembly taken along section line 14—14 of FIG. 13.

The cylinder head housing 20 further includes at least one exhaust passageway 23 for each combustion chamber 201 extending through the cylinder head housing 20, as shown in FIGS. 8, 12 and 13. The passageway 23 includes a pair of siamesed exhaust ports 231 that connect the exhaust passageway 23 to the chamber 201, as shown in FIGS. 12 and 13. Each of the pair of exhaust valves 21 is positioned in one of the respective exhaust ports 231 to selectively open and close the ports 231 at predetermined intervals to permit the removal of exhaust gases from the chamber 201. An opposite end of the exhaust passageway 23 has an opening 232, as shown in FIG. 14, that is operatively connected to the exhaust manifold 30. The exhaust manifold 30 is secured to the cylinder head housing 20 using suitable fasteners on a downwardly facing side of the cylinder head housing 20, as shown FIG. 5.

The cylinder head housing 20 further includes at least one intake passageway 24 for each cylinder 124 extending through the cylinder head housing 20, as shown in FIGS. 8, 12 and 13. The passageway 24 includes a pair of siamesed intake ports 241 that connect the intake passageway 24 to the chamber 201. Each of the pair of intake valves 22 is positioned in one of the intake ports 241 to selectively open and close the openings 241 at predetermined intervals to permit the influx of fuel and air into the chamber 201. An opposite end of the intake passageway 24 has an opening 242, as shown in FIG. 14, that is operatively connected to the air intake and fuel injection system 40. The air intake and fuel injection system 40 is secured to the cylinder head housing 20 opposite the exhaust manifold 30 using suitable fasteners on an upwardly facing side of the cylinder head housing 20, as shown in FIG. 5. While the intake and exhaust ports are shown as being siamesed, they can alternatively remain separated until connected to the respective intake and exhaust manifolds. The cylinder head housing 20 includes a spark plug assembly 28 that is located in a central inclined position, as described in greater detail below.

Valve Operating Assembly

A valve operating assembly illustrated in FIGS. 8 and 12–17 operates the intake valves 22 and exhaust valves 21 in accordance with predetermined engine operating parameters. The valve operating assembly is located within the cylinder head housing 20 and is driven by the crankshaft 123. As discussed in greater detail below in connection with the power take off assembly 50, the crankshaft 123 extends from the crankcase 10 into a power take off housing 59. A gear assembly 54 is secured to the crankshaft 123 within the power take off housing 59 and includes a chain gear 542.

A cam shaft 29 is rotatably mounted within the cylinder head housing 20. One end of the cam shaft 29 extends into a control chain chamber 202 within the cylinder head housing 20. The control chain chamber 202 extends into the cylinder block of the upper crankcase and enters the power take off assembly 50. A cam gear 293 is operatively coupled to a chain gear 542 by a control chain 55, which extends around both the gear 293 and gear 542. The control chain 55 extends through the control chain chamber 202 into the power take off assembly 50. The cam gear 293 and chain gear 542 are sized to have a 2 to 1 relationship.

Figure 16:
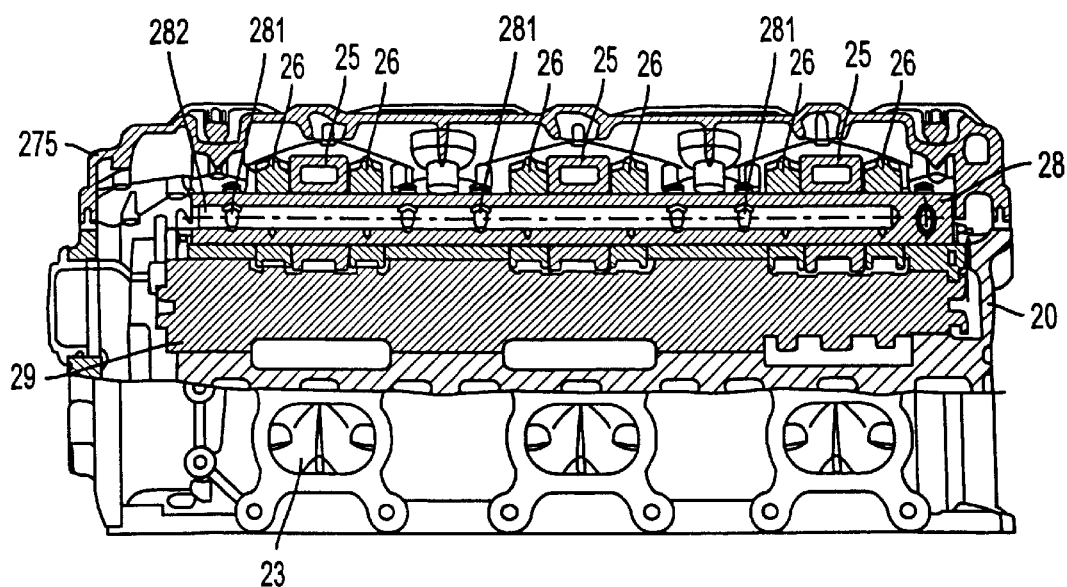
FIG. 16 is a right side cross sectional view of the valve operating assembly located within the cylinder head having the camshaft in cross section.
Figure 17:
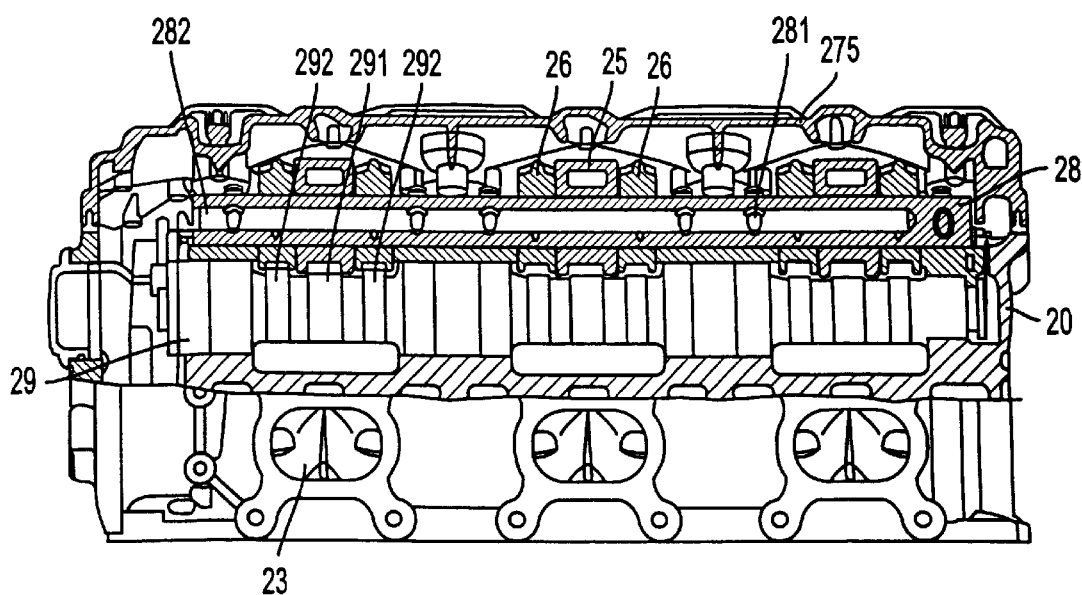
FIG. 17 is another right side cross sectional view of the valve operating assembly located within the cylinder head.

The camshaft 29 is rotatably mounted to the cylinder head housing 20 in a position between the intake and exhaust valves 21 and 22. Suitable bearing assemblies are provided for the smooth operation and rotation of the camshaft 29 within the cylinder head housing 20. As shown in FIG. 12, a plurality of cam lobes 291 and 292 are provided along the camshaft 29 to operate the valves 21 and 22 in each cylinder. A cam lobe 291 provides the necessary motion to operate the intake valves 22 through the rocker arm assembly 25. A pair of cams 292 provide the necessary motion to operate the exhaust valves 21 through the rocker arm assemblies 26. A cam 291 and a pair of cams 292 are positioned over each cylinder, as shown in FIGS. 16 and 17. The cams 291 and 292 are oriented on the camshaft 29 to produce a predetermined timing for opening and closing the valves 21 and 22. The orientation of the cams 291 and 292 vary for each cylinder such that all cylinders do not operate at the same time, rather the cylinders operate in a predetermined sequence. While the camshaft 29 is illustrated with a solid construction, it is contemplated that the camshaft 29 may have a hollow construction. Furthermore, the camshaft may be forged, cast or assembled.

The valve operating assembly includes a Y-shaped intake rocker arm assembly 25 that operates both of the pair of intake valves 22, as shown in FIG. 13, in response to the cam lobe 291. The valve operating assembly further includes a pair of exhaust rocker arm assemblies 26 that operate the pair of exhaust valves 21, as shown in FIG. 13, in response to cam lobes 292. The intake rocker arm assembly 25 is a forked assembly rocker arm having a pair of valve operating arms 251 and 252. One operating arm 251 operates one of the intake valves 22 and the other operating arm 252 operates the other intake valve 22. The fork like shape of the rocker arm assembly 25 provides access to the spark plug assembly 27 positioned within the cylinder head housing 20. The spark plug assembly 27 will be described in greater detail below. The fork like shape of the rocker arm assembly 25 reduces the overall width of the necessary assemblies to operate the valves for each cylinder.

In an effort to reduce the weight of the rocker arm assemblies 25 and 26, the rocker arm assemblies 25 and 26 may be produced from an aluminum alloy (AlSi) by forging or casting. The present invention, however, is not limited to rocker arm assemblies formed from aluminum; rather, it is contemplated that other materials including but not limited to steel and alloys of the same may be cast or forged to form the rocker arm assemblies 25 and 26.

Figure 18:
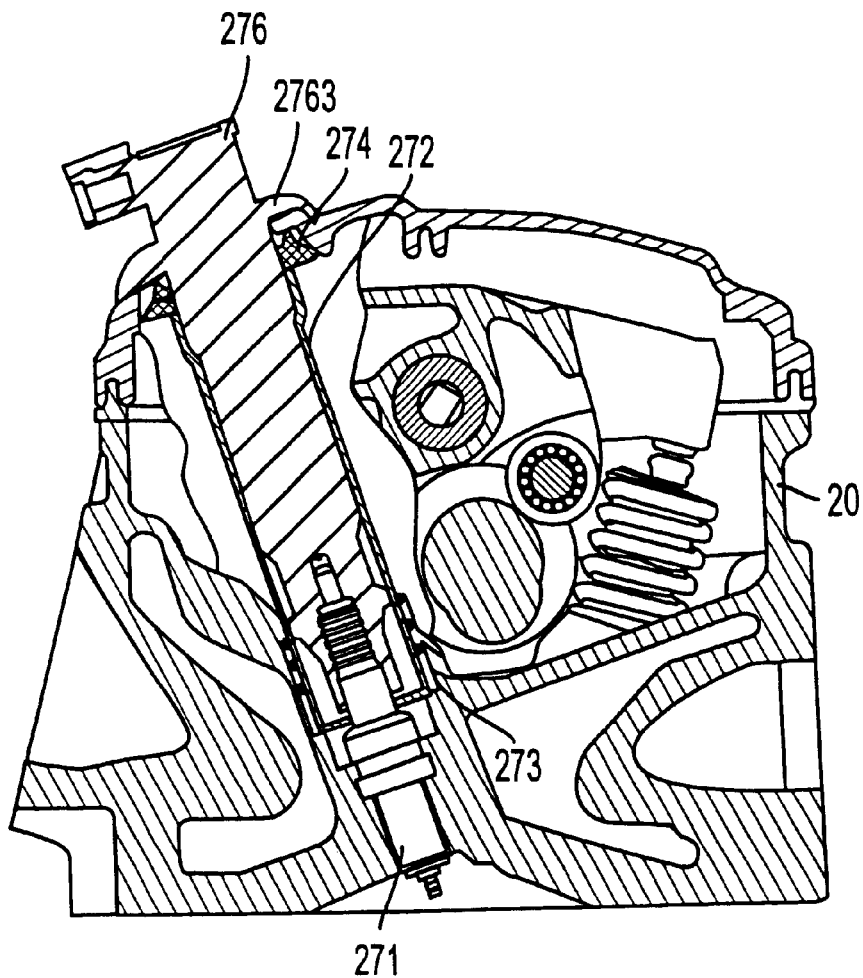
FIG. 18 is an end cross sectional view illustrating the spark plug assembly within the cylinder head.

The rocker arm assemblies 25 and 26 are rotatably mounted on a rocker arm support axle 28 in a position between the intake and exhaust valves 21 and 22. The stationary support axle 28 is mounted to the cylinder head by a plurality of fastener assemblies 281, as shown in FIGS. 16 and 17. The fastener assemblies 281 may include screw type fasteners, pin fasteners or other similar fastener assemblies for securing the support axle 28 within the cylinder head housing 20 and preventing its rotation. The rocker arm support axle 28 is mounted to the cylinder head housing 20. The axle 28 is laterally offset and vertically spaced from the camshaft 29, as shown in FIGS. 12, 14 and 18. This arrangement results in a compact construction that reduces the overall height of the cylinder head housing 20. It is contemplated that the axle 28 may be located on the vertical axis of the cylinder or adjacent to the same.

The camshaft 29 is operatively connected to the crankshaft 123, as described below. The cam gear associated with the crankshaft gear are sized to have a 2 to 1 relationship. The angled intake and exhaust valves 21 and 22 provide an enlarged area within the cylinder head housing 20 between the valves in which to locate the cam shaft, axle and the rocker arm assemblies 25 and 26. This also provides sufficient space to maintain the 2 to 1 relationship between the cam gear and the crankshaft gear without increasing the height of the cylinder head housing 20.

The rocker arm assembly 25 will now be described in greater detail, reference being made to FIGS. 12 and 14. As described above, the rocker arm assembly 25 has a pair of operating arms 251 and 252. A free end of each of the pair of operating arms 251 and 252 is positioned over a respective intake valve 22 and includes an hydraulic adjuster 253 for contacting the intake valve 22. The hydraulic adjuster 253 abuts the upper surface of the valve stem of the intake valve 22. The hydraulic adjuster 253 is located within a cavity 2511 and 261 in the respective arm 251 and 252. A passageways 2512 and 262 extend from the cavities 2511 and 262, respectively, to the rocker arm support axle 28. The passageways 2512 and 262 are hydraulically linked to the rocker arm supportaxle 28. The rocker arm support axle 28 includes a central passageway through which a supply of hydraulic fluid (preferably lubricant from the lubricant system) or other suitable lubricant flows. The fluid passes from the central passageway through radial openings 282 to the passageways 2512 and 262. The fluid flows through the passageways 2512 and 262 to the cavities 2511 and 261 where it biases the hydraulic adjuster 253 into contact with the intake valve 22. The fluid insures that the hydraulic adjuster 253 is always in contact with the intake valve 22 such that zero lash exists between the valve and hydraulic adjuster 253. This insures that the entire motion of the cam 291 is transferred to the intake valves 22 to facilitate their opening and closing. Although fluid is used to bias the hydraulic adjuster 253 into engagement with the valves 22 in the embodiment illustrated, it is contemplated that a screw adjuster assembly or other mechanical assembly can be provided to perform the same operation.

An opposite end of the rocker arm assembly 25 includes a cam follower 254. The follower 254 may include a roller assembly having bearings that is rotatably mounted to the rocker arm assembly 25. The follower 254 travels along the cam 291, which causes the rocker arm assembly 25 to pivot about the rocker support axle 28. The motion of the cam 291 is transferred to open and close the intake valves 22. Fluid from the central passageway 281 may be directed through another passageway, not shown, in the rocker arm assembly 25 to provide a supply of fluid to lubricate the follower assembly 254 to provide for smooth operation. The present invention, however, is not limited to the roller followers described herein; rather, it is contemplated that other followers including but not limited to sliding blocks may be utilized to follow the cam 291.

The rocker arm assembly 25 has a compact angled construction, as shown in FIG. 14 so as to allow for a narrow and low construction. Similarly, the low arrangement of the camshaft 29 and associated drive chain wheel, which also does not project beyond the cylinder head housing 20, as seen in FIGS. 16 and 17 assists in constructing an engine with a narrow and low profile.

As seen in FIGS. 8, 12 and 14, the camshaft 29 and the support axle 28 are offset relative to the longitudinal axis of the cylinder. The camshaft 29 is offset to provide room for the spark plug assembly 27, described below. Both the camshaft 29 and the support axle 28 are located closer to the exhaust valves 21 than the intake valves 22. The offset nature of the support axle 28 increases the overall length of the intake rocker arm assembly 25. This increases the lever arm of the intake rocker arm assembly 25 and maximizes the force (within the size constraints of the cylinder head housing 20) applied to operate both intake valves 22 with one rocker arm assembly. The intake and exhaust valves are disposed at an angle with respect to the cylinder axis. In principle, however, also other geometries (e.g. with a central arrangement of the camshaft 29) are conceivable. Alternatively, the rocker arm support axle 28 may be located closer towards the intake valves so as to make the forked operating arms 251 and 252—which are heavy due to this construction—shorter and thus less heavy. With this arrangement, the location of the camshaft 29 should also be relocated to maintain the lever arm of the intake rocker arm assembly 25.

The rocker arm assemblies 26 will now be described in greater detail. Each exhaust rocker arm assembly 26 has the same construction. A free end of the rocker assembly 26 is positioned over a respective exhaust valve 21 and includes a hydraulic adjuster 263 for contacting the exhaust valve 21. The hydraulic adjuster abuts the upper surface of the valve stem of the exhaust valve 21. Like the hydraulic adjuster 253, the hydraulic adjuster 263 is located within a cavity 261. A passageway 262 extends from the cavity 261 to the rocker arm support axle 28. The passageway 262 is hydraulically linked to the rocker arm support axle 28 through radial openings 282. The fluid flows through the passageway 262 to the cavity 261 where it biases the operating assembly 263 into contact with the exhaust valve 21. The fluid ensures that the hydraulic adjuster 263 is always in contact with the exhaust valve 21 such that zero lash exists between the valve and hydraulic adjuster 263. This insures that all motion of the cam 292 is transferred to the exhaust valve 21 to facilitate opening and closing. Although fluid is used to bias the hydraulic adjuster 263 into engagement with the valve 21, it is contemplated that a mechanical assembly (e.g. a screw adjuster) may be provided to perform the same operation.

An opposite end of the exhaust rocker arm assembly 26 includes a cam follower 264. The follower 264 has a similar construction to the follower assembly 254, described above. The rocker arm assembly 26 also has a compact angled construction, as shown in FIG. 14 so as to allow for a narrow and low construction.

Figure 15:
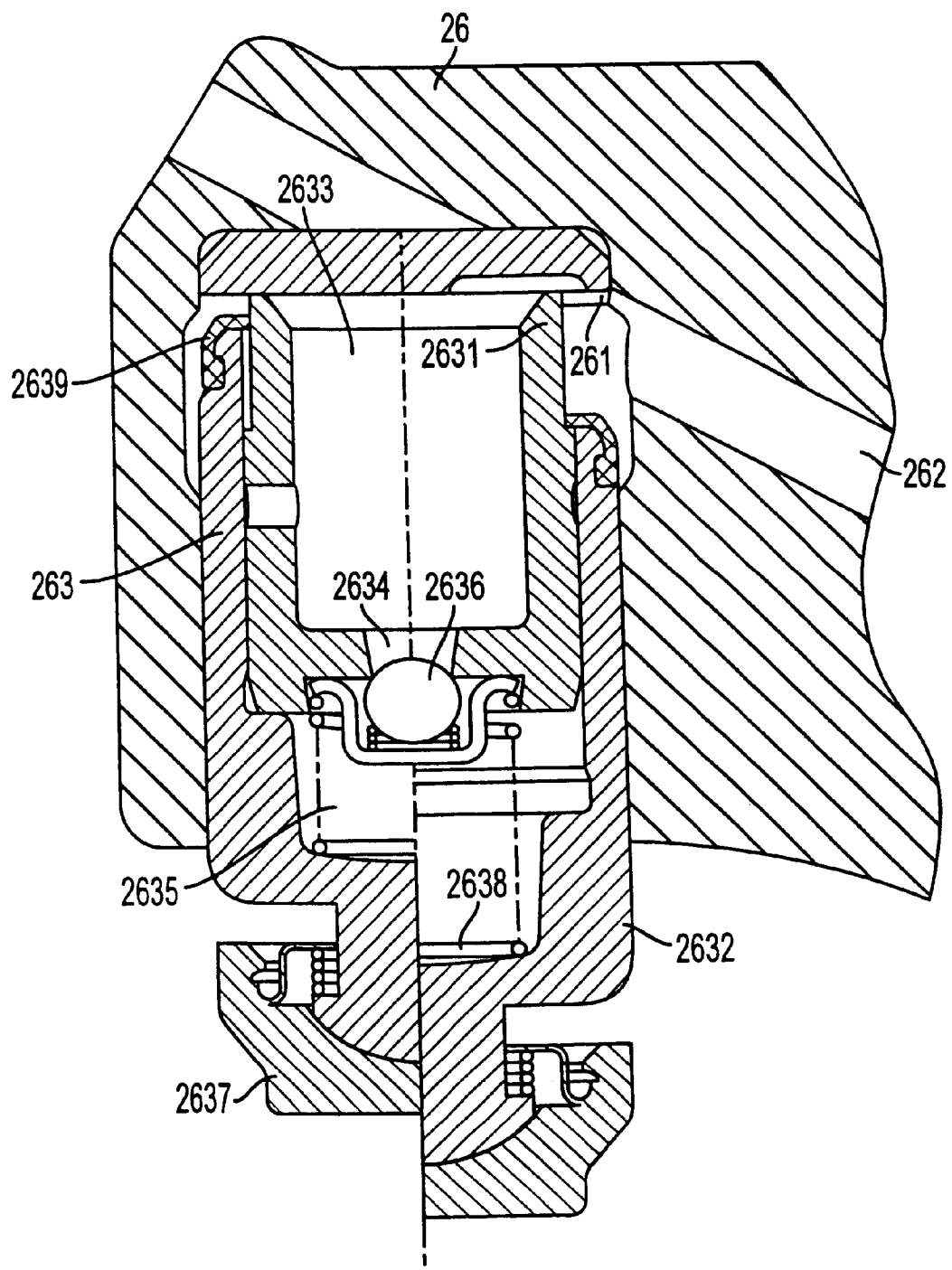
FIG. 15 is a cross sectional view of the operative end of the rocker arm assemblies showing a collapsed position of the hydraulic adjuster on the left side and an extended position of the hydraulic adjuster on the right side.

The construction of the hydraulic adjusters 253 and 263 will now be described in greater detail in connection with FIG. 15. The hydraulic adjusters 253 and 263 have the same construction. The hydraulic valve adjusters 253 and 263 are maintenance free and require no adjustment. The hydraulic adjuster 263 is positioned within the cavity 261. The hydraulic adjuster 263 includes an inner stationary piston 2631 and an outer movable piston 2632, which is located between the cavity 261 and the inner stationary piston 2631. The inner stationary piston 2631 includes a central cavity 2633 that is in communication with the cavity 261, as shown in FIG. 15.

An opposite end of the piston 2631 includes an aperture 2634 such that the cavity 2633 is in fluidic communication with a cavity 2635 in the piston 2632. A ball and seat check valve 2636 selectively closes the aperture 2634. A valve contacting cap 2637 is pivotably mounted on an end of the piston 2632. The cap 2637 contacts the valve stem of the exhaust valve 22 when the piston 2632 is in an extended position, as shown in the right side of FIG. 15.

In operation, hydraulic fluid flows through channel 262 into the cavity 261. After the cavities 261 and 2633 have filled with fluid, the valve 2636 opens to permit the flow of fluid into cavity 2635 through aperture 2634. As the cavity 2635 fills with hydraulic fluid, the piston 2632 extends to the position shown in the right side of FIG. 15. The spring assembly 2638 is located in the cavity 2635. The downward travel of the piston 2632 is limited by contact with the valve stem and a seal 2639 that is secured to one end of the piston 2632 and is slidably received around the piston 2631. When in the normal downward steady state position, the contacting cap 2637 contacts the valve stem such that motion of the rocker arm assembly is transferred to the valve to open the valve at predetermined locations of the camshaft 29. After engine shut off, a sufficient amount of fluid is maintained in the cavity 2635 to maintain the outer movable piston 2632 in engagement with the corresponding valve stem.

FIGS. 16 and 17 illustrate an axial section through the camshaft 29 and the rocker arm support axle 28. The camshaft 29 is mounted in a bearing bracket 293 with two collars 294 and 295. Lubricant is supplied to the clearance region between these two collars 294 and 295. By means of this double plain bearing in the respective bearing bracket 293, the bearing becomes very rigid and the dynamic changing loads occurring during operation can be accommodated efficiently. Mounting of the camshaft 29 is effected by inserting it in from one end of the cylinder head housing 20 near the power take off end of the engine. The camshaft 29 is secured by a plate positioned within the cylinder head housing 20 against axial shifting. The plate extends through a vertical slot located within the cylinder head housing 20. The plate may be further used to orient the axle 28 within the cylinder head housing 20. It is also contemplated that a pin may be used to secure the camshaft against axial shifting. The pin may be located in a slot or groove extending around the perimeter of the camshaft.

Although the operation of the intake valves 22 and exhaust valves 21 has been described in connection with rocker arm assemblies 25 and 26, other assemblies are contemplated for operating the valves. For example, the valves may be electromagnetically operated. Alternatively, the valves may be hydraulically operated using a slave piston/master piston arrangement. Furthermore, the Y-shaped rocker may be used to actuate the exhaust valves. Individual rocker arms may be used to operate intake valves. With this arrangement, the location of the spark plug assembly 27 must be relocated. It is also contemplated that gas springs may be used to bias the valves into a closed position when high rotation speeds are desired for high rpm output. It is also contemplated that a variable valve train may be substituted to vary the timing of the valve operation.

Spark Plug Assembly

The spark plug assembly 27 will now be described in greater detail in connection with FIG. 18. A spark plug 271 is connected by threaded engagement to the cylinder head housing 20, as shown in FIG. 18 such that an electrode portion of the spark plug 271 extends into the cylinder. The spark plug assembly 27 is located between the intake valves 22 and the exhaust valves 21 closer to the intake valves 21 because the intake side of the engine is cooler than the exhaust side of the engine. It is desirable to isolate the spark plug 271 from the remainder of the cylinder head housing 20, which contains oil therein. A tube assembly 272 surrounds the spark plug 271. The tube assembly 272 is preferably formed from a die cast plastic. It, however, is contemplated that other light weight materials may be used to form the tube assembly 272 so long as the tube assembly 272 isolates the spark plug 271 from the oil-carrying portions of the cylinder head housing 20. It is preferable that the spark plug assembly 27 be inclined at an angle with respect to the central axis of the cylinder. The angle between the spark plug assembly and the intake valves is small (e.g. 3° is preferable). The angle, however, may be zero.

Each tube assembly 272 is sealingly inserted into a pedestal 273 on the cylinder head housing 20, which forms a socket for the spark plug 271. A slight compression fit between the tube 272 and a bore in the pedestal 273 can provide a sealing engagement between the two components although this sealing engagement can also be augmented by providing an o-ring between the two compartments. On an outer end, a seal 274 is vulcanized onto the tube assembly 272 which effects the sealing between the tube assembly 272 and a cylinder head cover 275. Alternatively, the seal 274 can be provided as a separate component between the tube 272 and cover 275. Use of the tube 272 provides for a lighter weight head assembly and also simplifies the casting of the cylinder head since the isolating tube is not cast as part of the cylinder head. The tube assembly 272 accommodates a plastic body spark plug connector 276 in which the ignition coil or the spark transformer are cast. In this way, the path of the high voltage to the spark plug 271 can be kept extremely short. From the outside, only a low voltage is supplied to the plastic body spark plug connector 276 and the ignition coil contained therein. The plastic body spark plug connector 276 and the spark plug 271 can easily be removed through the tube assembly 272. The plastic body spark plug connector 276 abuts the inner side of the tube assembly 272. A venting assembly is provided to enable venting from the spark plug region towards the environment. A splash water screen 2763 is attached to the plastic body 276.

Figure 19:
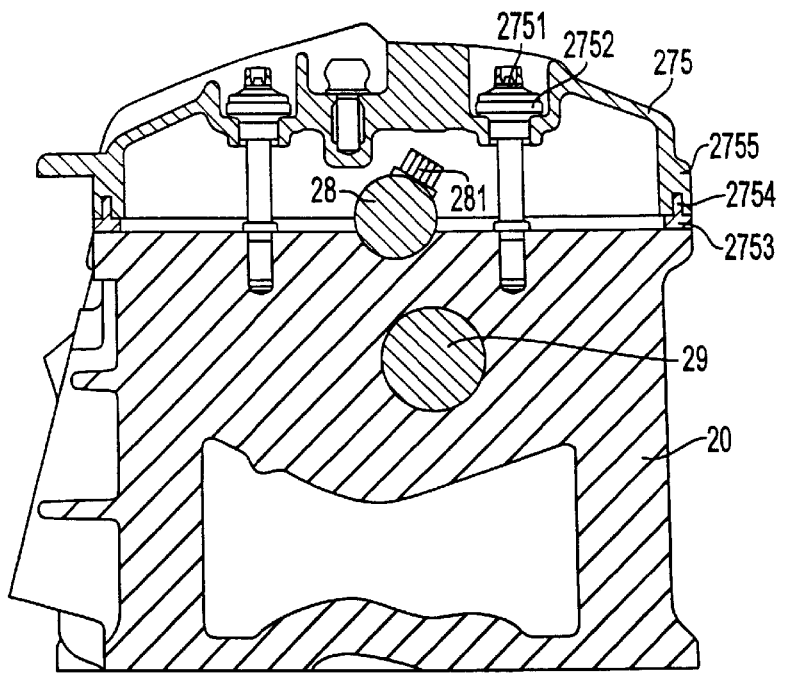
FIG. 19 is a cross sectional view illustrating the placement of the cylinder head cover on the cylinder head.

A cylinder head cover 275 is attached to the cylinder head housing 20 using a plurality of fastener elements 2571, as shown in FIG. 19. The cylinder head cover 275 is preferably formed from aluminum or some synthetic material. The connection between the cylinder head housing 20 and the cylinder head cover 275 is acoustically decoupled. An elastomeric gasket 2753 is positioned between the cylinder head housing 20 and the cylinder head cover 275 to provide a seal between the two components. The gasket 2753 has a protruding portion 2754 that is configured to sealingly engage a slot 2755 in the cylinder head cover 275. This engagement maintains the gasket in a desired position between the cylinder head housing 20 and the cylinder head cover 275 and helps prevent the gasket 2753 from dislocating and causing leaks. In addition, the elastomeric gasket also reduces and prevents a direct sound propagation from the cylinder head housing 20 to the cylinder head cover 275 thereby reducing overall noise emanating from the engine. A further elastomeric gasket 2752 is provided between the fastener element 2751 and cylinder head cover 275 to seal the connection therebetween and also block direct sound propagation from the cylinder head housing 20 to the cylinder head cover 275 through the fastener 2751. With this arrangement, the cylinder head cover 225 is isolated from the cylinder head housing 20.

Exhaust Manifold

A preferred embodiment of the exhaust manifold 30 will now be described in connection with FIGS. 21–24. The exhaust manifold 30 includes a first manifold 31 and a second manifold 32, as shown in FIG. 24. The first manifold 31 is connected to one side of the cylinder head housing 20. It is preferably located on the smaller downward facing side of the cylinder head housing 20 because it does not require as much space as the induction system 40, described below. The first manifold 31 includes at least one exhaust passageway 311 that is operatively coupled to each exhaust passageway 23 in the cylinder head housing 20. Each exhaust passageway 311 connects to a main exhaust passageway 312, which extends in a direction towards the power take off assembly 50. With this arrangement, exhaust gases exit the cylinder head housing 20 through each exhaust passageway 23 when the respective exhaust valves 21 are opened. The exhaust gases then travel through the exhaust passageway 311 to the main exhaust passageway 312.

The first manifold 31 is connected at the end nearest the power take off assembly 50 to the second manifold 32. The second manifold 32 includes a main exhaust passageway 321. The exhaust gases travel through the main exhaust passageway 321 into the muffler system 33.

Due to US Government regulation, it is necessary to cool the exhaust components to limit the temperature of these components below a threshold value. It is desirable to cool the exhaust gases as the gases pass through the exhaust manifold 30 and an associated muffler system 33. The muffler system 33 preferably includes a first muffler 331 directly connected to the exhaust manifold 30 and a second muffler 332 connected to the first muffler 331.

The first and second manifolds 31 and 32 are equipped with an open loop cooling system for cooling the manifolds 31 and 32 and the exhaust gases contained therein. Each manifold 31 and 32 has a double jacket construction that permits cooling water to flow around the interior of the manifolds 31 and 32 without mixing with the exhaust gases. The first manifold 31 is preferably cast. The second manifold 32 is preferably formed from stainless steel.

Figure 22:
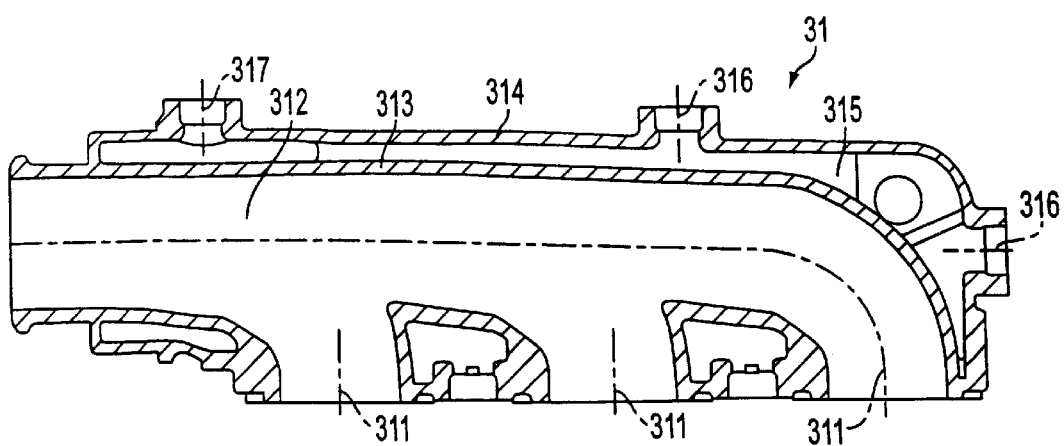
FIG. 22 is a longitudinal cross sectional view of a portion of the exhaust manifold of FIG. 21.
Figure 20:
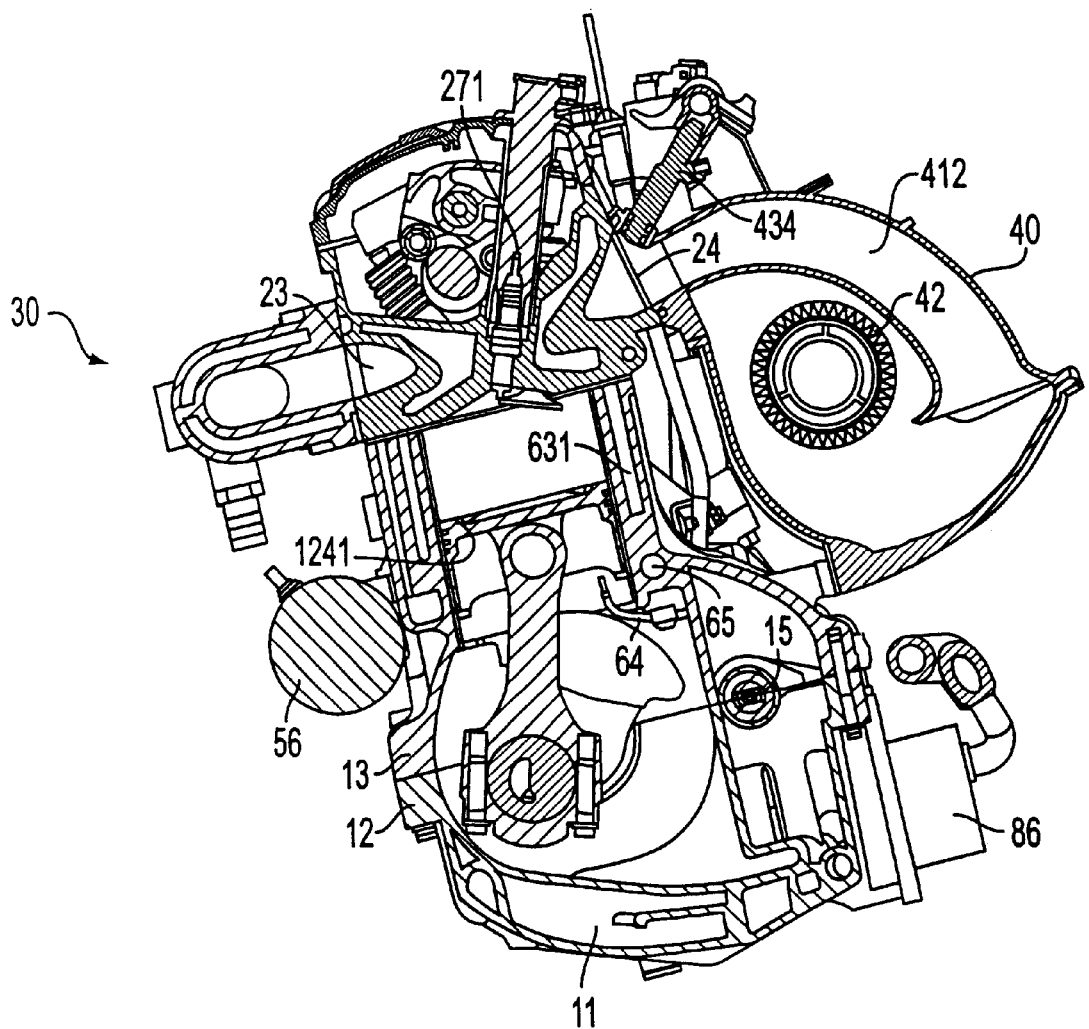
FIG. 20 is a cross sectional view of the engine of FIG. 1 through one cylinder of the engine.
Figure 21:
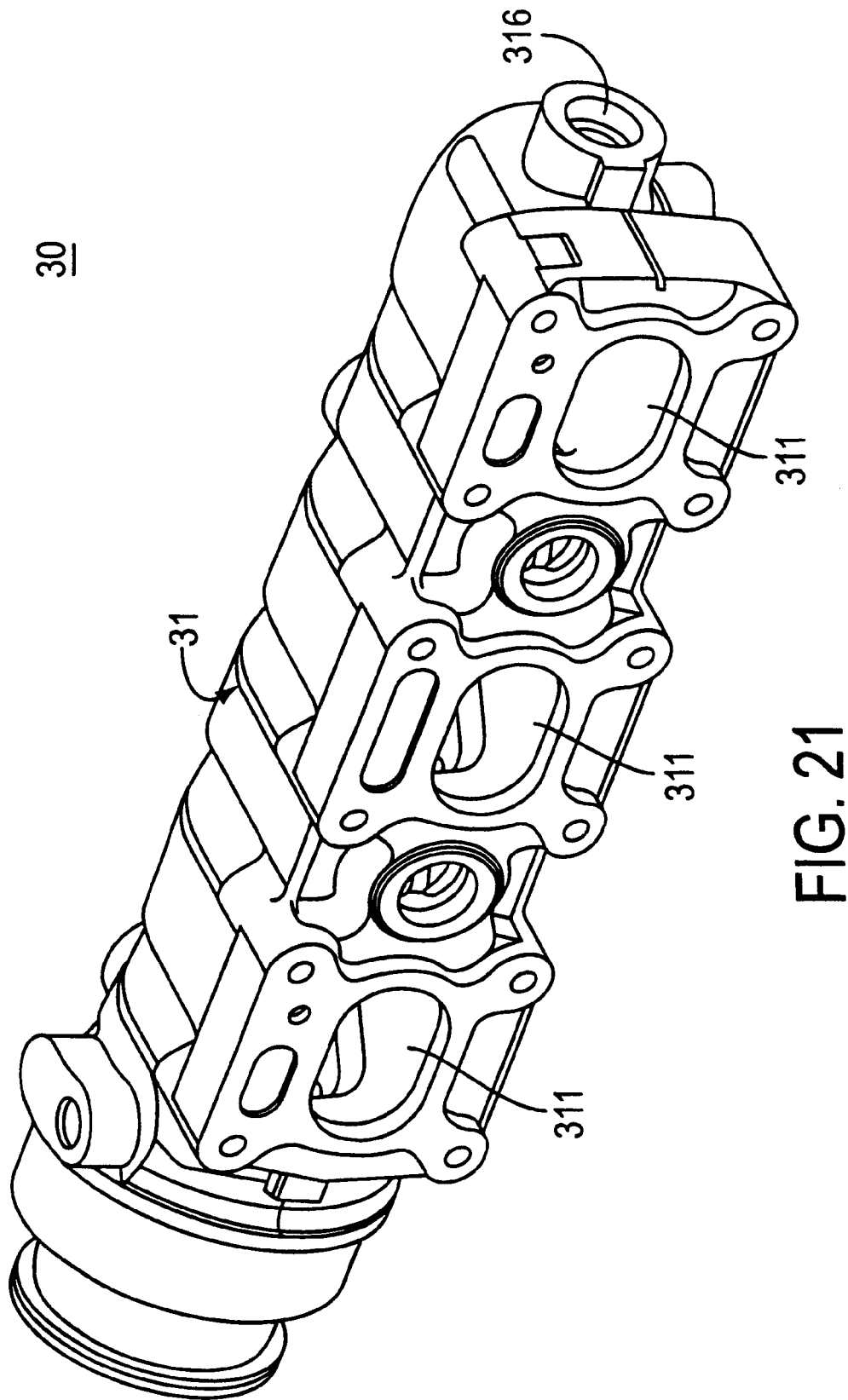
FIG. 21 is a schematic perspective view of the exhaust manifold in accordance with the present invention.
Figure 23:
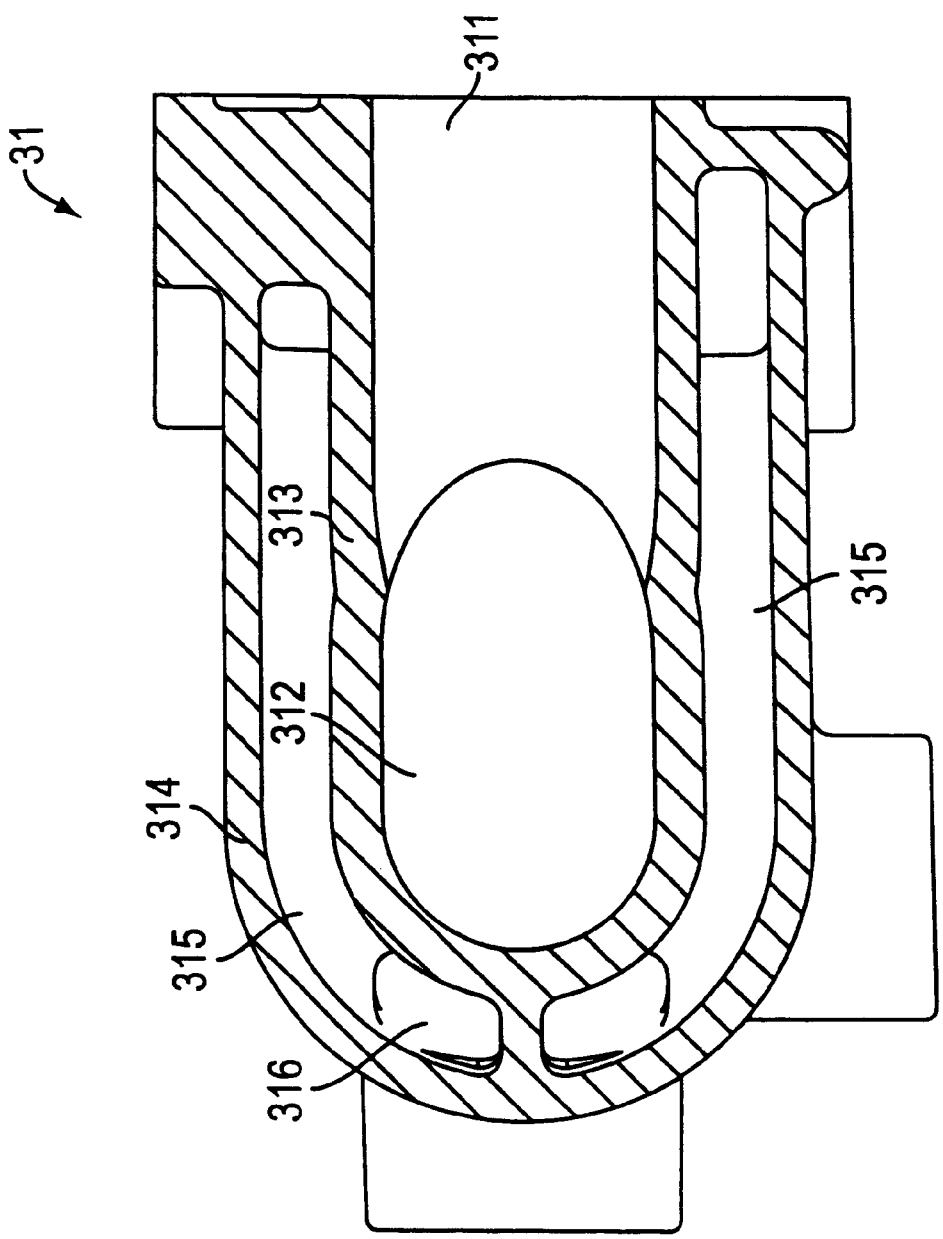
FIG. 23 is a side cross sectional view of a portion of the exhaust manifold of FIG. 21.
Figure 24:
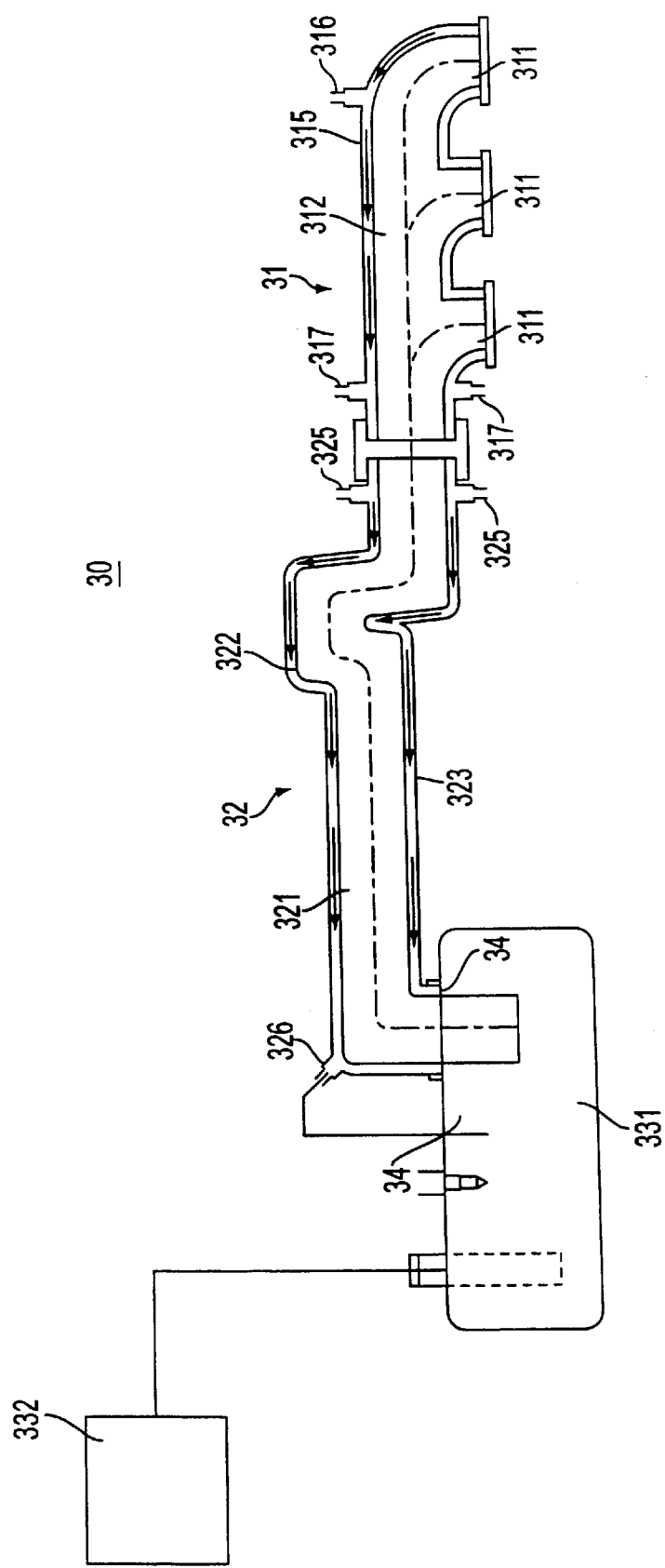
FIG. 24 is a schematic view of the exhaust manifold and open loop cooling system in accordance with the present invention.

The first manifold 31 has an inner manifold 313 and an outer manifold 314, as shown in FIGS. 22 and 23. The spacing between the inner and outer manifolds 312 and 314 forms a cooling passageway 315. The inner and outer manifolds 313 and 314 are interconnected at various points along the manifold. The cooling passageway 315 has a generally u-shaped configuration when viewed from a vertical cross section such that it surrounds the main passageway 311 on the top, bottom and at least one side. The cooling water enters the passageway 315 through at least one inlet 316. The cooling water then travels through the cooling passageway 315 and exits through at least one outlet 317.

The second manifold 32, as shown in FIG. 24, also has an inner manifold 322 and an outer manifold 323. The spacing between the inner and outer manifolds 322 and 323 forms a cooling passageway 324, therebetween. The cooling passageway 324 substantially surrounds the main exhaust passageway 321. The cooling water enters the cooling passageway 324 through at least one inlet 325 located near the connection between the first manifold 31 and the second manifold 32. The cooling water exits the cooling passageway through at least one outlet 326 located near the point where the second manifold 32 enters the first muffler 331.

The cooling system for the exhaust manifold 30 and muffler system 33 is an open loop cooling system. Cooling water is supplied to the first and second manifolds 31 and 32 by a jet pump of the propulsion unit of the personal watercraft 5, which draws cooling water from the body of water in which the personal watercraft 5 is operating. An open loop cooling system can be used for the exhaust manifold 30 because the geometry of the cooling jacket for the exhaust manifold 30 is relatively simple with larger passageways. There is less concern for the clogging of these passageways. On the contrary, the geometry of the cooling system for the cylinder head housing 20 and crankcase 10 is more complex with smaller passageways. There is a greater concern about clogging that may occur when using a coolant drawn from outside the watercraft 5. As such, a closed loop cooling system is preferred for the cylinder head housing 20 and crankcase 10.

The cooling passageways 315 and 324 sufficiently cool the manifolds 31 and 32. The temperature of the exhaust gases, however, remains too high. It must be further cooled before venting to the atmosphere or released into the water. It is desirable to cool the exhaust gases as the exhaust gases enter the first muffler 331. At least one injection nozzle 34 is located adjacent the end of the main exhaust passageway 323, such that a stream of cooling water is injected into the exhaust stream as the exhaust stream enters the first muffler 331. Although it is preferable that the at least one injection nozzle 34 be located within the muffler 331, it is contemplated that the injection nozzles 34 may be located within the main exhaust passageway 323.

It is possible for the personal watercraft 5 to overturn or rollover during operation. It is desirable to prevent the cooling water used to cool the exhaust gases from traveling within the main exhaust passageways 314 and 323 to the cylinder head housing 20. The design of the second manifold 32 and the connection between the second manifold 32 and the first muffler 331 prevent the return of the cooling water to the cylinder head housing 20.

The second manifold 32 terminates within the first muffler 331 at a central location. The outlet opening for the main exhaust passageway 323 is spaced from the top, bottom and side walls of the first muffler 331. With this arrangement, cooling water that has accumulated within the first muffler 331 should not enter the main exhaust passageway 323 because the cooling water should travel along the sides of the first muffler 331 (spaced from the outlet) when rollover occurs.

In the event that some cooling water enters the main exhaust passageway 323, the configuration of the second manifold 32 prevents passage of cooling water to the cylinder head housing 20. The second manifold 32 contains a unshaped bend or gooseneck portion that traps the cooling water. With this arrangement in a rollover condition, the cooling water must first travel downward from the first muffler 331 through the bend or gooseneck portion and then upward before entering the first manifold 31. The change in direction of the main exhaust passageway 323 in the gooseneck portion essentially prevents any cooling water from entering the first manifold 31 or the cylinder head 32.

The present invention is not limited to the above-described gooseneck portion for preventing water from entering the first manifold 31 at the cylinder head 20; rather, other geometries that produce a similar effect are considered to be well within the scope of the present invention.

Figure 43:
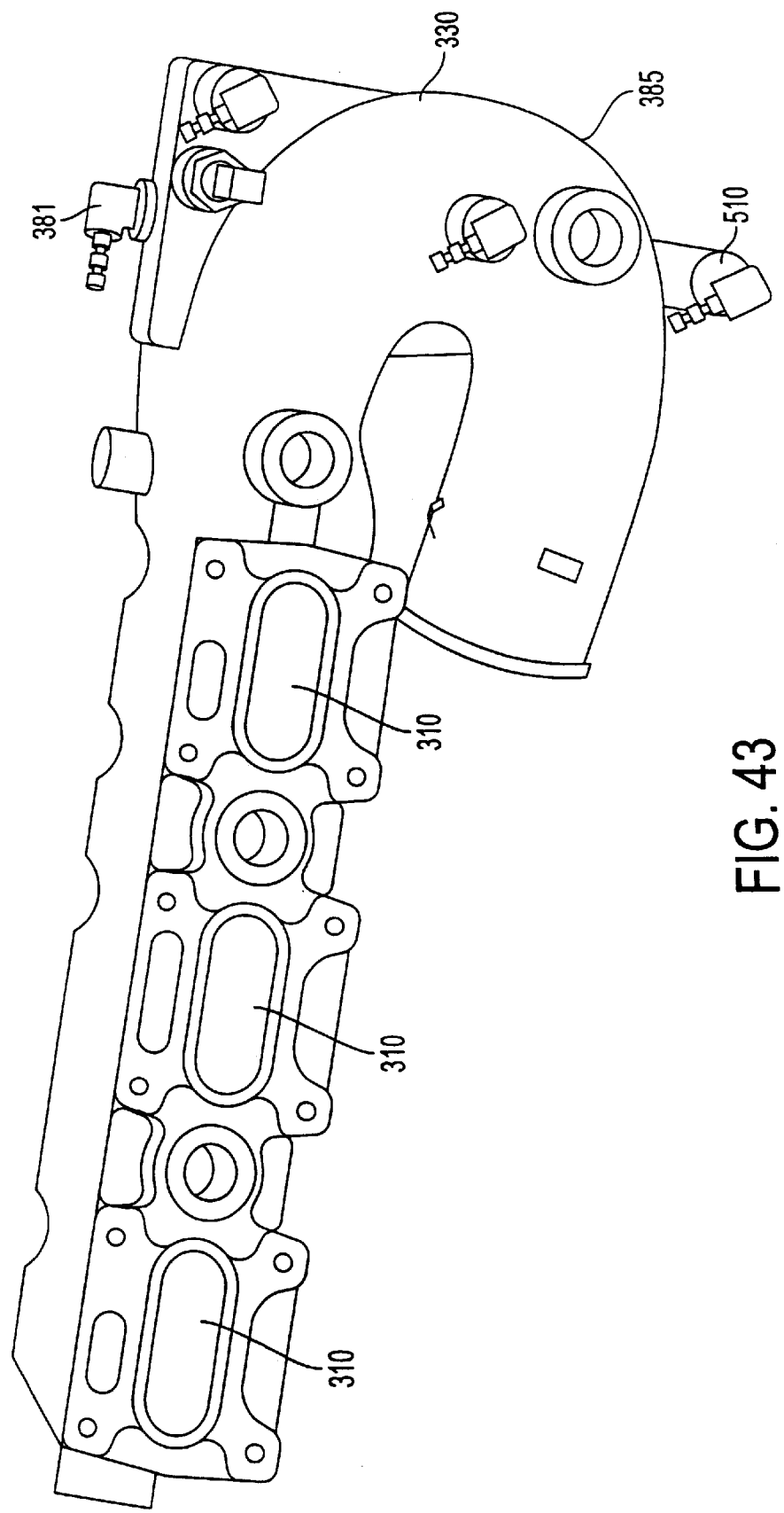
FIG. 43 is a schematic perspective view of the exhaust manifold according to an alternative embodiment.
Figure 44:
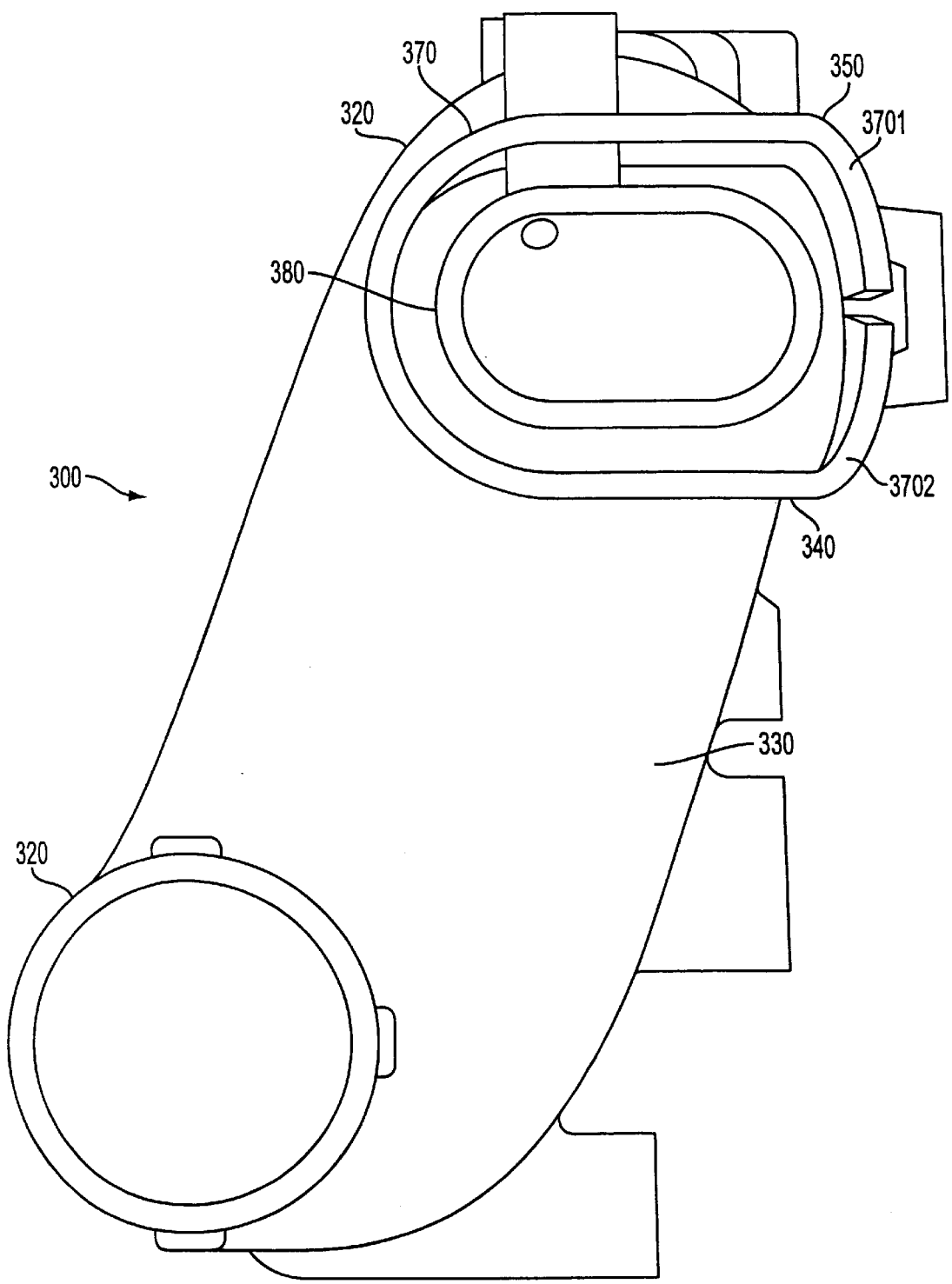
FIG. 44 is a cross sectional view of a portion of the exhaust manifold of FIG. 43.
Figure 45:
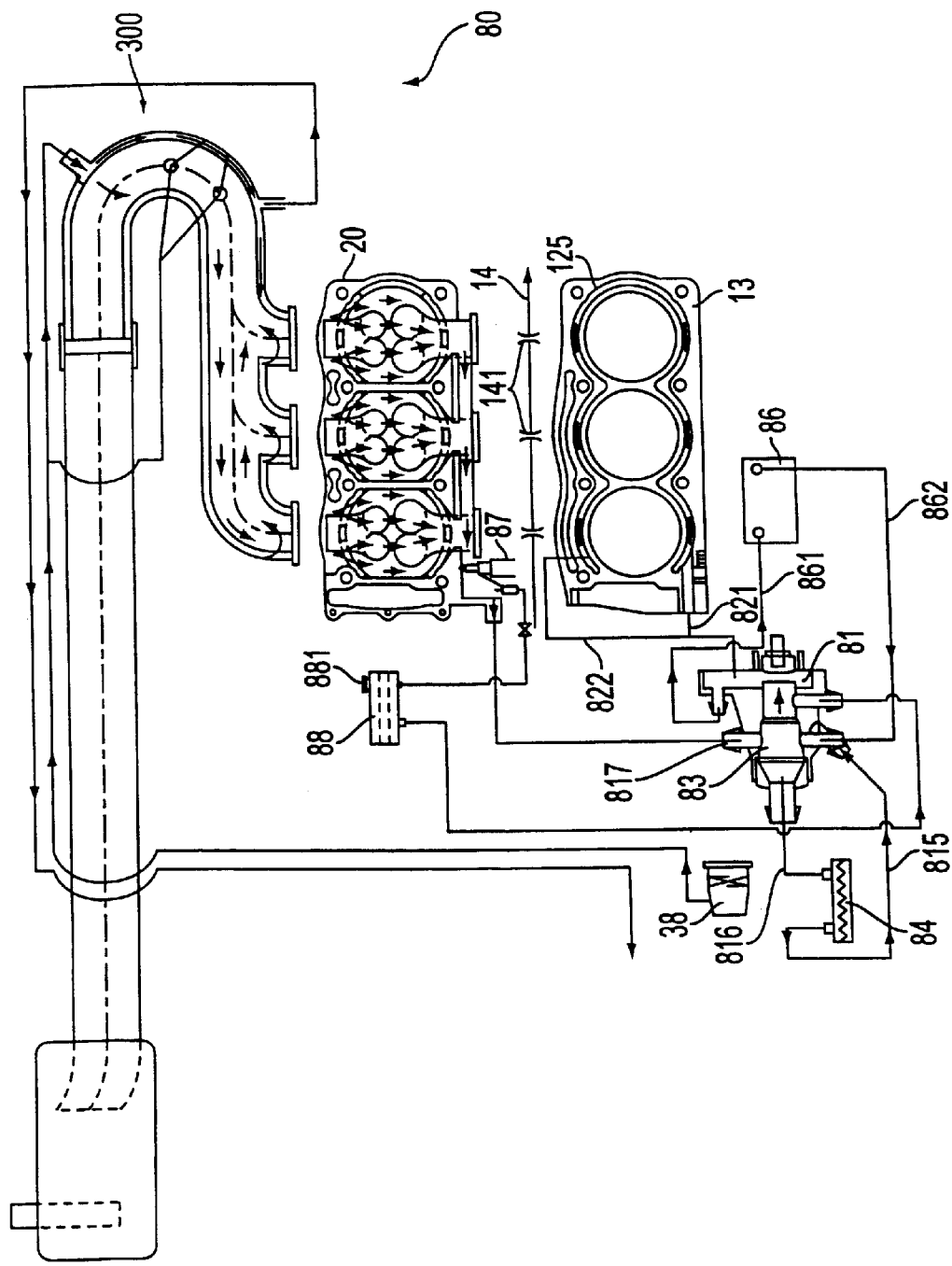
FIG. 45 is a schematic diagram of the cooling system for the engine in accordance with the present invention for use in connection with the exhaust manifold of FIG. 43.
Figure 46:
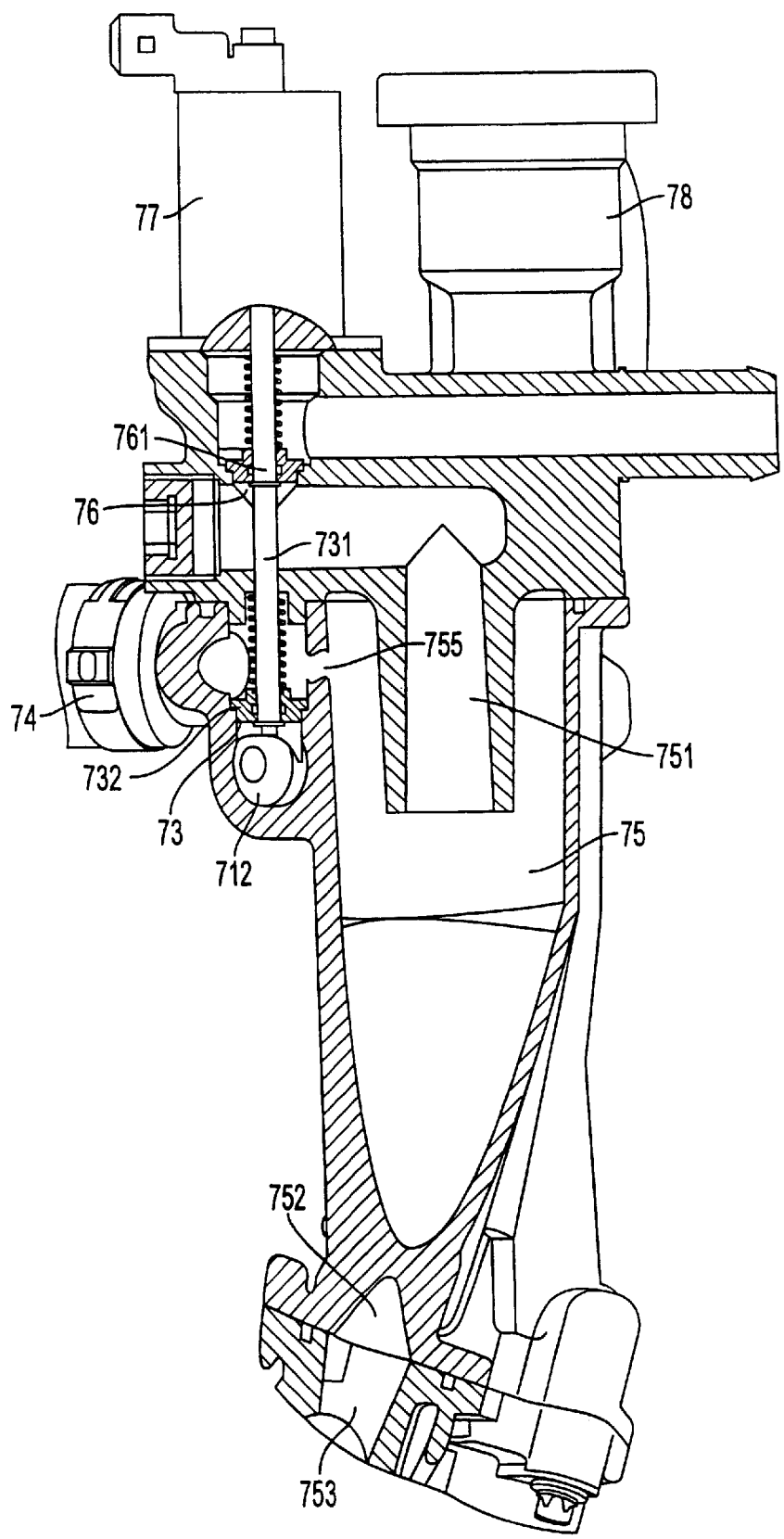
FIG. 46 is a cross sectional view of the cyclone of the blow-by ventilation system.
Figure 47:
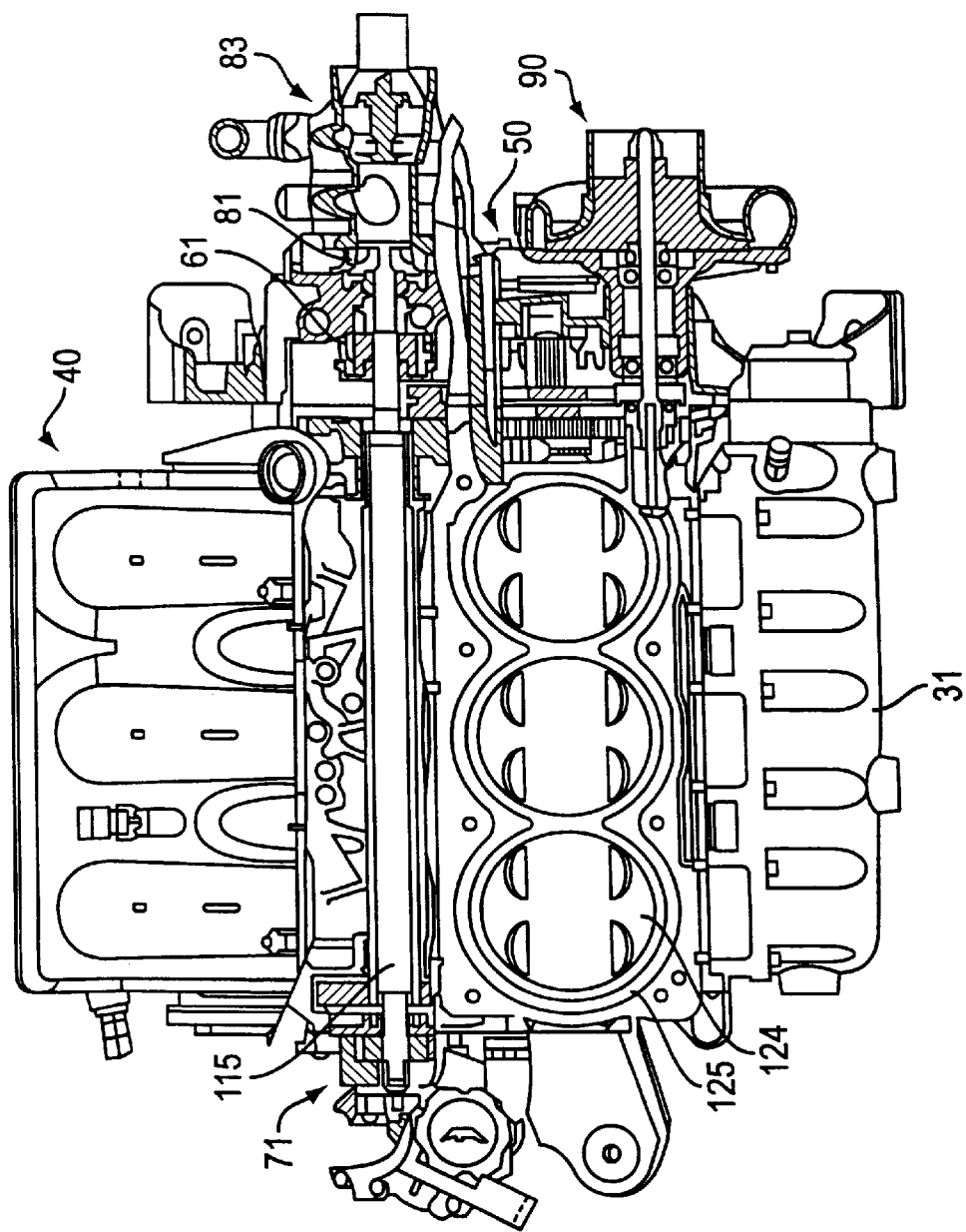
FIG. 47 is a partial overhead cross sectional view of the engine of FIG. 6 having a cut away of the balance shaft and the power take off assembly.
Figure 48:
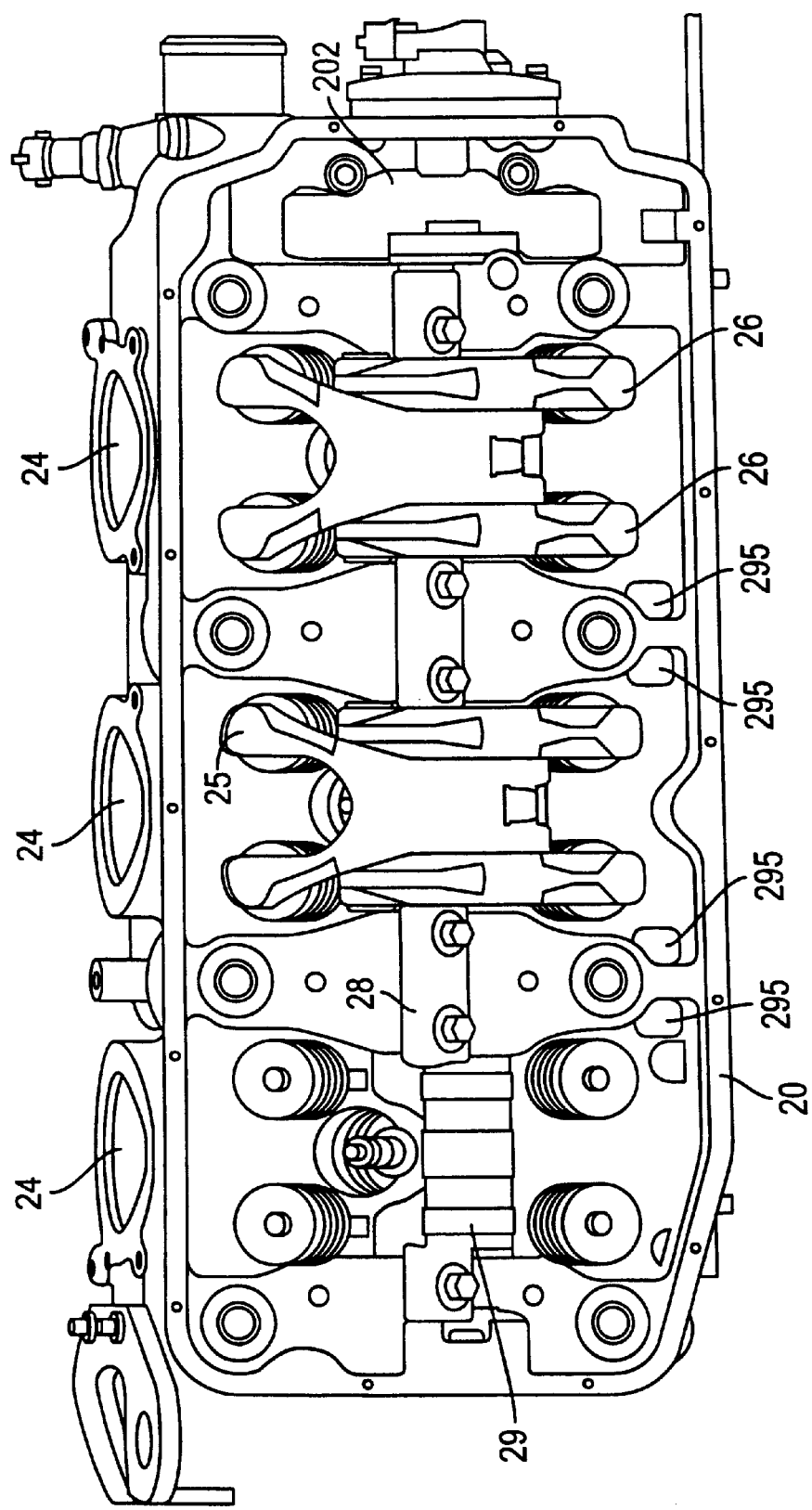
FIG. 48 is an overhead view of the valve train.

An alternative embodiment of the exhaust manifold will now be described in connection with FIGS. 43 and 44. The exhaust manifold 300 is connected to one side of the cylinder head housing 20. Like the manifold 30 described above, the manifold 300 is preferably located on the smaller downward facing side of the cylinder head housing 20. The exhaust manifold 300 includes at least one exhaust passageway 310 that is operatively coupled to each exhaust passageway 23 in the cylinder head housing 20. Each exhaust passageway 310 connects to a main exhaust passageway 320. The exhaust gases exit the cylinder head housing 20 through each exhaust passageway 23 when the respective exhaust valves 21 are opened. The exhaust gases then travel through the exhaust passageway 310 to the main exhaust passageway 320. The main exhaust passageway 320 first directs the exhaust gases toward the front of the personal watercraft, then in an opposite direction through knee bend 330 toward the rear of the personal watercraft. The exhaust gases may then exit the exhaust manifold 300 to a muffler system and/or water trap. The muffler system may include a pair of mufflers.

In this alternative arrangement, the exhaust manifold 300 also has a double jacket construction that permits cooling water to flow around the exhaust gases without mixing the cooling water and the exhaust gases. The double jacket construction includes an inner manifold 340 and an outer manifold 350, which create a cooling chamber 370 therebetween. Webs 360 separate the cooling chamber 370 into a first portion 3701 and a second portion 3702, as shown in FIG. 22. The cooling water passes through the cooling chambers 3701 and 3702, as shown in FIG. 44.

Like the manifold 30 the exhaust manifold cooling system is an open loop cooling system. As such, a jet pump of the propulsion unit draws cooling water from the body of water in which the personal watercraft 5 is operating, shown in FIG. 44. The cooling water is supplied to the exhaust manifold 300 through a primary inlet port 3510 located in the bend 330 of the exhaust manifold 300, as shown in FIG. 43. The cooling water then flows through the first chamber portion 3701 until it connects with the second chamber 3702 at the rear portion of the exhaust manifold 300. The cooling water then flows back through the second chamber 3702 until it is discharged through the outlet port 3520 back into the body of water. Thus, the separation of the chamber 370 into two portions 3701 and 3702 that are interconnected only at an end of the exhaust manifold distant from the cooling intake and outlet ports provides for a U-shaped cooling circuit in the manifold, enhancing the cooling efficiency of the manifold.

These cooling arrangements maintain the exhaust manifolds 30 and 300 at a lower temperature than the cylinder head housing 20 and the cylinder block 10. As a result, the exhaust manifolds 30 and 300 function as a heat sink, withdrawing heat from the cylinder head housing 20 and the cylinder block 10. This reduces the cooling requirements placed on the closed loop cooling system 80, described below. The coolant in the exhaust manifold (e.g. the water drawn from the body of water) has a lower temperature than the coolant for the closed loop cooling system, described below.

At least one temperature sensor 39 is located in the muffler to measure the temperature of the exhaust gases. The exhaust manifold 300 is equipped with an injection cooling system, which supplies additional cooling water to the exhaust manifold. A first injection nozzle 381 sprays cooling water directly into the exhaust passageway 320 in a direction away from the cylinder head housing 20. A second injection nozzle 383 sprays cooling water directly into the exhaust passageway 320 also in a direction away from the cylinder head housing 20. The location of the nozzles in the knee of the exhaust manifold prevents the backward travel of the cooling water into the cylinder head. The combined open loop cooling system with the injection cooling system functions to cool both the exhaust manifold and the exhaust gases within the manifold.

Air Intake and Fuel Injection System

The air intake and fuel injection system or induction system 40 will now be described in connection with FIGS. 26-31. The system 40 is connected to the cylinder head housing 20 opposite the exhaust manifold 30. The air intake into the engine 1 or 2 is effected from within the hull of the personal watercraft 5 via an air box, not shown, but disclosed in US Provisional Patent Application No. 60/224,355, filed on Aug. 11, 2000, entitled "WATERCRAFT HAING AIR/WATER SEPARATING DEVICE" and US Provisional Patent Application No. 60/229,340, filed on Sep. 1, 2000, entitled "PERSONAL WATERCRAFT HAING IMPROVED FUEL, LUBRICATION AND AIR INTAKE SYSTEMS" the specifications of which are incorporated specifically herein by reference. The air box comprises an air inlet in the form of a snorkel, a water separator unit and a muffler unit. The air box is located apart from the engine and connected to the engine via a tube or hose to prevent water from entering the air intake system.

The air flows through the tube connecting the air box with the engine, and then passes to an air intake manifold or plenum 41, illustrated in FIGS. 26–31. The air manifold 41 is preferably formed from a plastic material. The present invention, however, is not limited to the use of a plastic material; rather, metals, high strength alloys and other suitable synthetic materials may be used.

The air manifold 41 has a symmetrical geometry. With this arrangement, air flow into the air manifold 41 can be provided at either end of the air manifold 41, thereby enabling use of the same air manifold 41 in either a normally aspirated engine 1 or a supercharged engine 2, which engines have different flow paths for air into the air intake manifold. In the normally aspirated engine, the air from a throttle (if the engine has fuel injection) or a carburetor (if the engine does not have fuel injection) flows into one end of the air manifold 41, as shown for example in FIG. 4. Preferably, this end faces the airbox to shorten the distance and the pressure loss between the intake manifold and the airbox.

Irrespective of which end of the air manifold is used to intake air, in a fuel injection version of the engine, the air manifold 41 includes a throttle body 411 containing a throttle at the plenum inlet to regulate the flow of air into the manifold 41. The degree of opening of the throttle of the throttle body 411 is controlled by the engine management system 200. The throttle body 411 further includes a by-pass idle valve 4111. The by-pass idle valve 4111 is preferably controlled by a stepper motor that controls the cross sectional opening of the by-pass idle valve 4111 and the amount of air flowing through it. Alternatively, it is contemplated that the idle valve 4111 may include an electromagnetically operated valve. The operation of the by-pass idle valve 4111 is controlled by the engine management system 200. The engine management system operates the stepper motor based on the engine speed to adjust it to a given threshold value. In normal operation, the idle valve 4111 is open when the throttle of the throttle body 411 is closed. This permits the flow of a predetermined amount of air into the manifold 41 during an engine idling less than the normal air intake into the air manifold 41. The idle valve 4111 is not fully closed when the throttle of the throttle body 411 is open. In a normal full load steady state operating condition, the idle valve 4111 is partly but not entirely open. This provides a reserve of intake air used for transient engine operating conditions (e.g., a rapid deceleration phase). The stepper motor is operated such that the maximum amount of air can be drawn into the air manifold 41 so that the air/fuel mixture is not too high. The location of the throttle body 411 is different for the normally aspirated engine 1 and the supercharged engine 2. It is contemplated that the throttle body 411 may be replaced by a carbureter in a non-fuel injected version of the engine.

The air manifold 41 further includes at least one swing pipe 412 for each cylinder. Each swing pipe 412 is operatively connected to the respective intake passageway 24 to supply air to the combustion chambers through intake openings 241. The flow pattern of the air within the air manifold 41 is indicated by the arrows in FIGS. 27–29 and 31. As shown, the air enters the air manifold 41 via the throttle body 411. The air passes radially through a cylindrical flame arrester 42 and then flows through each swing pipe 412 to the respective intake passageway 24. The end cap 413 made be integrally formed with the air manifold.

The flame arrester 42 in the air manifold 41 prevents backfire of flames from entering the engine compartment interior within the hull of the personal watercraft. The flame arrester 42 includes a perforated inner pipe 421 and a pleated porous outer shell 422. In accordance with the present invention, the location of the flame arrester 42 is advantageous. The flame arrester 42 is located within the central passageway in the air manifold 41. As such, the flame arrester 42 is located between the swing pipe 412 and the air inlet. In the event of a backfire, this location is advantageous because all flames are caught by the flame arrester 42 before passage to the air inlet (i.e., the throttle or the supercharger). Thus, backfire flame cannot reach outside of the engine, especially important when the engine is installed on a watercraft or aircraft where an engine compartment fire can be more disastrous than in an automobile. Although a cylindrical flame arrester 42 is illustrated, it is also contemplated that the flame arrester may be in the form of a flat plate or an arcuate member.

Figure 27:
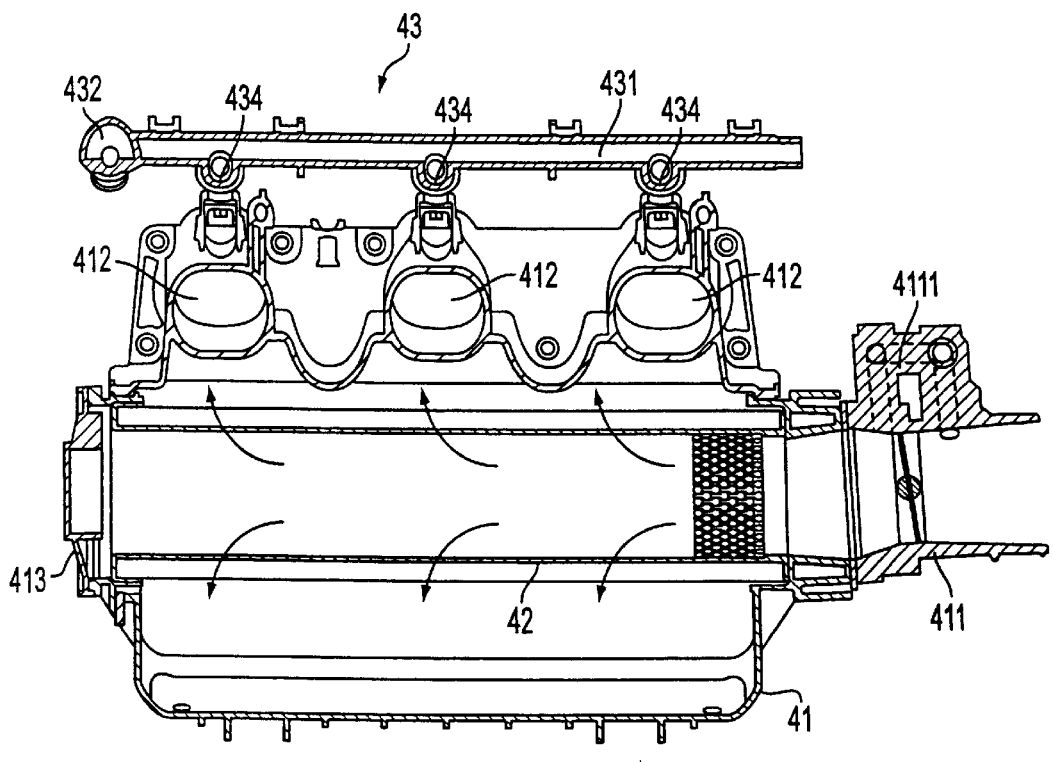
FIG. 27 is a cross sectional view of the air intake and fuel injection system of FIG. 26 taken along a longitudinal axis of the system.
Figure 28:
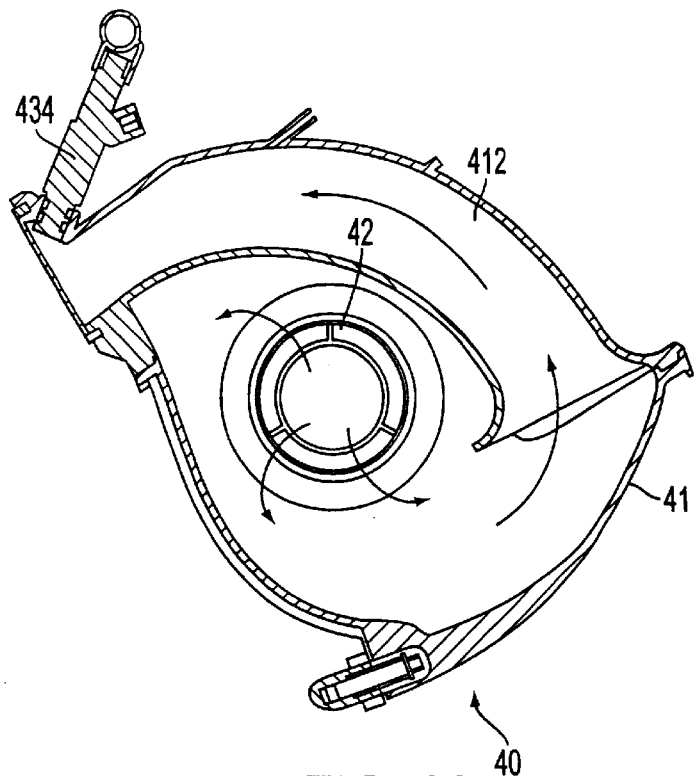
FIG. 28 is a side cross sectional view of the air intake and fuel injection system of FIG. 26 through a swing pipe.

The air manifold 41 is constructed to withstand the build up of back pressure in the event of a backfire. The manifold 41 is configured such that the back pressure is dissipated within the swing pipe 412. To prevent failure or cracking of the manifold in the event of a significant build up of back pressure, a pressure relief valve may be provided. The pressure relief valve may be made integral with an end cap 413, which is secured to an end of the air manifold 41, as shown in FIG. 27.

Figure 30:
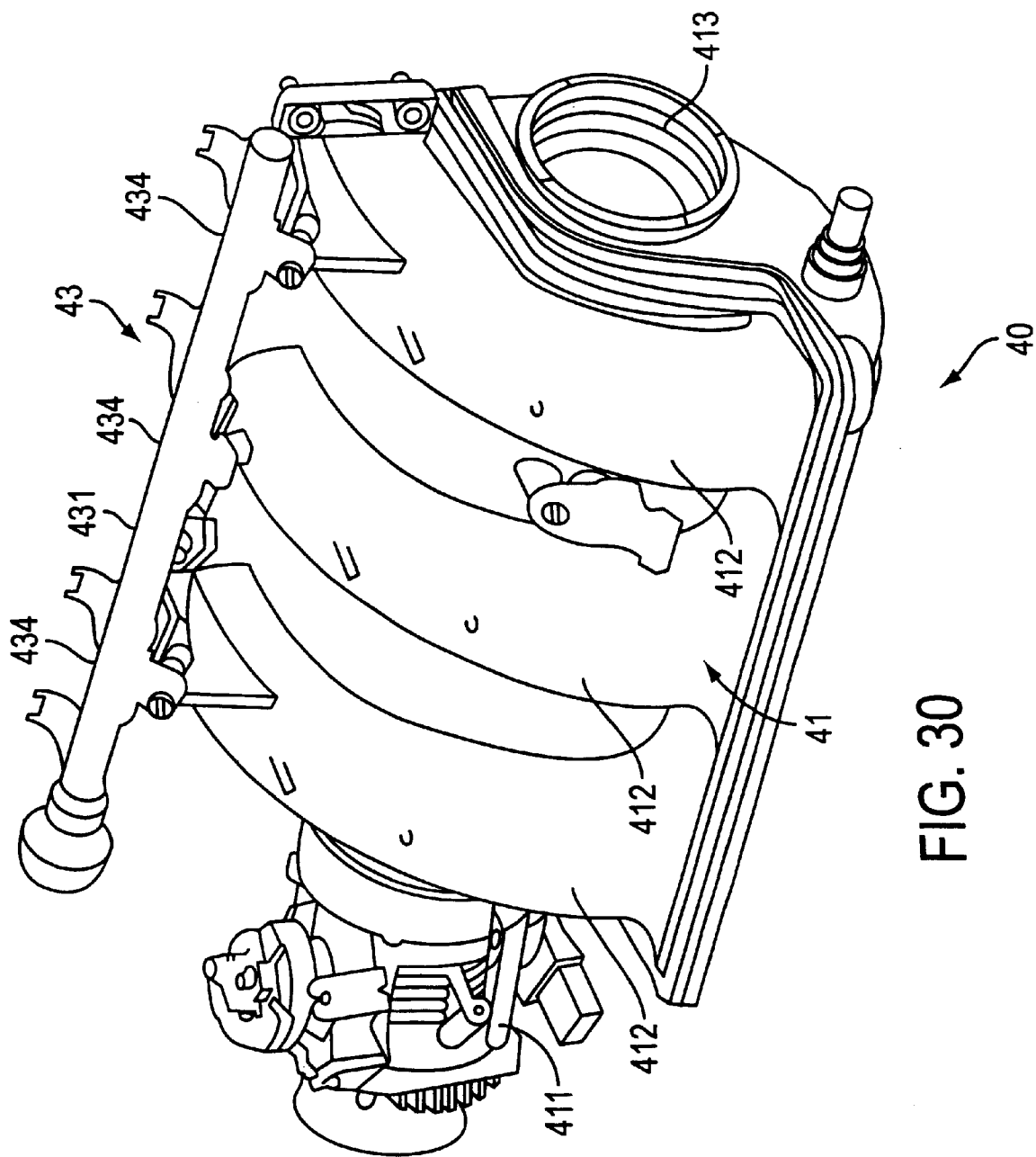
FIG. 30 is a front perspective view of a right side of the air intake and fuel injection system for the engine having a supercharger in accordance with the present invention.
Figure 31:
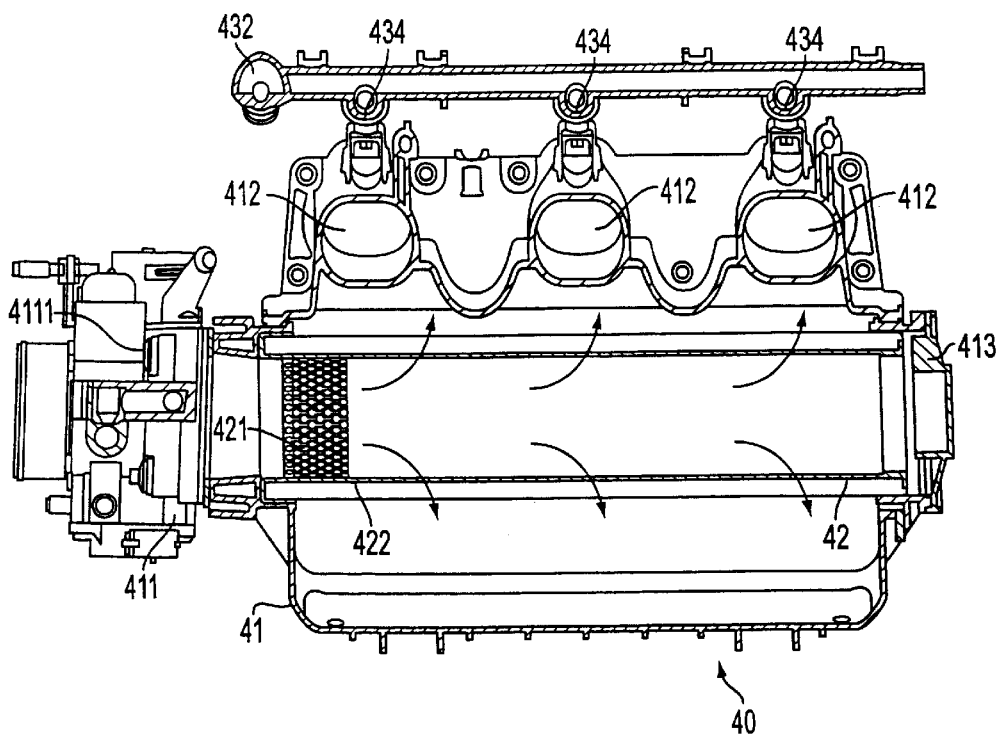
FIG. 31 is a cross sectional view of the air intake and fuel injection system of FIG. 30 taken along a longitudinal axis of the system.

In the supercharger version of the engine 2, the supercharger 90 and the throttle body 411 are interconnected between the air box and the air manifold 41. The throttle body 411 is located between the air manifold 41 and the supercharger 90. The supercharger assembly 90, however, is connected to an opposite end of the air manifold 41, as shown in FIGS. 30 and 31. The location of the throttle body 411 is also relocated to this end. As such, the air manifold 41 is designed such that the throttle body 411 and the pressure relief valve, if provided, can be located on either end of the manifold 41 to provide increased flexibility such that the same manifold geometry can be used for either the supercharger version or the normally aspirated version of the engine.

The intake manifold 41 also includes at least one drainage port. The drainage plug is removably located within the drainage port. In the event that water enters the interior of the intake manifold 41, the plugs can be removed to drain the water. Alternatively, a hose can be connected to the drainage port having a valve at an opposite end for more controlled drainage. Furthermore, it is contemplated that an automatically operated drainage valve may be provided to drain the air manifold upon engine shutdown.

Figure 29:
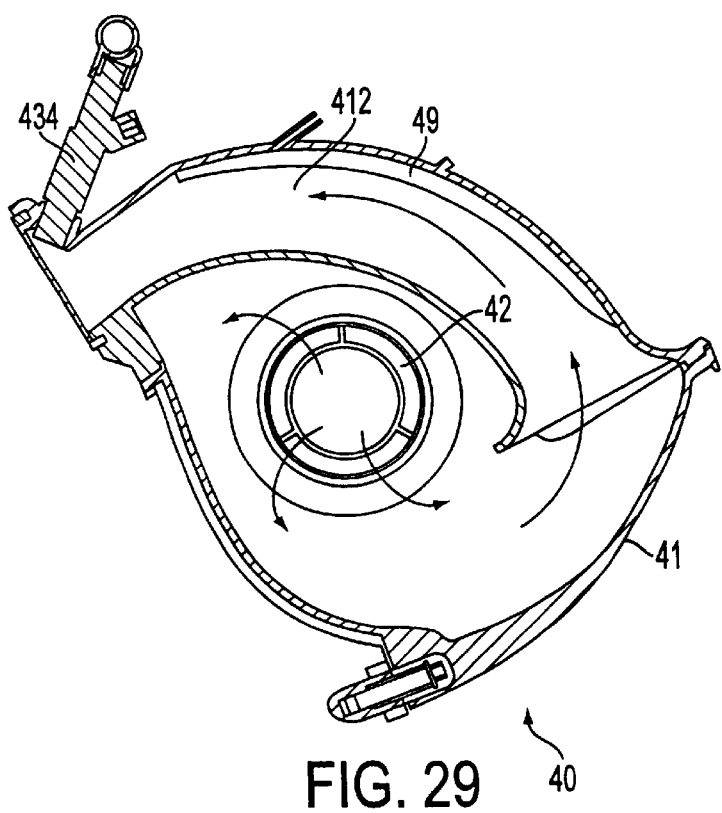
FIG. 29 is a variation of the air intake and fuel injection system of FIG. 28 illustrating a cooling jacket within the swing pipe.

It is contemplated that the air manifold 41 may include a cooling jacket 49 along an exterior wall of the air manifold 41, as shown in FIG. 29. The cooling jacket 49 cools the air within the air manifold 41 and, more particularly, the swing pipe 412 before entering the combustion chambers. The cooling of the intake air is especially useful for a supercharge version of the engine because the operation of the supercharger (by compressing) the air increases the temperature of the air. The cooling jacket may be linked to the open loop cooling system.

The air intake and fuel injection system 40 further includes a fuel injection assembly 43. The fuel injection assembly 43 includes a common fuel rail 431. The fuel rail 431 extends along an upper portion of the intake manifold 41, as shown in FIGS. 26, 27, 30 and 31. It is preferred that the pressure of the fuel into the fuel rail 431 be regulated by the fuel supply assembly 203 located in the fuel tank 204. In an arrangement where the fuel supply is not controlled in the fuel tank, an optional pressure control valve 432 is located at one end of the fuel rail 431. The pressure control valve 432 is provided to control fuel pressure within the fuel injection assembly 43. In this arrangement, a separate fuel return line is required.

At least one fuel injection nozzle 434 extends from the fuel rail 431 to the each swing pipe 412 adjacent the connection to each intake passageway 24. A fuel injection nozzle 434 is provided for each engine cylinder. The swing pipe 412 extends along the sides of the fuel injection nozzle 434. This increases air flow around the injection nozzle 434 such that no pockets of reduced air flow are produced adjacent the nozzle 434 because reduced air flow may produce residue on the wall of the swing pipe adjacent the nozzle, which could reduce performance and flow of fuel into the cylinder chamber. Additionally, to prevent the formation of pockets, the nozzles 434 may extend into the swing pipe 412. Fuel from the injection nozzle 434 is mixed with the air within the swing pipe 412 as the air enters the intake passageway 24. The fuel injection nozzles 434 are electromagnetically controlled by the engine management system 200 so that the nozzles 434 are independently and sequentially operated.

Power Take Off Assembly

Figure 36:
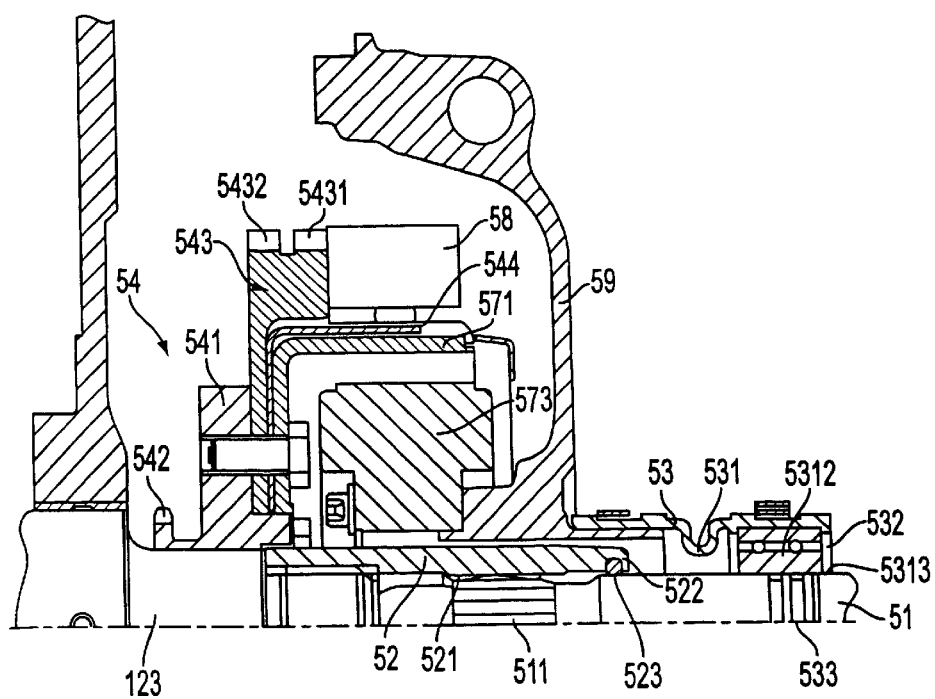
FIG. 36 is a cross sectional side view of the power take off assembly for the engine illustrating the generator assembly in accordance with the present invention.
Figure 37:
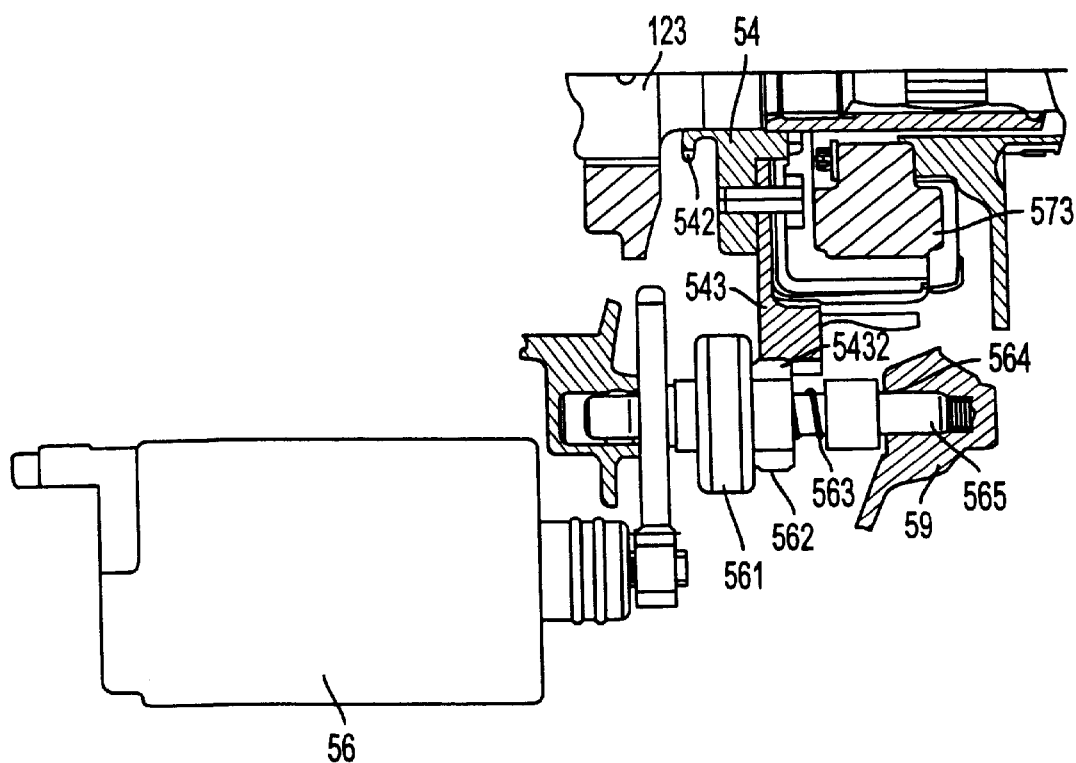
FIG. 37 is another cross sectional side view of the power take off assembly for the engine illustrating the starter assembly in accordance with the present invention.

The power take off assembly So of the engine 1 or 2 will now be described in connection with FIGS. 32–34 and 36. The crankshaft 123, described above, extends from one end of the crankcase 10, as shown in FIG. 33. The rotation motion of the crankshaft 123 is transferred to a drive shaft 51. A threaded connecting assembly 52 is secured to the end of the crankshaft 123. The threaded connecting assembly 52 includes a plurality of teeth 521 that extend around an inner periphery of one end of the connecting assembly 52. The teeth 521 are adapted to mate with complementary teeth 511 on the drive shaft 51. As shown in FIGS. 36 and 37, the teeth 511 have a generally arcuate shape. Although a generally linear tooth arrangement is considered to be well within the scope of the present invention, the arcuate tooth is preferred. The arcuate arrangement allows for slight angular deviations between the crankshaft 123 and the drive shaft 51. This is especially important when the crankshaft 123 and the drive shaft 1 are not in exact alignment or when the personal watercraft is operated in extreme conditions, such as, for example, when jumping waves. The use of the threaded connecting assembly 52 is also advantageous. In the event of wear resulting from non-exact alignment, only the connecting assembly 52 need be replaced.

The arcuate teeth 511 of the connecting assembly 52 are lubricated with engine oil. The oil is supplied from a first crankshaft main bearing 1232 via hollow bores 1233 in the crankshaft 123. The oil then flows to the arcuate teeth 511. This arrangement reduces engine maintenance because the operator no longer needs to grease the connection between the crankshaft and the drive shaft. The lubrication is performed by the lubrication system of the engine. The power take off housing 59 seals the components contained therein with the power take off assembly 50. Thus, protecting these components from exposure to marine conditions.

The connecting assembly 52 includes a sealing extension 522, wherein the extension 522 extends along a portion of the drive shaft 51. An o-ring seal 523 or other suitable sealing member is positioned between the sealing extension 522 of the connecting assembly 52 and the drive shaft 51. There is no relative rotational movement between the drive shaft 51 and the connecting assembly 52. As such, there are no rotational stresses on the o-ring seal 523. The sealing extension 522 and the o-ring 523 prevents lubricant from escaping from the engine. A labyrinth sealing arrangement may be provided between the sealing extension 522 and the power take off housing 59 to prevent the passage of lubricant from the power take off assembly 50 around the drive shaft 51. Alternatively, a screw or worm conveyor may be provided, which conveys lubricant back to the power take off assembly. At least one bore may be provided to form a shortcut such that the oil is drawn into the screw conveyor.

Additionally, the sealing of the drive shaft 51 with respect to the outside is effected by a sealing assembly 53. The sealing assembly 53 includes several sealing elements that can be used alone or in combination. The sealing assembly 53 includes flexible bellows 531, a shaft seal ring 532, and sealing rings 533. The flexible bellows 531 connects the power take off housing 59 with an external bearing carrier race 5311, which in turn is rotatably mounted on the drive shaft 51 via two self lubricating antifriction bearings (rolling bearings) 5312 and a bearing carrier inner race 5313. Sealing between the two bearing carrier races 5311 and 5313 is effected by the shaft sealing ring 532. The sealing rings 533 (in the form of polymeric o-rings) act as a seal between the bearing carrier inner race 5313 and the drive shaft 51. The sealing rings 533 also ensure a reliable fit between the two parts. A safety ring or clip 534 secures the bearing carrier inner race 5313 on the drive shaft 51 against any axial displacement. This may also be accomplished using a step formed in the drive shaft 51. The flexible bellow 531 is clamped to the power take off housing 59 and the external bearing carrier race 5311 by clamps 5314 and 5315, respectively.

Alternatively, the antifriction bearings 5312 are lubricated with engine oil. The oil is supplied from a first crankshaft main bearing 1232 via hollow bores 1233 in the crankshaft 123. The oil flows through the arcuate teeth 511 to the antifriction bearings 5312 and finally returns between the power take off housing 59 and the connecting assembly 52 into the interior of the engine. With this arrangement, a second flexible seal is provided in the event the flexible bellow 531 fails.

The power take off assembly 50 further includes a gear assembly 54, as shown in FIGS. 36 and 37. The gear assembly 54 includes a main gear 541 secured to the crankshaft 123 for driving the balance shaft 115, a chain gear 542 integrally connected to the main gear 541 for driving a cam control chain 55, and a large gear 543. It is contemplated that the chain gear 542 may be a separate component that is either force fit, fastened to or integrated into the crankshaft 123. The large gear 543 includes at least a first gear 5432 for engagement with a starter 56 through intermediate gear 561, as shown in FIG. 37 A second gear 5431 may be secured to the large gear 543 if the engine 2 is so equipped for driving a supercharger 90, as described below and shown in FIG. 38 For reducing the number of required parts for the engine family, a single gear 543 having both gears 5431 and 5432 may be used in either the blown or normally aspirated engines. It is also contemplated that the large gear 543 is formed as a single gear such that a portion of each tooth of the gear is used to drive the supercharger and another portion is used to drive the starter.

Linking the intermediate gear 561 for the starter assembly 56 to the crankshaft 123 through the gear 543 results in a reduction of the engine profile. A thrust screw drive within the intermediate gear 561 for the starter assembly 56 allows for an automatic engagement of a drive pinion 562 with the first gear 5432 during the starting procedure. The intermediate gear 561 moves the drive pinion 562 into engagement with the first gear 5432 against the bias of a return spring 563. At least one dampening spring 564 is provided to absorb vibration. After the starters operation is complete, the thrust screw drive disengages such that the return spring 563 biases the drive pinion 562 out of engagement with the first gear 5432. The drive pinion 562 is mounted to a pinion shaft 565 that is connected to the starter assembly 56 such that rotational movement generated by the starter assembly 56 is transferred to the drive pinion 562. The pinion shaft 565 is slidably and rotatably received within a recess in the power take off housing 59.

As illustrated in FIG. 36, a generator assembly 57 is also part of the power take off assembly 50. The generator assembly 57 includes a magnet wheel 571 connected to the gear assembly 54, as shown in FIG. 36 using suitable fasteners. The generator assembly 57 is a permanently excited 3-phase generator, in which permanent magnets 572, which are fastened to magnet wheel 571, rotate around a stator 573. The stator 573 is fixed to the inner side of the power take off lid 59. The location and arrangement of the generator assembly 57 provides for easy encapsulation because of reduced wiring requirements. The magnet wheel 571 rotates around the stationary coils. This arrangement is advantageous because it eliminates the need for rotating coil members and also in view of possible repair work. Furthermore, it reduces the weight of the rotating masses. Additionally, the magnet wheel 571 is constructed as an extrusion-molded part.

The rotational speed of the crankshaft 123 is measured by an engine or crankshaft speed sensor 58 located within the power take off housing 59. A cup shaped actuator 544 is secured to the gear assembly 54 between the large gear 543 and the magnet wheel 571 of the generator assembly 57. The actuator 544 extends between the gear 543 and wheel 571 and between the sensor 58 and the wheel 571, as shown in FIG. 36. The actuator 544 includes a plurality of teeth extending around the perimeter thereof. A predetermined number of teeth are missing at predetermined locations along the perimeter. The sensor 58 detects the absence of the teeth as the actuator 544 rotates. The speed of the crankshaft and engine speed can be determined from this.

Alternatively, it is contemplated that the magnet wheel 571 may include at least one conductor piece mounted therein. The conductor piece triggers the crankshaft or engine speed sensor 58. Instantaneous values of the crankshaft position can be received therefrom and the angular speed (rotational speed) is then calculated by the engine management system 200, described below. The angular resolution is 10°, i.e. during rotation of the crankshaft 123, after every 10° of rotation, a pulse is sent by the crankshaft position sensor to the control device. It is contemplated that the present invention is not limited to an angular resolution of 10°; rather, angular resolutions greater than and less than 10° are considered to be well within the scope of the present invention.

The arrangement of the components within the power take off housing 59 results in a more compact engine design. As described above, the engine components are located on the power take off end. The power take off housing 59 protects these elements from the marine conditions in which the personal watercraft operates. Furthermore, a common drive assembly connected to the crankshaft 123 is provided to drive these components without the need for numerous belts and other connections. Additional features and benefits of the power take off assembly 50 will be described below in connection with the description of the lubricating system 60, the blow-by ventilation system 70, engine cooling system 80 and supercharger 90.

Lubricating System

The lubricating system 60 will now be described in greater detail in connection with FIGS. 8, 11, 12, 14–16 and 32–35.

The engines 1 and 2 have a dry-sump lubricating system 60. The lubrication system 60 includes the oil tank 11, described above and shown in FIG. 8. The oil collected in the crank chambers 121 emerges therefrom via outlet openings 111 into a channel 112. The oil then flows to the upper portion 113 of the oil tank 11 adjacent the balance shaft 115. From there, the oil flows back by gravity to the bottom of the oil tank 11, where the oil is collected and stored.

From the oil tank 11, the oil is conveyed to an oil cooling assembly 86, shown in FIGS. 23 and 25, by an oil pump 61, as shown in FIGS. 25 and 33 through integrated channels in the lower crankcase 12. The oil pump 61 is integrated into the power take off housing 59 and is coaxially disposed and driven by the balance shaft 115 via a connecting shaft 612. The connecting shaft 612 is received within a suitable recess within the end of the balance shaft 115 such that rotation movement of the balance shaft 115 is transferred to the drive shaft 612. The oil pump 61 is preferably a troichoid pump. It is preferred that the oil be sucked from the bottom of the oil tank 11. Furthermore, it is also preferred that the oil be removed from a more centrally located pickup position within the tank 11, rather than the front or rear of the tank 11. This is a preventative measure to avoid air entrapment in extreme operating conditions (extreme acceleration and deceleration modes). The oil cooling assembly 86 is designed as a plate-type cooler and is fixed onto the cylinder block 10. To cool the engine, water is used in a closed cooling system 80, described in greater detail below.

Figure 32:
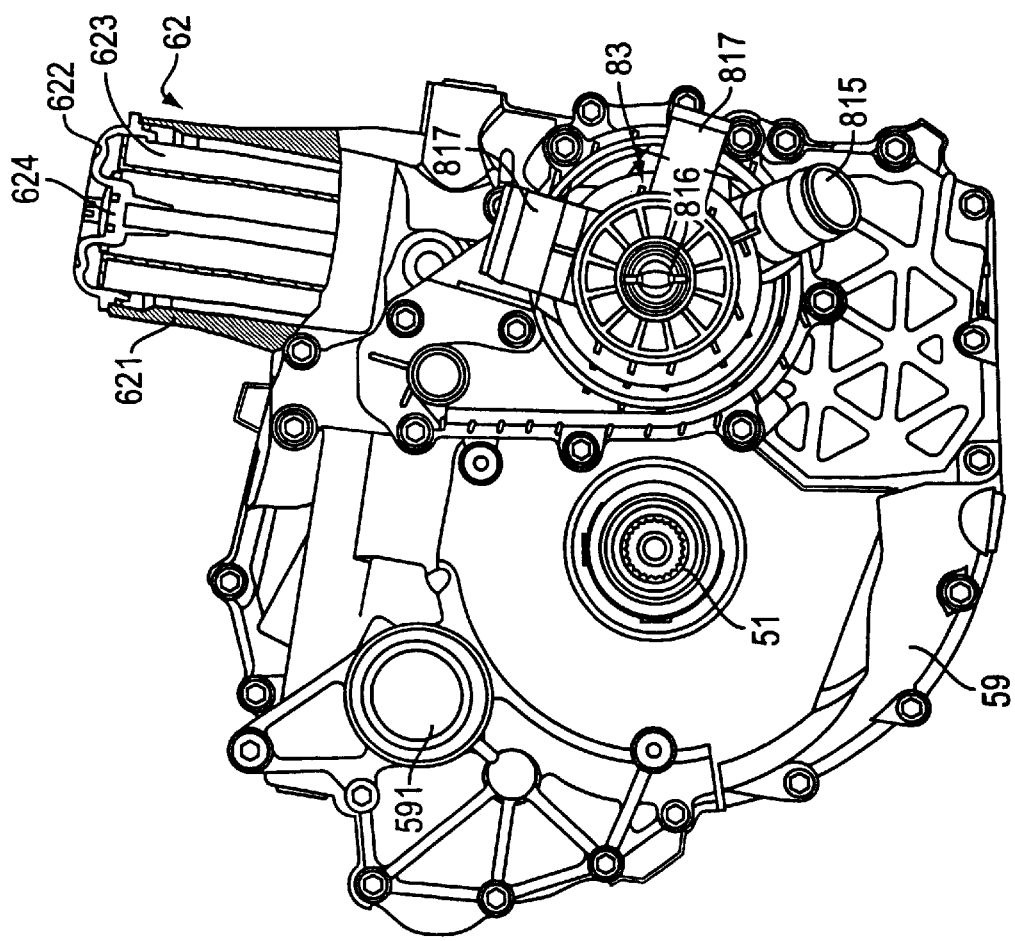
FIG. 32 is a rear view of the engine illustrating the power take off lid and cooling system in accordance with the present invention and the oil filter housing in partial cross section.
Figure 33:
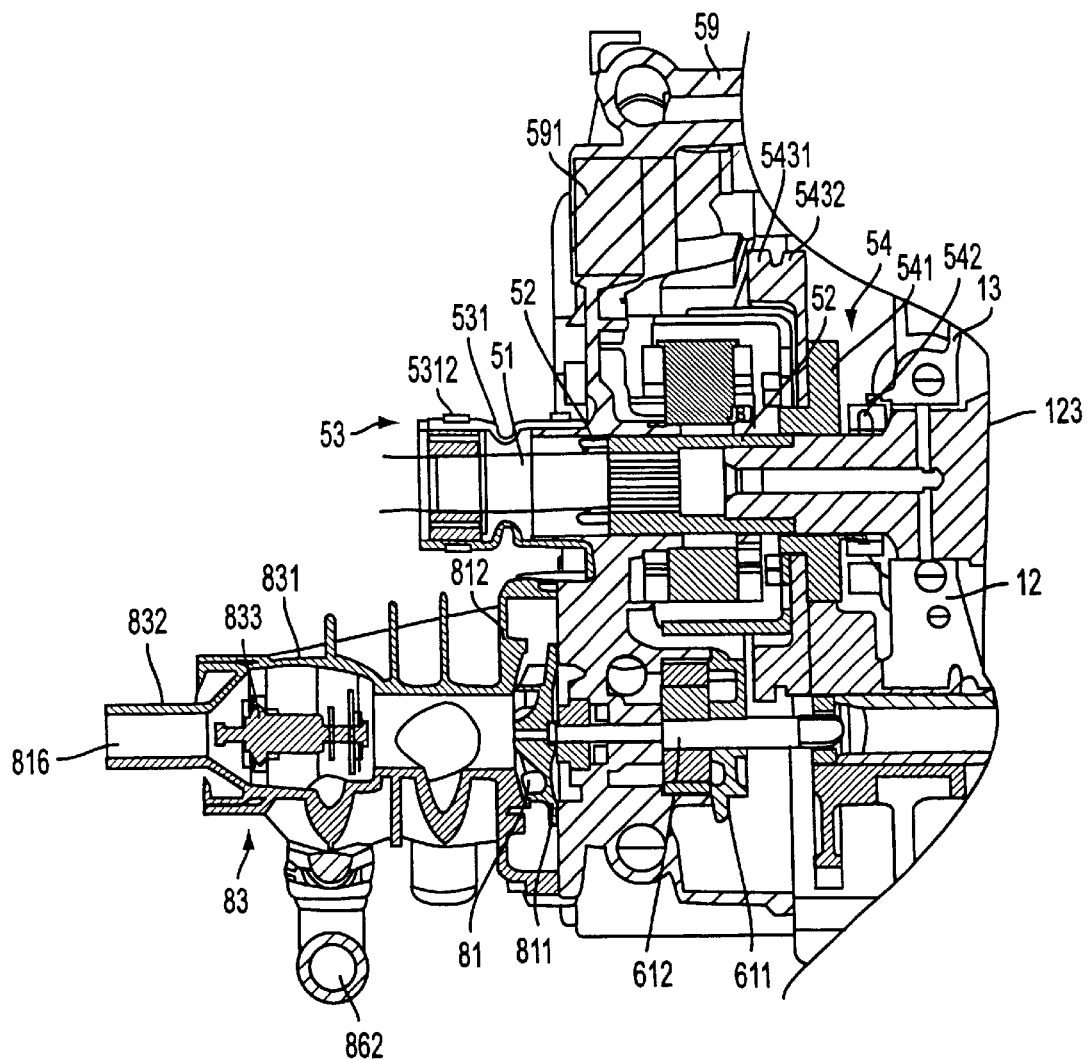
FIG. 33 is a side cross sectional view of a thermostat and pump assembly of a portion of the cooling system and a lubrication pump of the lubrication assembly in accordance with the present invention.
Figure 34:
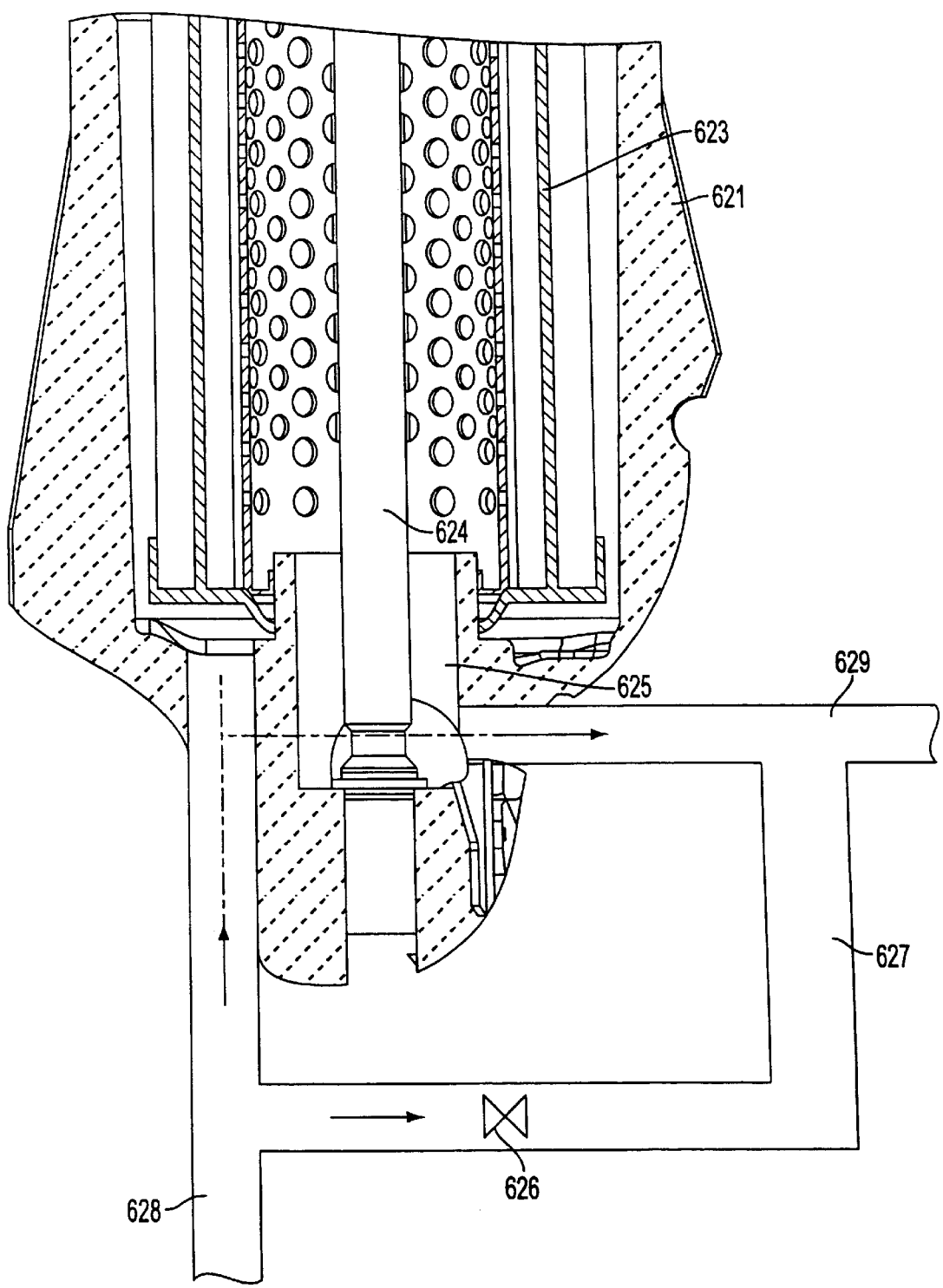
FIG. 34 is a partial schematic/partial side cross sectional view of an oil filter unit in accordance with the present invention.

From the oil cooling assembly 86, the oil is conveyed to the oil filter unit 62, as shown in FIGS. 32 and 34 through integrated channels in the lower crankcase 12. The oil filter unit 62 has an oil filter casing 621 that is integrated to the power take off housing 59. The oil filter unit 62 is closed at one end by a removable oil filter cover 622. Located within the oil filter casing 621 is an annular oil filter 623 and a valve rod 624. One end of the valve rod 624 is connected with the oil filter cover 622. The valve rod 624 is secured to the cover by a suitable fastener. The valve rod 624 acts as a fastener to secure the cover 622 to the filter casing 621. The other end of the valve rod 624 extends into a drainage opening 625. When the valve rod 624 is pulled out of the drainage opening 625, the oil which has remained in the filter casing 621 can automatically drain through the drainage opening 625. Alternatively, the oil filter cover 622 may be configured as a screw lid.

Unlike conventional oil filter units where the overflow valve is integrated in the upper region of the filter cover 622, the oil filter unit 62 includes an external overflow valve 626 and a bypass duct 627. In the event that the oil filter unit 62 is clogged, a direct connection is formed between an inlet channel 628 and an outlet channel 629 of the oil filter unit 62. This arrangement has the advantage that the oil does not flow around a dirty oil filter. Thus, no dirt particles can contaminate the oil circuit.

The filtered oil is then supplied to the engine 1 or 2 for lubricating the various components through the main oil gallery in the upper crankcase 13 of the crankcase 10, as illustrated in the oil circuit in FIGS. 8 and 11.

One aspect of the lubricating system 60 relates to the return of the oil from the crank chambers 121 in the upper crankcase 12 into the integrated oil tank 11. The oil is pushed out of the crankcase. This is effected by a differential pressure acting between the crank chambers 121 and the oil tank 11 and the induction system, respectively. This differential pressure is a result of the pressure pulses caused by the pistons 1241 in the crank chambers 121. It is also partially due to a consequence of a "Blow-By" effect, which refers to cylinder pressure losses. The piston 1241 does not provide a 100% sealing on the cylinder wall, so part of the combustion gas caused during combustion leaks past the cylinder downwardly into the lower crankcase 12. This so-called blow-by gas creates additional pressure in the crank chambers 121 below the pistons 1241 and is dependent on the load and the rotational speed of the engine. However, on account of the above-mentioned blow-by effect, the overall effect results in a pressure that is always above the pressure between the air box and the throttle body. The return of the blow-by gas is described in greater detail below in connection with the blow-by ventilation system 70.

The rotational movement of the crankshaft 123 is also utilized to carry oil to the outlet openings 111, and here two effects are to be found. First, by the direct contact of the crank webs 1231 with the oil, in case of direct wetting, there occurs an entrainment effect as a consequence of the shearing forces. Second, with smaller amounts of oil in the crank chambers 121, if there is no direct contact between crank web 1231 and oil, gas forces will occur which likewise drive the oil to the respective outlet openings 111. At the base of the crank chambers 121, in the vicinity of the outlet openings 111, stripper edges may be arranged which strip the oil from the crank webs 1231.

To enable an optimum utilization of the above-described effect for the oil return, the three crank chambers 121 (discussed above) in the crankcase 12 are hermetically separated from each other, and each crank chamber 121 is equipped with a separate outlet opening 111 for the oil. Thus, the pressure in one chamber is not affected by the pressure in the other chambers. The cross-sections of the channel system for the oil return following the outlet openings 111 are dimensioned suitably (i.e. not too large) so as to ensure the conveyance of the oil back to the oil tank 11 on account of the differential pressure, without the risk of a pressure equalization between oil tank 11 and crankcase 12. Alternatively, the channels can also unify, so that one single channel 112 leads to the oil tank 11. The arrangement should be designed such that no oil "shortcircuit" and no pressure balance will occur between the individual crank chambers 121, i.e. oil must not be permitted to flow directly from one crank chamber 121 into another chamber.

The return channels 112 for the oil return from the three hermetically closed crank chambers 121 to the oil tank 11 may be realized by channels cast into the lower crankcase 12 which enter the oil tank 11 adjacent the union between the upper crankcase 13 and the lower crankcase 12. Alternately, they may be realized by separate ducts, in particular hoses or tubes. As such, normally hoses are only used in connection with external oil tanks. In the present "in-case oil tank," hoses can be avoided. To prevent an undesired flow-back of oil from the oil tank 11 to the crank chambers 12 and—in consequence—a flooding of the crank chambers in extreme inclined positions or in flip-over position of the personal watercraft 5, non-return valves (not illustrated) may be installed in the channels 112.

To remove the lubricating oil which has collected in the region close to the bottom of the crank case 12 adjacent the bottom of the power take off housing 59, a separate suction pump 71 is provided. Like the oil pump 61, the suction pump 71 is coaxially arranged along and driven by the balance shaft 115. The pump 71 is preferably a troichoid pump. The pump 71 is located on an opposite end of the balance shaft 115 when compared to the pump 61. The oil is conveyed from the bottom of the power take off housing 59 through a duct 126 cast into the lower crankcase 12 to the suction pump 71. Alternatively, it is contemplated that the blow-by gas created in the crank chamber 121 adjacent the power take off housing 59 is fed into the power take off housing 59 to provide pressure to remove the oil from the bottom of the power take off housing 59 near the bottom of the crank case.

Figure 40:
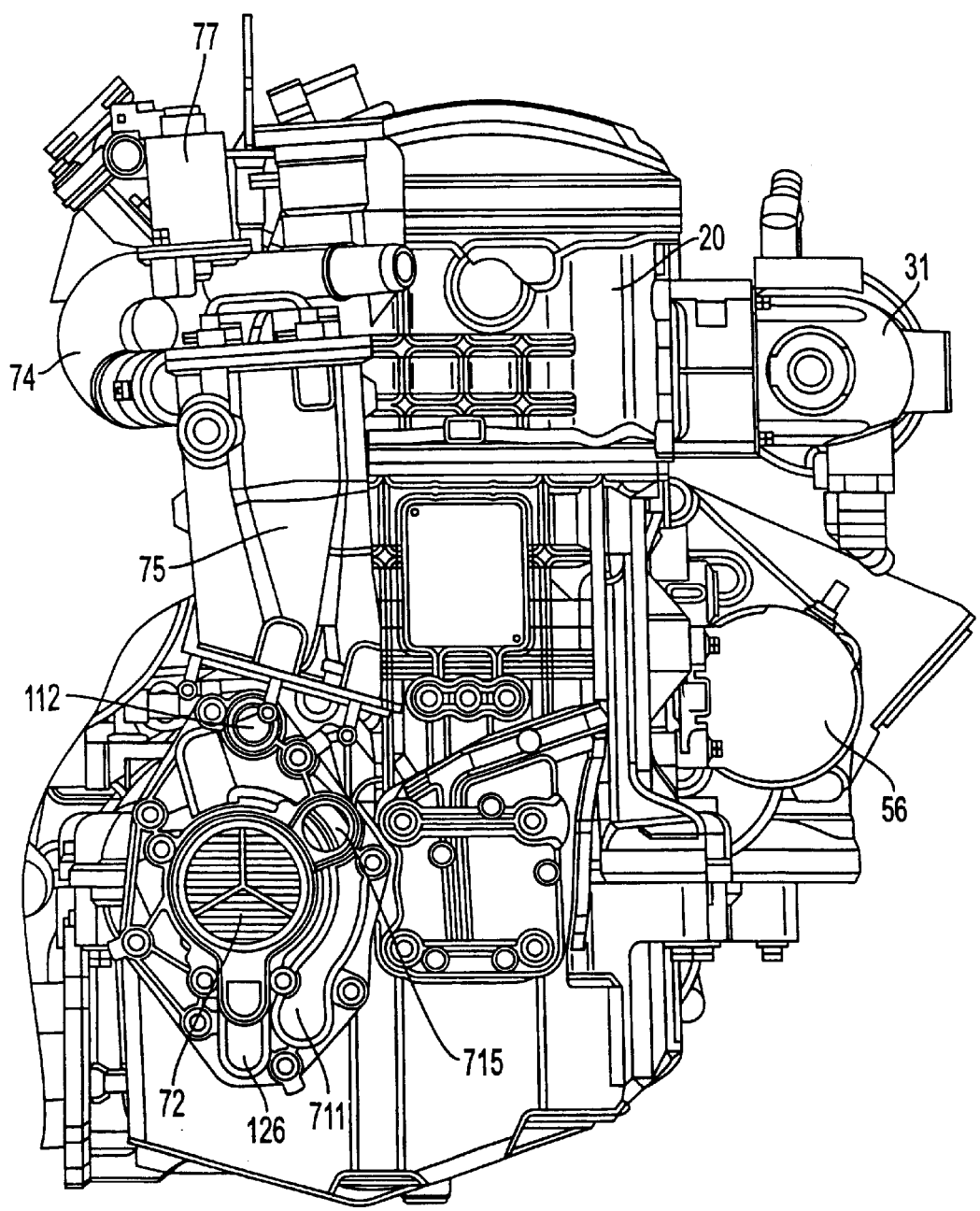
FIG. 40 is a schematic view of the blow-by ventilation system and suction pump in accordance with the present invention.
Figure 49:
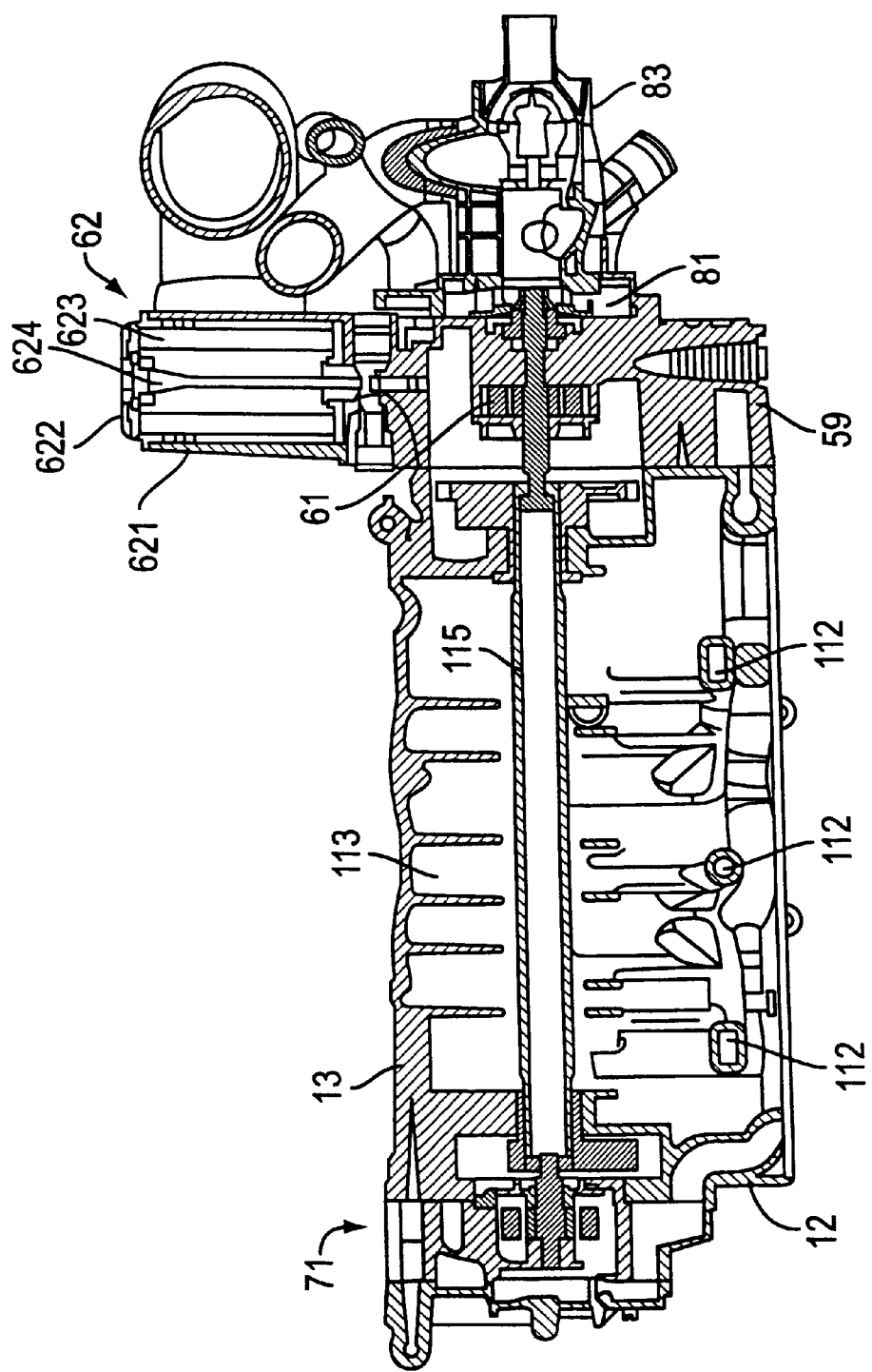
FIG. 49 is a partial side cross sectional view of the balance shaft and power take off assembly.

The oil collected in the bottom of each crank chamber 121 exits through the opening 111. The oil is then driven through the channel 112 back to the oil tank 11 by the blow-by gas pressure. The oil collected inside the power take off housing 59 is removed by a suction pump 71 or other suitable pumping assembly. The oil flows through a channel 126, shown in FIGS. 11, 41 and 49, again integrated into the lower crankcase 12 from the power take off side to the opposite side, where the suction pump 71 is mounted, as shown in FIGS. 40 and 41. The oil passes through an oil sieve 72 before it enters the suction pump 71 and is finally conveyed back through a U-shaped channel 711 to the oil tank 11, as shown in FIGS. 11, and 40. It is contemplated that the channel 711 is integrated in the housing of the suction pump 71.

Regarding the oil circuit, it is added that cooling and lubrication of the pistons 1241 and liners are effected by aid of spraying nozzles 64 at the lower side of the piston 1241, as shown in FIG. 8. Oil is supplied to the nozzles 64 from the main oil gallery 65. The spray nozzle 64 is positioned such that the jet reaches the piston lower side not only in the lower dead center position illustrated, but also in the upper dead center position.

Figure 35:
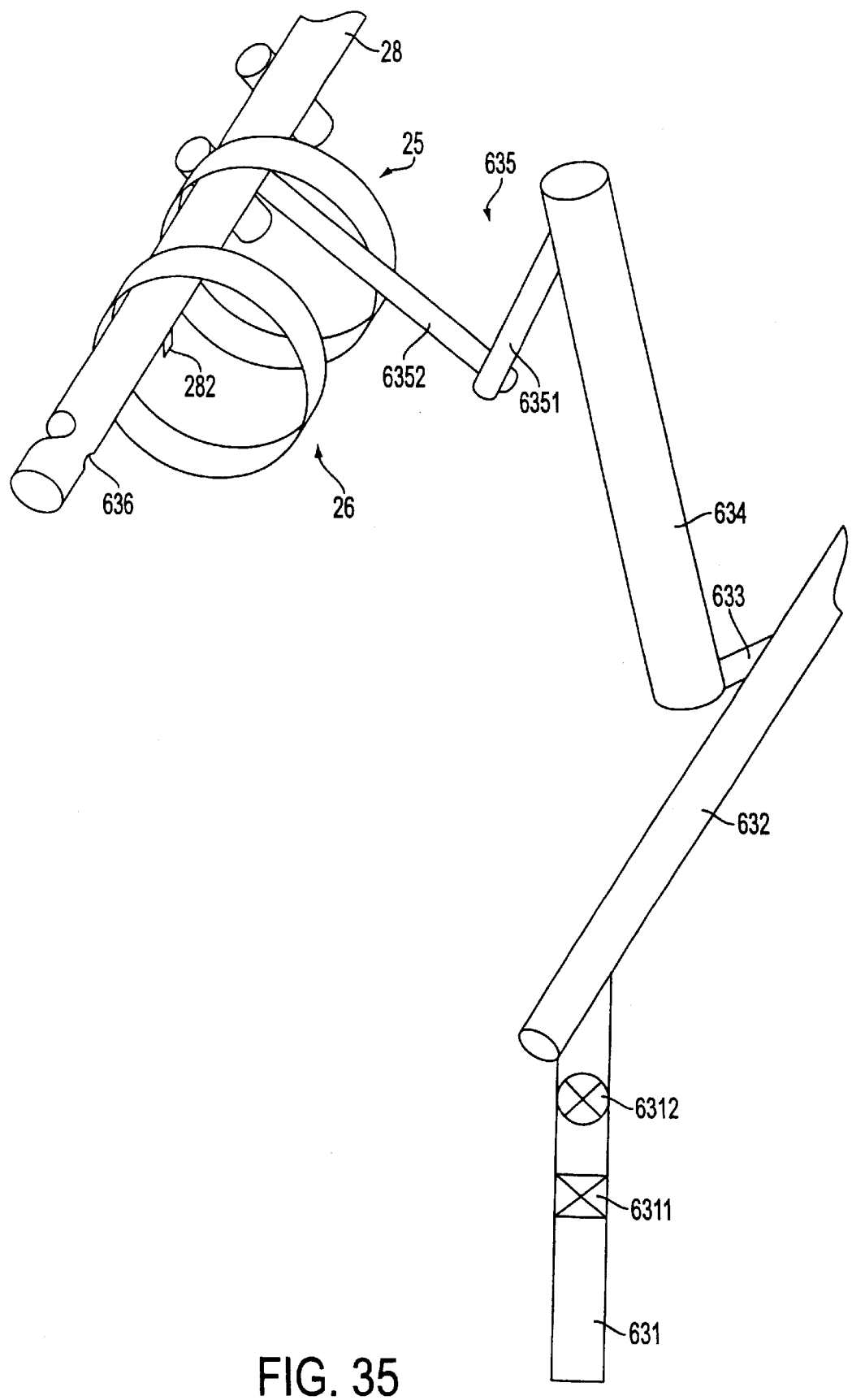
FIG. 35 is a schematic diagram illustrating the oil channel system for the lubrication system for the cylinder head housing.

FIGS. 8 and 35 illustrate one possible oil channel system 63 in the region of the cylinder head housing 20 by way of a schematic 3D representation. Other systems are contemplated to be well within the scope of the present invention. The oil is conveyed to the cylinder head housing 20 through at least one ascending duct 631 in the upper crankcase 13. The ascendind duct 631 is connected to the main oil gallery 65. The oil enters cylinder head housing 20 from the ascending duct 631 through a transverse bore 632. In the ascending duct 631, a throttle 6311 is installed which restricts the amount of oil flowing therethrough. In addition, a check valve 6312 is disposed in the ascending duct 631, which blocks the oil conduit as soon as the engine 1 or 2 is stopped. As such, a certain amount of oil can be stored in the channels in the cylinder head housing 20. This stored oil is particularly useful during a cold start since lubrication can be initiated rapidly therewith and provided to the valve train sooner to prevent damage to the valve train.

Connecting bores 633 branch off of the transverse bore 632 and connect the latter with the bores 634. The bores 634 also receive the cylinder head fastening screws. The oil rises upwardly in the annular gap between the cylinder head screw and the corresponding bores 634. The oil then enters into a V-shaped channel section 635 formed by two obliquely downwardly directed bores 6351 and 6352. From the ascending branch 6352 of the V-shaped channel section 635, the oil directly enters into the interior of the hollow rocker arm support axle 28. From there, the oil is directed to the bearing places of the roker arm assemblies 25 and 26 via the radial openings 282, as shown in FIG. 14. Also, the oil is admitted to the operating assemblies 253 and 263. It is contemplated that other channel systems and arrangements are well within the scope of the present invention provided the channel systems conduct lubricant from the main oil gallery 65 to the support axle 28.

Lubricant is supplied to the camshaft 29 via bearing bracket 293, described above, through bore 636.

Below the camshaft 29, the oil ma y accumulate in a small basin in which the lobes 291 and 292 of the camshaft 29 may be immersed for lubricating purposes. The lubricant within the cylinder head housing 20 collects in a depression under the camshaft 29 adjacent the cylinder closest to the power take off assembly 50. The oil from the other cylinders within the cylinder head flows to the depression through passageways 295, which interconnect the areas in the cylinder head adjacent the other cylinders . The oil exits the cylinder head housing 20 through an inclined passageway into the control chain chamber 202 where it flows into the power take off assembly 50. This lubricant contributes to the lubrication of the gears and supercharger 90(if present) within the power take off assembly 50.

Blow-By Ventilation System

The engines 1 and 2 are preferably equipped with a blow-by ventilation system 70 for separating oil from the vented blow-by gas. A preferred form of the blow-by ventilation system 70 is illustrated in FIGS. 3, 4, 11, 40, 41 and 46.

The blow-by gas originating from the combustion chambers 124 due to leakage between the pistons 1241 and cylinder liners first accumulates in the (sealed) crank chambers 121 and from there it flows together with the oil through the channels 112 to the oil tank 11, where it accumulates and mixes in the upper portion 113 of the oil tank 11 with any gas in the oil tank 11 from the power take off assembly 50. From the oil tank 11, the gas mixture is then conveyed through a channel 712 (in the housing of the suction pump 71 and the lid of the sieve 72), shown in FIG. 40 to a shutoff and pressure relieve valve 73, which is open in normal engine operation. The pressure relief valve 73 includes a valve rod 731 that moves the valve 73 between open and closed positions by a solenoid assembly 77. In the event that the solenoid assembly 77 is not operational, the pressure relief valve 73 includes a spring assembly 732 that permits the opening of the valve 73 in the event of a build up of pressure within the tank 11.

Figure 41:
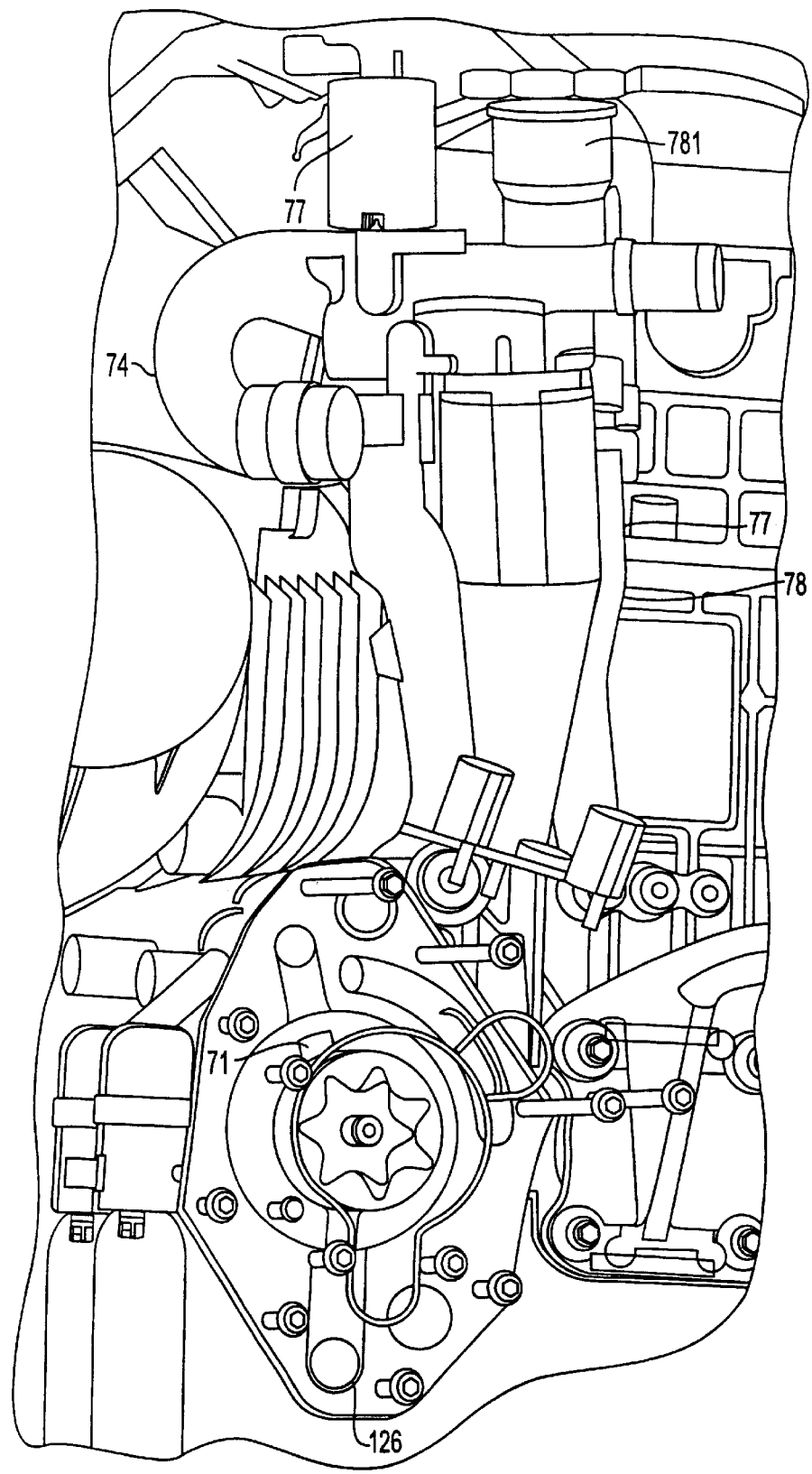
FIG. 41 is a schematic view of the blow-by ventilation system and suction pump of FIG. 38 having the suction pump cover removed.

The gas mixture from the oil tank 11 is split into two partial flows: a first portion flows back to the cylinder head chamber within the cylinder head housing 20 through a passageway 74, shown in FIGS. 40 and 41. A second portion is vented tangentially into an oil separator 75 designed as a cyclone. In the cyclone, the gas mixture is separated from oil by centrifugal forces due to the swirling of the gas/oil mixture in the cyclone. The cleaned gas mixture leaves the cyclone through a central pipe 751. The cleaned gas mixture then passes a second shutoff and pressure relief valve 76 and is finally conveyed to the air intake between the airbox and the throttle body 411, where it merges with the fresh air drawn in by the engine.

The shutoff and pressure relief valve 76 is also mounted on the valve rod 731 and is also actuated by the solenoid 77. With this arrangement, the valves 73 and 76 operate simultaneously. The valves 73 and 76 are closed by drawback springs 732 and 761 when the solenoid 77 is not activated and they are open when the solenoid 77 is activated. With this arrangement, the engine is sealed, preventing oil leaks when the engine is shut down. In normal (upright vehicle) engine operation, the solenoid 77 is activated and the valves 73 and 76 are opened respectively. However, in the event of a roll-over of the vehicle, the valves are closed instantly to prevent oil from entering the induction system 40 and/or the airbox and leaking into the environment. The closure of valve 73 prevents oil from accumulating in the cylinder head housing 20 in a roll-over event. This would cause a temporary lack of oil in the oil tank 11, when the personal watercraft 5 has returned to a normal upright position and could result in an undersupply of lubricant to the engine, which may result in severe damage to the engine 1 or 2. The valves 73 and 76 are also closed when the engine is shut down.

A pressure sensor or sensor switch may be provided in the oil tank 11 or in the channel 712 to sense the pressure within the tank 11. If the oil pressure exceeds a certain threshold value, the engine management system 200 operates in an emergency mode (e.g. limp home function). The engine management system operates the engine at a reduced speed. The engine management system also interacts with other onboard computers systems to notify the operator of the engine malfunction. Additionally, the pressure sensor can be used to detect oil leakage in the lubrication circuit.

The gas mixture enters the upper portion of the cyclone 75 through the opening 755. As such, the gas mixture tangentially enters the cyclone 75. Oil droplets within the gas mixture are thrust against the inner wall of the cyclone 75 as a result of centrifugal forces within the cyclone 75.

The separated oil then flows down the inner wall of the cyclone 75 towards opening 752; collects in the bottom of the cyclone 75; and exits the cyclone 75 through an opening 752 into a channel 753 integrated in the sieve lid 721, and merges with the oil flow from the power take off assembly 50 in front of the oil sieve 72, to be conveyed back to the oil tank 11. Within the channel 753 there is provided a throttle 754 which ensures that a sufficient height negative pressure (vacuum) can build up in the suction port of the suction pump 71, so that the power take off housing 50 is drained reliably in all operating conditions. In a cold start condition (when the oil is very viscous) the throttle 754 may even be closed by an additional valve (not shown) especially at idling speed to guarantee the aforesaid requirement.

An oil filler tube 78 is integrated to the cyclone 75. A cap 781 is provided for closing the filler tube 78. Fresh oil flows down the filler tube 78 into a channel 722 integrated in the sieve lid 721. The oil enters a U-shaped duct through a port 715, shown in FIG. 40, in the housing of the suction pump, merges with the oil from the power take off assembly 50 and is finally conveyed to the oil tank 11.

In the preferred embodiment, the valves 73 and 76, the cyclone 75 and the oil filler tube 78 are assembled to form a single unit.

In accordance with the blow-by gas ventilation system 70 described herein, a slight vacuum (underpressure, negative pressure, subpressure) is generated in the interior in the power take off assembly 50 and within the cylinder head housing 20. As a result, no oil or contaminated blow-by gas can escape to the environment.

Engine Cooling System

An engine cooling system 80 will now be described in connection with FIGS. 25, 32 and 33. The engine cooling system 80 is a closed system utilizing a coolant such as glycol, water or a mixture of them. The present invention, however, is not limited to these coolants; rather, it is contemplated that other cooling liquids are considered to be well within the scope of the present invention. The cooling circuit of the engine cooling system 80 is illustrated in FIG. 25. The closed loop cooling system 80 cooperates with the open loop cooling arrangement described above in connection with the exhaust manifold 30 to effectively cool the engines 1 and 2.

The engine cooling system 80 includes a pump assembly 81 located on one end of the engine 1 or 2, as shown in FIG. 32.

As illustrated in FIG. 33, the pump assembly 81 is arranged externally of the power take off housing 59. The power take off housing 59 and pump lid 611 together form the pump casing. It is designed as a rotary pump and consists of an impeller 811 which is located, screwed or attached onto the end of the connecting shaft 612, which projects from the power take off housing 59. The connecting rod 612 also drives the oil pump 61. Impeller 811 is driven by connecting rod 612. The connecting rod 612 also drives the oil pump 61. The pump assembly 81 also includes a pump lid 812, which is fastened to the power take off housing 59 and forms the pump casing in cooperation therewith. The pump assembly 81 has a one piece housing having an integrated thermostat.

As shown in FIG. 25, the coolant flows from the pump assembly 81 through a passageway 82 to the cylinder block of the upper crankcase 13. The passageway 82 includes a main passageway 821 and a by-pass passageway 822. The passageways 821 and 822 direct coolant to the cooling passageway 125 in the cylinder block. The coolant flows along the exterior of the cylinders 124, as shown in FIG. 25. With this arrangement, the coolant travels in a generally U-shaped manner along a side of the cylinders 124 adjacent the intake manifold; around the end of the cylinder furthest from the power take off assembly 50 and then along the side of the cylinders adjacent the exhaust manifold in a direction back towards the power take off assembly 50. At the same time, the coolant is directed in an upward direction towards the cylinder head housing 20. The by-pass passageway 822 reduces the load on the main passageway 821 and improves the flow pattern in the cooling passageway 125 at an end portion of the cooling passageway 125 opposite the inlet. The coolant from the by-pass passageway 822 mixtures with the coolant in the coolant passageway 125 to reduce the temperature of the coolant in the end portion of the cooling passageway 125. Furthermore, the entry of coolant into the cooling passageway 125 from the by-pass passageway 822 improves the upward flow of coolant into the cylinder head housing 20. It is preferred that the passageways 821 and 822 are integrally formed in the power take off housing 59 and crankcase 10. It, however, is contemplated that the passageways may be hoses connecting the components to one another.

From the upper crankcase 13, the coolant then passes upwardly to the cylinder head housing 20 through bores 131 in a head gasket 130 positioned between the upper crankcase 13 and cylinder head housing 20, as schematically illustrated in FIG. 25. The bores 131 are located on the exhaust manifold side of the gasket 130. These bores 130 act as throttles to adjust the flow of coolant into the cylinder head housing 20. Additional small bores are located on the intake manifold side of the gasket 130. These bores vent air trapped within the passageway 125 into the cylinder head housing 20. The coolant first passes over the exhaust side of the cylinder head toward the intake side of the cylinder head before exiting the cylinder head housing 20 through a common passageway.

From the cylinder head housing 20, the coolant is then conveyed through a hose to a thermostat 83 through an inlet passageway 817 located on the pump assembly 81, as shown in FIGS. 25 and 32. As illustrated in FIG. 33, the thermostat 83 is directly mounted on the pump lid 812. The thermostat 83 comprises a two-part thermostat casing 831 and 832 including hose connections and a temperature-sensitive valve 833, which automatically opens if a predetermined temperature threshold value is exceeded. The coolant then flows through outlet passage 816 to a heat exchanger 84 (shown schematically in FIG. 25), where the coolant is cooled by exchanging heat to the atmosphere. This can be in the form of a cooling plate exposed to the body of water. The cooling plate may be located in a lower portion of the hull of the personal watercraft 5. The cooling plate is described in U.S. Provisional Patent Application Ser. No. 60/160,819, filed Oct. 21, 1999 entitled "WATERCRAFT WITH CLOSED-LOOP HEAT EXCHANGER," and U.S. patent application Ser. No. 09/691,129, filed Oct. 19, 2000 entitled "WATERCRAFT HAVING A CLOSED COOLANT CIRCULATING SYSTEM WITH A HEAT EXCHANGER THAT CONSTITUTES AN EXTERIOR SURFACE OF THE HULL" the specifications of which are incorporated herein specifically by reference. The coolant is then returned to the pump assembly 81 through an inlet 815.

The primary purpose of the cooling system 80 is to cool the engine 1 or 2 during operation. The operation of the cooling system 80 is temporarily modified during engine start-up so that the engine quickly reaches an optimal operating temperature. During initial engine start-up, the thermostat 83 deactivates the heat exchanger 84. As such, the coolant is not cooled prior to reentry into the pump assembly 81; rather, the coolant returns directly from the inlet 817 into the coolant pump 81.

The cooling system 80 furthermore includes an oil cooling assembly 86. The oil cooling assembly 86 is connected to pump assembly 81 and thermostat 83. With this arrangement, a portion of the coolant from the pump assembly 81 is directed to the oil cooling assembly 86 through passageway 861 to cool the engine oil. After passing through the oil cooling assembly 86, the coolant returns to the thermostat 83 via return passageway 862. The coolant from the passageway 862 enters the thermostat housing in the vicinity of the inlet 817. The oil cooling assembly 86 preferably is a plate-type cooler and disposed on the side of the lower crankcase 12. The coolant, which heats sooner than the oil, is used to heat the engine oil during engine start-up.

Figure 42:
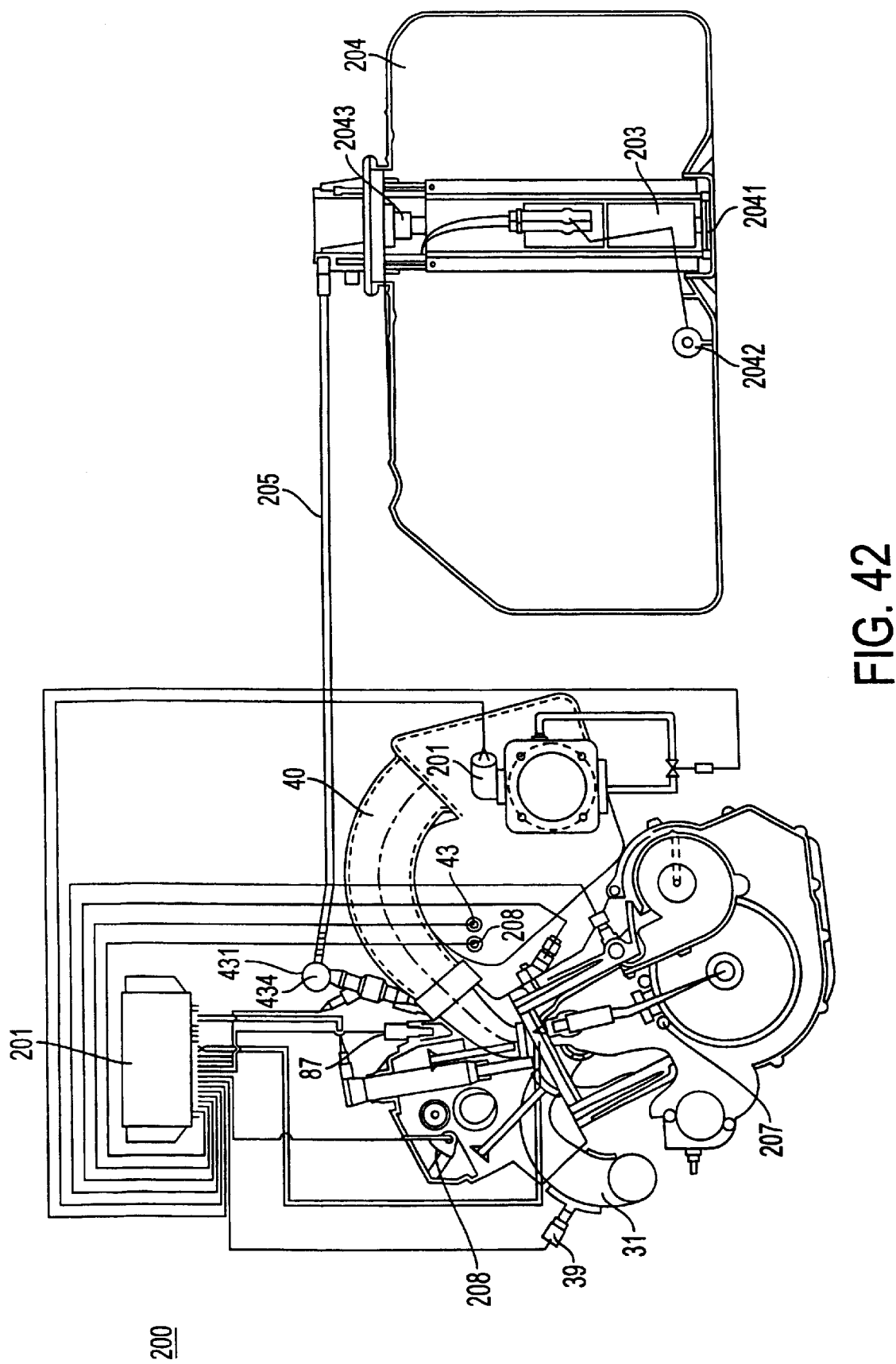
FIG. 42 is a schematic view of the engine management system for the engine in accordance with the present invention.

The cooling system 80 further includes a temperature sensor 87, which is linked to the engine management system, shown in FIGS. 25 and 42. As shown in FIG. 25, an expansion reservoir 88 is provided in the return from the cylinder head housing 20 to the thermostat 83, as shown in FIG. 23. The expansion reservoir 88 adjusts for expansion of the cooling fluid within the system 80. The expansion reservoir 88 further a refill port 881 for refilling the system 80. The reservoir 88 further provides a venting function for removing air from the cooling system 80. In this manner, the interconnecting duct between the reservoir 88 and the cylinder head housing 20 has to be linked to the highest point in the cylinder head housing 20 to prevent the formation of an air barrier which could cause overheating.

Supercharger Assembly

Figure 38:
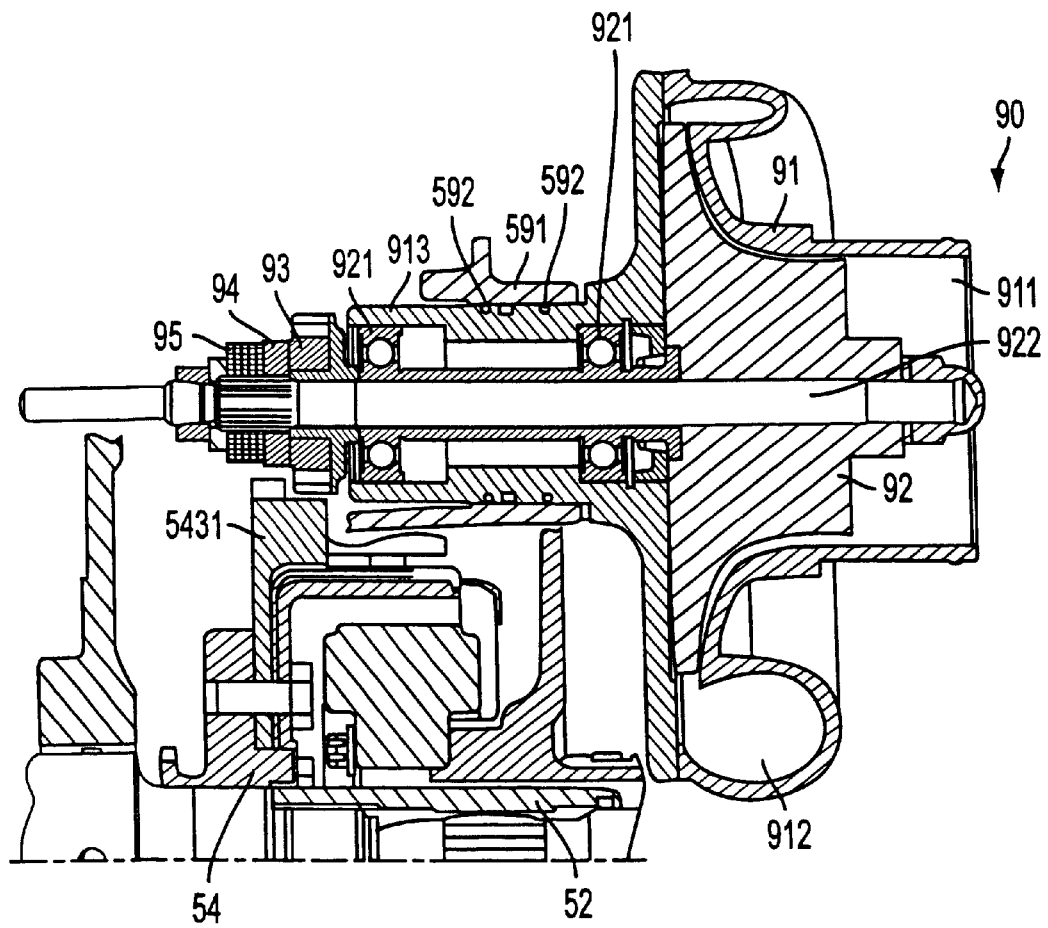
FIG. 38 is a cross sectional side view of the power take off assembly having a supercharger for the engine in accordance with the present invention.

As discussed above, the engines in accordance with the present invention may include a supercharger 90. The engine 2 having a supercharger 90 is illustrated in FIGS. 6, 7, 30, 31 and 38. The supercharger 90 is provided to increase the air intake and enhance engine performance. The preassembled supercharger 90 is plugged in a corresponding port 591, as shown in FIG. 33, in the power take off housing 59 and sealed with sealing rings 592, as shown in FIG. 38. It is contemplated that a turbocharger may be used in connection with the present invention. The supercharger, however, provides improved operating characteristics when compared to the turbocharger. Furthermore, the turbocharger produces additional heat as compared to the supercharger, which places increased demands on the cooling systems.

The supercharger 90 includes a cast housing 91, which is preferably formed from a metal, however, it may be formed from a high strength plastic or other suitable material. The housing 91 includes an inlet portion 911. The inlet portion 911 is operatively connected to the airbox (not shown). Air enters the supercharger 90 through the inlet portion 911. Located within the housing 91 adjacent the inlet portion 911 is an impeller 92, which operates to draw air into the supercharger from the airbox. An air passageway 912 extends around the impeller 92 to collect the air compressed by the impeller. The air passageway 912 is connected to the intake manifold 41 through the throttle body 411. The housing 91 further includes a mounting portion 913 that extends backward from the inlet portion 911. The mounting portion 913 is received within the port 591 in the power take off housing 59 and sealed with at least one sealing assembly 592.

As shown in FIG. 38, a blower drive shaft 922 extends through the mounting portion 913 and inlet portion 911. The blower drive shaft 922 is rotatably mounted within the housing 91 with at least one bearing assembly 921. A drive pinion 93 is coupled to the blower drive shaft 922. It is preferred that this be a non-positive coupling. As such, the drive pinion 93 is non-positively connected with the blower shaft 922 via an intermediate element 94 by a biasing spring force, which is preferably supplied by a spring assembly 95. The spring assembly 95 includes a plurality of cup springs. Other spring assemblies and means for providing a connection that can slip under high torque to prevent damage to the impeller or other components, however, are considered to be well within the scope of the present invention. The drive shaft 922 includes splines to prevent rotational movement of the intermediate element 94 with respect to the drive shaft 922. The shaft 922 includes a lubrication passageway that delivers lubricant to the drive pinion 93 to reduce wear. The lubrication passageway is connected to the lubrication system. The connection between the drive pinion 93 and the intermediate element 94 is formed as a plane frictional surface. This unique connection assembly can dampen the rotational and torsional vibrations transmitted by the crankshaft 123.

The supercharger 90 is operatively coupled by the drive pinion 93 to the gear assembly 54 through gear 5431. The supercharger 90 preferably includes a cooling jacket connected to the open or closed loop cooling system to cool and prevent failure of the supercharger 90. The cooling of the supercharger 90 improves engine performance.

In accordance with the present invention, the supercharger 90 preferably utilizes a low-cost rotary (radial or radial-axial) blower. The present invention, however, is not limited to these blowers; rather, it is contemplated that a positive displacement blower (e.g. a Rootes or Wankel blower) may be employed. Furthermore, the supercharger 90 may be used for separating a certain water content from the intake air.

Control Tensioner

Figure 39:
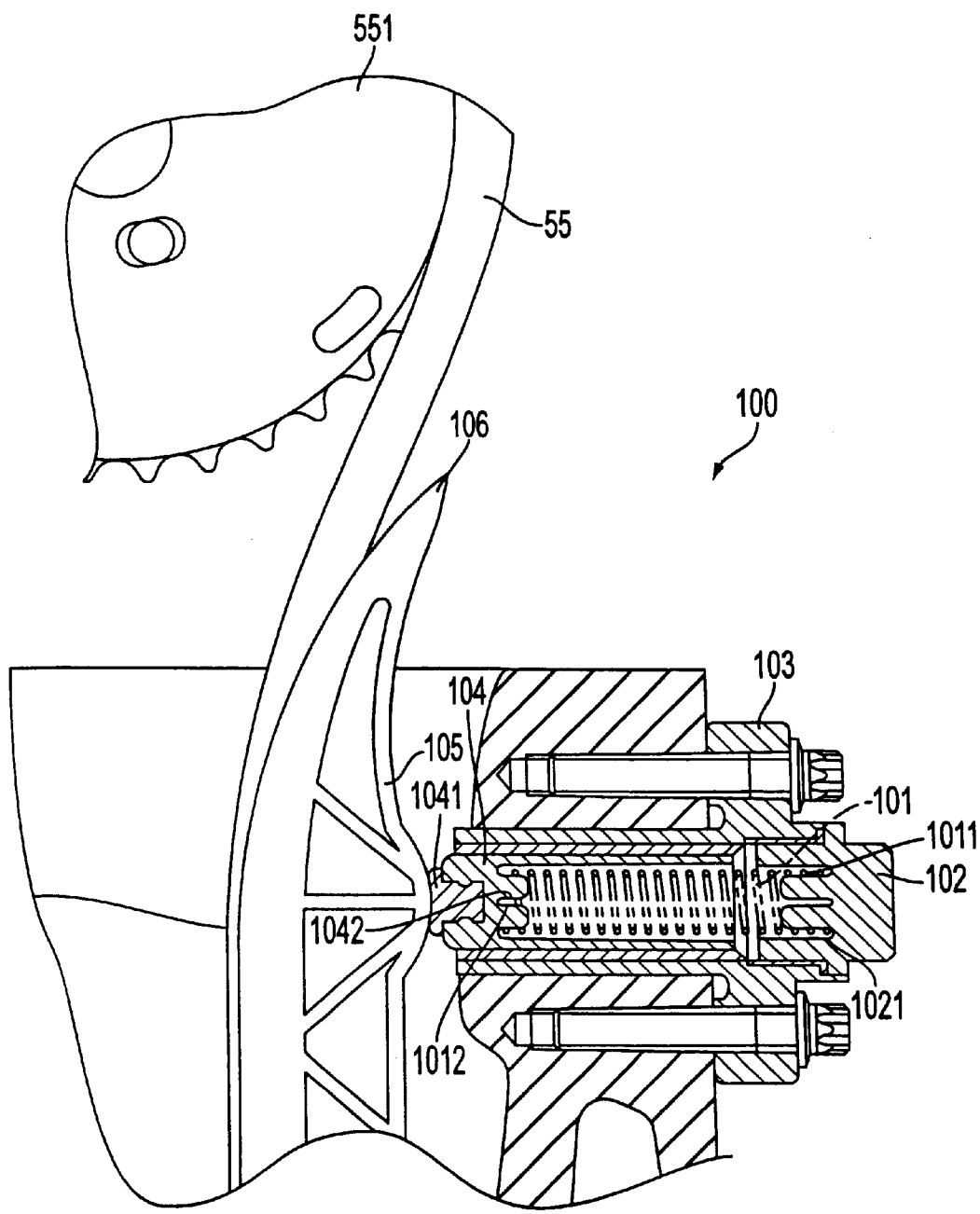
FIG. 39 is a partial schematic/partial sectional view of the cam chain tensioner in accordance with the present invention.

In accordance with the present invention, the engines 1 and 2 are preferably equipped with a control tensioner for controlling the tension within chain 55. The present invention, however, is not limited for use with a chain; rather, it is contemplated that the control tensioner can be used with other flexible linkages, including but not limited to belts. A mechanical chain tensioner 100 is illustrated in FIG. 39. The tensioner 100 includes a driving element 101. The driving element 101 preferably includes a spring assembly. The spring assembly is preferably a rotationally active helical pressure spring. The spring assembly 101 is rotationally biased by aid of a thread cap 102. The spring includes a spring ender 1011 that engages a slot 1021 in thread cap 102. The thread cap 102 is externally screwed into a retainer 103. The spring assembly 101 is received at one end in a blind hole bore of a hollow adjustment element 104 which is screwed into a thread bore of the retainer 103. The spring also includes a spring end 1012 that engages a slot 1042 in adjustment element 104. The overlapping thread engagement of adjustment element 104 with retainer 103 is designed to be relatively long. As oil gets into this threaded connection, it provides a small damping effect to the adjustment element 104 due to vibrations of the cam chain. This small damping effect is enhanced if the thread overlap is kept relatively long. The external thread of the adjustment element 104 preferably includes multiple threads and it is designed such that it is borderline self-locking in the retainer 103. This design must take into account the presence of oil between the threads, which reduces friction, when determining the necessary inclination of the threads. If the inclination is too small (very self locking), a strong spring force is required to overcome the locking action of the threads. It is desirable to avoid unnecessary tension on the chain to avoid wear and decreases in the lifetime of the chain. The self tensioning action is effected by the interaction of the chain vibration and the borderline self locking of the threads. That is, it will maintain its extended position under normal loads but can retract a distance under high loads to prevent damage to the cam chain. For instance, if automatic adjustment occurs when the engine is cold, upon reaching operation temperature, the aluminum cylinder and head have expanded more than the steel cam chain and can create too high of a tension in the chain. The borderline self locking feature allows the plunger to retract slightly before chain tension becomes so high as to damage the chain. The adjustment element 104 is rotationally driven by the spring assembly 101 if the tension of the chain 55 slackens and is axially outwardly displaced. The adjustment element 104 acts via a balancing arcuate intermediate piece 105 on a tensioning rail 106. The chain tensioner 100 enables a later adjustment by aid of the combined biasing and fixing element 102 if the chain 55 undergoes elongation.

The thread piece 102, the retainer 103 and adjustment element 104 preferably are made of synthetic material because of the smaller thermal elongation encountered as compared to aluminum. The adjustment element 104 includes a steel insert 1041 on one end to reduce wear.

In accordance with the present invention, the engines 1 and 2 described herein are not limited to the mechanical chain tensioner 100; rather, other tensioner assemblies are contemplated to be well within the scope of the present invention. For example, a hydraulic tensioner may be used. The mechanical tensioner 100, however, has numerous advantages over this hydraulic counterpart. First, the mechanical tensioner 100 can be manufactured at a lower cost and does not require a complicated oil supply.

Engine Control Unit

The operation of the engine 1 or 2 is controlled by an engine management system 200, as shown in FIG. 42. The engine management system 200 includes an electronic control unit 201 monitors and controls the operation of various engine components including but not limited to ignition, the fuel pump, the fuel injection assembly, the air intake, engine cooling, engine speed, engine lubrication, exhaust gas in the muffler in response to input from various sensors and monitors located with the engines 1 and 2. It is contemplated that the electronic control unit 201 may further control functions, such as, e.g., realization of a departing lock, realization of a start/stop control, and the identification of authorized personal watercraft users. The electronic control unit 201 further communicates with the other computer systems on the personal watercraft for the control of instruments, non engine watercraft functions and service needs.

The engine management system 200 also controls the gas pump 203 in the gas tank 204, which includes a coarse filter 2041 and a float assembly 2042.

The gas pump 203 has an associated pressure regulator 2043, such that a constant gas pressure is mechanically provided. From there, a returnless fuel system 205 leads to the injection nozzles or valves 434 seated on the fuel rail 431. These injection nozzles 434 inject the fuel in the form of jets in the air in the intake passageway. The engine management system 200 controls the operation of the nozzles 434 such that there is sequential injection, wherein each cylinder has an individual injection (i.e., no group injection). The injection amount is determined by the engine control device 201 on the basis of the applied characteristic fields by the pulse width, i.e. by the duration of the injection time.

A returnless fuel system 205 prevents the fuel from heating due to the engine heat, as could otherwise be the case with a fuel return from the engine to the fuel tank.

The engine management system 200 also includes various sensors, such as the temperature sensor 39 in the exhaust muffler, an air temperature sensor 43 attached to the intake manifold 41 and a water temperature sensor 87.

A knock sensor 206 senses at an early time the knocking critical for the engine—which has a high specific performance level. The knock sensor 206 includes a piezo quartz element, which measures the solid-borne acoustic signals at the cylinder block and transmits the corresponding signals to the electronic control unit 201. The latter has a detection software to detect a possible knocking combustion and to cause a correction in a manner known per se, by ignition angle displacement.

The sensors further include the crankshaft position sensor 207. A corresponding rotary position sensor 208 is associated with the camshaft. By aid of this camshaft sensor 208, it is recognized whether the crankshaft is present in the angle range of 0 to 360° or in the range of 360 to 720°, which is possible via the camshaft because the latter rotates at half the rotational speed of the crankshaft. For the sake of simplicity, the camshaft sensor 208 is directly associated with the chain wheel 551 at the camshaft.

For load measurement, the actual load of the engine is calculated by the intake manifold pressure measured by sensor 210 and engine speed measured from the crankshaft 123 in the power take off assembly 50. A throttle potentiometer 209 is used for corrections and a limp home function. In the event the engine is operating in a limp home function (e.g., broken intake air pressure sensor), the engine control unit 201 communicates with another onboard computer system to notify the operator via an instrument panel that the engine is operating in a limp home function. A pressure sensor 210 is arranged in the suction pipe to sense the absolute pressure, which is especially useful for the engine 2 containing the supercharger assembly 90 and for all operation modes with slightly opened or closed throttle valve. Thus, there is no direct air amount or air mass measurement, but auxiliary parameters are used therefor.

Finally, for the sake of completeness, various voltage checks should be mentioned which are carried out by the electronic control unit 201, e.g. for the supply voltage of the injection valves, which is useful insofar as the board voltage on the personal watercraft 5 may very well fluctuate.

It will be apparent to those skilled in the art that various modifications and variations may be made without departing from the scope of the present invention. Thus, it is intended that the present invention covers the modifications and variations of the invention, provided they come within the scope of the appended claims and their equivalents.

What is claimed is:

1. A four stroke internal combustion engine, comprising:
    a crankcase having a crank shaft rotatably mounted therein;
    a cylinder head connected to the crankcase, wherein the crankcase and the cylinder head form at least one cylinder;
    at least one intake valve for the at least one cylinder, wherein the at least one intake valve has an intake valve axis;
    at least one exhaust valve for the at least one cylinder, wherein the at least one exhaust valve has an exhaust valve axis;
    a valve actuation assembly located in the cylinder head for operating the at least one intake valve and the at least one exhaust valve, wherein the valve actuation assembly is located substantially between the intake valve axis and the exhaust valve axis, the valve actuation assembly comprising
        a cam shaft rotatably mounted within the cylinder head,
        a support axle mounted within the cylinder head, offset from the cam shaft;
        at least one exhaust rocker arm pivotally mounted on the support axle,
        at least one intake rocker arm pivotally mounted on the support axle,
        wherein the cam shaft is operatively coupled to the crankshaft such that rotational movement of the crankshaft is transferred to the cam shaft,
        wherein the at least one exhaust rocker arm is operatively coupled to the cam shaft for operating the at least one exhaust valve, and
        wherein the at least one intake rocker arm is operatively coupled to the cam shaft for operating the at least one intake valve; and
    a lubrication system for lubricating the engine,
    wherein the lubrication system includes a supply of lubricant to the cylinder head,
    wherein the support axle has a central passageway extending therethrough, and
    wherein at least a portion of the supply of lubricant flows through the central passageway in the support axle.

2. The four stroke internal combustion engine according to claim 1, wherein each cylinder has a longitudinal axis, wherein each of the at least one intake valve and the at least one exhaust valve is disposed at an angle with respect to the longitudinal axis.

3. The four stroke internal combustion engine according to claim 2, wherein the engine includes a pair of exhaust valves for each cylinder and the valve actuation assembly includes an exhaust rocker arm for each exhaust valve.

4. The four stroke internal combustion engine according to claim 3, wherein each exhaust rocker arm comprises:
    a cam follower located on one end of the exhaust rocker arm,
        wherein the cam follower is adapted to follow a profile of an exhaust cam lobe located on the camshaft; and
    an exhaust hydraulic adjuster located on an opposite end of the exhaust rocker arm, wherein the exhaust hydraulic adjuster is adapted to contact and operate the exhaust valve in response to movement of the exhaust rocker arm by the exhaust cam lobe.

5. The four stroke internal combustion engine according to claim 2, wherein the engine includes a pair of intake valves for each cylinder and the valve actuation assembly includes a forked intake rocker arm for the pair of intake valves.

6. The four stroke internal combustion engine according to claim 5, wherein the forked intake rocker arm comprises:
    a cam follower located on one end of the intake rocker arm, wherein the cam follower is adapted to follow a profile of an intake cam lobe located on the camshaft;
    a first actuator arm for operating a first of the pair of intake valves;
    a second actuator arm for operating a second of the pair of intake valves; and
    a pair of intake hydraulic adjusters located on an opposite end of the forked intake rocker arm,
    wherein each intake hydraulic adjuster is adapted to contact and operate the one of the pair of intake valves in response to movement of the intake rocker arm by the intake cam lobe.

7. The four stroke internal combustion engine according to claim 6, wherein each of the intake hydraulic adjusters comprises:
    an intake piston actuator slidably received within a cavity in an end of the actuator arm, and a fluid passageway extending through the actuator arm to the support axle, and
    wherein the central passageway in the support axle is in fluidic communication with the fluid passageway such that fluid within the central passageway flows through the fluid passageway to the cavity to bias the intake piston actuator into engagement with the intake valve.

8. The four stroke internal combustion engine according to claim 7, wherein the exhaust rocker arms are rotatably mounted on the support axle on opposite sides of the intake rocker arm.

9. The four stroke internal combustion engine according to claim 8, wherein each exhaust rocker arm comprises:
    a cam follower located on one end of the exhaust rocker arm,
        wherein the cam follower is adapted to follow a profile of an exhaust cam lobe located on the camshaft; and
    an exhaust hydraulic adjuster located on an opposite end of the exhaust rocker arm, wherein the exhaust hydraulic adjuster is adapted to contact and operate the exhaust valve in response to movement of the exhaust rocker arm by the exhaust cam lobe.

10. The four stroke internal combustion engine according to claim 6, wherein the first actuator arm is spaced from the second actuator arm.

11. The four stroke internal combustion engine according to claim 10, further comprising:
a spark plug assembly disposed in the cylinder head, wherein the spark plug assembly is positioned between the first actuator arm and the second actuator arm.

12. The four stroke internal combustion engine according to claim 11, wherein the longitudinal axis of the spark plug assembly extends substantially parallel to the longitudinal axis of the intake valves.

13. The four stroke internal combustion engine according to claim 11, wherein the longitudinal axis of the spark plug assembly and the intake valve axis form an acute angle not greater than 20°.

14. The four stroke internal combustion engine according to claim 11, wherein the spark plug assembly comprises:
a tube assembly secured to the cylinder head;
a spark plug connector removably located within the tube assembly; and
a spark plug secured to the spark plug connector.

15. The four stroke internal combustion engine according to claim 14, further comprising:
a pedestal within the cylinder head,
wherein the tube assembly is sealingly secured to the pedestal.

16. The four stroke internal combustion engine according to claim 14, wherein the tube assembly is plastic.

17. The four stroke internal combustion engine according to claim 14, wherein the spark plug connector further comprises:
a splash cover to prevent contaminants from entering the spark plug assembly.

18. The four stroke internal combustion engine according to claim 2, wherein at least one of the cam shaft and the support axle is offset with respect to the longitudinal axis.

19. The four stroke internal combustion engine according to claim 2, wherein the cam shaft is positioned closer to the exhaust valves than the intake valves.

20. The four stroke internal combustion engine according to claim 2, wherein the cam shaft and the support axle are positioned closer to the exhaust valves than the intake valves.

21. The four stroke internal combustion engine according to claim 2, further comprising:
a spark plug assembly connected to the cylinder head, wherein the spark plug assembly comprises
a tube assembly secured to the cylinder head;
a spark plug connector removably located within the tube assembly; and
a spark plug secured to the spark plug connector.

22. The four stroke internal combustion engine according to claim 21, further comprising:
a pedestal within the cylinder head, and
wherein the tube assembly is sealingly secured to the tube assembly.

23. The four stroke internal combustion engine according to claim 21, wherein the spark plug connector further comprises:
a splash cover to prevent contaminants from entering the spark plug assembly.

24. The four stroke internal combustion engine according to claim 21, wherein the spark plug connector further comprises:
a sealing assembly that forms a seal between the tube assembly and the spark plug connector.

25. A personal watercraft for at least one passenger, comprising:
a hull;
a seating assembly positioned on the hull adapted to accommodate at least one passenger; and
an internal combustion engine located within the hull, wherein the engine comprises
a crankcase secured to the hull having a crank shaft rotatably mounted therein;
a cylinder head connected to the crankcase, wherein the crankcase and the cylinder head form at least one cylinder;
at least one intake valve for the at least one cylinder, wherein the at least one intake valve has an intake valve axis;
at least one exhaust valve for the at least one cylinder, wherein the at least one exhaust valve has an exhaust valve axis;
a valve actuation assembly located in the cylinder head for operating the at least one intake valve and the at least one exhaust valve, wherein the valve actuation assembly is located substantially between the intake valve axis and the exhaust valve axis, the valve actuation assembly comprising
a cam shaft rotatably mounted within the cylinder head,
a support axle mounted within the cylinder head, offset from the cam shaft;
at least one exhaust rocker arm pivotally mounted on the support axle,
at least one intake rocker arm pivotally mounted on the support axle,
wherein the cam shaft is operatively coupled to the crankshaft such that rotational movement of the crankshaft is transferred to the cam shaft,
wherein the at least one exhaust rocker arm is operatively coupled to the cam shaft for operating the at least one exhaust valve, and
wherein the at least one intake rocker arm is operatively coupled to the cam shaft for operating the at least one intake valve; and
a lubrication system for lubricating the engine,
wherein the lubrication system includes a supply of lubricant to the cylinder head,
wherein the support axle has a central passageway extending therethrough, and
wherein at least a portion of the supply of lubricant flows through the central passageway in the support axle.

26. The personal watercraft according to claim 25, wherein the crankshaft and the cam shaft extend generally parallel to a longitudinal axis of the personal watercraft.

27. The personal watercraft according to claim 25, wherein each cylinder has a longitudinal axis, wherein each of the at least one intake valve and the at least one exhaust valve is disposed at an angle with respect to the longitudinal axis.

28. The personal watercraft according to claim 27, wherein the engine includes a pair of exhaust valves for each cylinder and the valve actuation assembly includes an exhaust rocker arm for each exhaust valve.

29. The personal watercraft according to claim 28, wherein each exhaust rocker arm comprises:
a cam follower located on one end of the exhaust rocker arm, wherein the cam follower is adapted to follow a profile of an exhaust cam lobe located on the camshaft; and an exhaust hydraulic adjuster located on an opposite end of the exhaust rocker arm, wherein the exhaust hydraulic adjuster is adapted to contact and operate the exhaust valve in response to movement of the exhaust rocker arm by the exhaust cam lobe.

30. The personal watercraft according to claim 29, wherein the exhaust hydraulic adjuster comprises:

an exhaust piston actuator slidably received within a cavity in the end of the exhaust rocker arm; and a fluid passageway extending through the exhaust rocker arm to the support axle, wherein the central passageway in the support axle is in fluidic communication with the fluid passageway such that fluid within the central passageway flows through the fluid passageway to the cavity to bias the exhaust piston actuator into engagement with the exhaust valve.

31. The personal watercraft according to claim 27, wherein the engine includes a pair of intake valves for each cylinder and the valve actuation assembly includes a forked intake rocker arm for the pair of intake valves.

32. The personal watercraft according to claim 31, wherein the forked intake rocker arm comprises:

a cam follower located on one end of the intake rocker arm, wherein the cam follower is adapted to follow a profile of an intake cam lobe located on the camshaft;

a first actuator arm for operating a first of the pair of intake valves;

a second actuator arm for operating a second of the pair of intake valves;

a pair of intake hydraulic adjusters located on an opposite end of the forked intake rocker arm, wherein the intake hydraulic adjuster is adapted to contact and operate the pair of intake valves in response to movement of the intake rocker arm by the intake cam lobe.

33. The personal watercraft according to claim 32, wherein each of the intake hydraulic adjusters comprises:

an intake piston actuator slidably received within a cavity in an end of the actuator arm, and a fluid passageway extending through the actuator arm to the support axle, and wherein the central passageway in the support axle is in fluidic communication with the fluid passageway such that fluid within the central passageway flows through the fluid passageway to the cavity to bias the intake piston actuator into engagement with the intake valve.

34. The personal watercraft according to claim 33, wherein the exhaust rocker arms are rotatably mounted on the support axle on opposite sides of the intake rocker arm.

35. The personal watercraft according to claim 34, wherein each exhaust rocker arm comprises:

a cam follower located on one end of the exhaust rocker arm, wherein the cam follower is adapted to follow a profile of an exhaust cam lobe located on the camshaft; and an exhaust hydraulic adjuster located on an opposite end of the exhaust rocker arm, wherein the exhaust hydraulic adjuster is adapted to contact and operate the exhaust valve in response to movement of the exhaust rocker arm by the exhaust cam lobe.

36. The personal watercraft according to claim 35, wherein the exhaust hydraulic adjuster comprises:

an exhaust valve actuator slidably received within a cavity in the end of the exhaust rocker arm; and a fluid passageway extending through the exhaust rocker arm to the support axle, wherein the central passageway in the support axle is in fluidic communication with the fluid passageway such that fluid within the central passageway flows through the fluid passageway to the cavity to bias the exhaust valve actuator into engagement with the exhaust valve.

37. The personal watercraft according to claim 33, wherein the first actuator arm is spaced from the second actuator arm.

38. The personal watercraft according to claim 33, further comprising:

a spark plug assembly disposed in the cylinder head, wherein the spark plug assembly is positioned between the first actuator arm and the second actuator arm.

39. The personal watercraft according to claim 38, wherein the longitudinal axis of the spark plug assembly extends substantially parallel to the longitudinal axis of the intake valves.

40. The personal watercraft according to claim 38, wherein the longitudinal axis of the spark plug assembly and the intake valve axis form an acute angle not greater than 20°.

41. The personal watercraft according to claim 38, wherein the spark plug assembly comprises:

a tube assembly secured to the cylinder head;

a spark plug connector removably located within the tube assembly; and a spark plug secured to the spark plug connector.

42. The personal watercraft according to claim 41, further comprising:

a pedestal within the cylinder head, wherein the tube assembly is sealingly secured to the pedestal.

43. The personal watercraft according to claim 41, wherein one end of the spark plug extends through a portion of the cylinder head into the cylinder.

44. The personal watercraft according to claim 29, wherein at least one of the cam shaft and the support axle is offset with respect to the longitudinal axis.

45. The personal watercraft according to claim 44, wherein the cam shaft is positioned closer to the exhaust valves than the intake valves.

46. The personal watercraft according to claim 44, wherein the cam shaft and the support axle are positioned closer to the exhaust valves than the intake valves.

* * * * *